United States Patent
Shiomi

(10) Patent No.: US 6,556,519 B1
(45) Date of Patent: Apr. 29, 2003

(54) DISK CHARGER WITH CIRCULAR DISK HOUSING AND CENTRALLY ARRANGED PLAYBACK UNIT

(75) Inventor: Tetsuhiro Shiomi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/473,894

(22) Filed: Dec. 28, 1999

(30) Foreign Application Priority Data

| Dec. 29, 1998 | (JP) | 10-377526 |
| Jul. 9, 1999 | (JP) | 11-196579 |
| Jul. 9, 1999 | (JP) | 11-196580 |
| Jul. 9, 1999 | (JP) | 11-196589 |

(51) Int. Cl.$^7$ .......................... G11B 17/22; G11B 17/24
(52) U.S. Cl. .................. 369/30.86; 369/30.8
(58) Field of Search .................. 369/30.44, 30.47, 369/30.48, 30.5, 30.56, 30.59, 30.6, 30.62, 30.71, 30.75, 30.79, 30.8, 30.85, 30.86, 30.9, 30.91

(56) References Cited

U.S. PATENT DOCUMENTS

| 4,750,160 A | * | 6/1988 | Miller et al. ................. 369/37 |
| 4,791,626 A | * | 12/1988 | Staar ........................... 369/37 |
| 4,815,057 A | * | 3/1989 | Miller et al. .................. 369/37 |
| 4,984,228 A | * | 1/1991 | Agostini ....................... 369/37 |
| 5,027,335 A | * | 6/1991 | Deis ............................. 369/37 |
| 5,187,695 A | * | 2/1993 | Schindler et al. ............. 369/37 |
| 5,528,566 A | * | 6/1996 | McGee et al. ................ 369/37 |
| 5,671,196 A | * | 9/1997 | Yoshida et al. ............... 369/34 |
| 5,719,725 A | * | 2/1998 | Nakao ..................... 360/98.06 |
| 5,848,035 A | * | 12/1998 | Nakao .......................... 369/37 |
| 5,943,306 A | * | 8/1999 | Silverstein ................... 369/37 |
| 6,169,713 B1 | * | 1/2001 | Silverstein ................... 369/37 |

* cited by examiner

Primary Examiner—William Klimowicz
(74) Attorney, Agent, or Firm—Jay H. Maioli

(57) ABSTRACT

A disk recording/reproducing apparatus including a housing for accommodating a plurality of disks in an upright position along a circumference thereof, a disk driving device for recording/reproducing a disk, and a disk conveying belt for conveying the disk between the disk driving device and the housing, wherein the disk driving device is disposed in the center of the housing, thereby reducing the overall size of the apparatus.

14 Claims, 32 Drawing Sheets

DISK CHARGER WITH CIRCULAR DISK HOUSING AND CENTRALLY ARRANGED PLAYBACK UNIT

BACKGROUND OF THE INVENTION

The present invention relates to a disk recording and/or reproduction apparatus for writing (recording) or reading (reproducing) the information signal using a disk-like recording medium such as a CD (compact disk) with the information signal recorded on one side thereof and a DVD (digital video disk) with the information signal recorded on the two sides thereof, or more in particular to a disk recording and/or reproduction apparatus comprising a disk stacking turntable capable of accommodating disk-like recording media (preferably, a multiplicity or 100 to 300 of them) in vertical position.

Conventionally, a disk recording and/or reproduction apparatus such as shown in FIG. 32, for example, is known in which a multiplicity of optical disks such as CDs or DVDs can be accommodated in vertical position on the turntable. FIG. 32 is a side view of a schematic configuration of a disk reproduction unit 1 in which 100 optical disks Dn (n=1 to 100) can be mounted in vertical position on the turntable 2.

This disk reproduction unit 1 includes a turntable 2 rotatably supported on a base chassis not shown. This turntable 2 has 100 disk housing units 3 capable of accommodating optical disks D in vertical position. The 100 disk housing units 3 are arranged radially at equal angular intervals along the circumferential direction. A disk drive unit not shown for performing the reproducing operation of the optical disk D is arranged on the outside of the turntable 2. This disk drive unit includes a disk table for chucking and rotationally driving the optical disk D and an optical pickup unit mounted on the disk table for reading the information signal from the optical disk D rotationally driven integrally with the disk table.

Disk conveyance means 4 for conveying the optical disk D is interposed between the turntable 2 and the disk drive unit. This disk conveyance means 4 includes a rotary arm 4a rotatably supported on the base chassis and a pair of holding members 4b mounted at the forward end of the rotary arm 4a. The rotary arm 4a is rotatable over an angle of about 90° vertically and has a pair of holding members 4b mounted at the forward end thereof for grasping the optical disk D along the thickness thereof.

In this way, in FIG. 32, the holding member pair 4b are moved toward the optical disk D by rotating the rotary arm 4a upward in forward direction as indicated by solid line and raising it, so that a part of the optical disk D enters between the two holding members 4b. As a result, the optical disk D can be held by a pair of the holding members 4b. Then, the rotary arm 4a is rotated downward in rearward direction, so that the optical disk D held between the holding member pair 4b is removed from the disk housing unit 3 and conveyed to the disk mounting portion 5 of the disk drive unit. At this disk mounting portion 5, the optical disk D is chucked by the disk table of the disk drive unit and the chucking plate. After that, the rotary arm 4a is rotated further by a predetermined amount rearward to the position indicated by dashed line in order to avoid contact with the optical disk D.

In the conventional disk reproduction unit 1 described above, however, after the optical disk D is grasped by a pair of the holding members 4b, the rotary arm 4a is rotated and the optical disk D is conveyed between the disk housing unit 3 and the disk mounting portion 5. This configuration has the problem of increasing the height of the whole apparatus.

Specifically, the optical disk D, when removed from the disk housing unit 3 or accommodated in the disk housing unit 3, is lifted up considerably by the rotational motion of the rotary arm 4a. Also, at the reproduction position where the optical disk D is mounted on the disk mounting portion 5, the rotary arm 4a is required to be moved considerably downward to prevent a pair of the holding members 4b from interfering with the optical disk D. In consideration of these facts, the height H from the lowest end of the disk conveyance means 4 to the uppermost end of the optical disk D increases and the height of the whole apparatus is increased.

By the way, with the conventional disk recording and/or reproduction apparatus using a CD or a DVD having a diameter of 12 cm as the optical disk D, a space having a height of about 18 cm is required for conveying the optical disk D.

Further, as a conventional typical disk recording and/or reproducing apparatus capable of housing a large number of optical disks on a turntable so as to place them vertically, an apparatus shown in FIG. 33, for example, is known. FIG. 33 is a plan view showing a schematic configuration of a disk reproducing apparatus 1 capable of mounting 100 optical disks Dn (n=1 to 100) on a turntable 2 so as to place them vertically.

This disk reproducing apparatus 1 includes a base chassis 8 taking the plan shape of a four-sided figure. In a position somewhat biased in one sense of one diagonal direction from nearly the center of the base chassis 8, the turntable 2 taking the plan shape of a doughnut is supported so as to be freely rotatable. On this turntable 2, 100 disk housing portions are disposed at equal angle intervals in the circumferential direction. Furthermore, in one corner of the one diagonal direction of the base chassis 8, a disk drive apparatus 9 for executing a reproduction operation on an optical disk Dn is disposed.

This disk drive apparatus 9 includes a disk table 10 for chucking an optical disk Dn and driving and rotating it, and an optical pickup apparatus 6 for reading an information signal from the optical disk Dn attached to the disk table 10 and driven and rotated integrally therewith. Between the disk drive apparatus 9 and the turntable 2, a disk conveyance means 7 is provided. By operation of the disk conveyance means 7, an arbitrary one of one hundred optical disks Dn placed on the turntable 2 is selectively taken out and conveyed to the disk drive apparatus 9, or the optical disk Dn attached to the disk drive apparatus 9 is conveyed to the turntable 2 side, and housed in a predetermined disk housing portion of the turntable 2.

In the case where an optical disk, such as a DVD, capable of reproducing an information signal from both sides thereof as an information recording medium or recording ainformation signal on both sides thereof was used, however, it was impossible to automatically conduct recording and/or reproducing operation on both sides in the above describedconventional disk recording and/or reproducing apparatus 1. In the case where recording and/or reproducing operation was to be conducted on one side and subsequently on the other side, the user had to turn out the side of the optical disk Dn and attach it to the disk attachment portion again. Therefore, the essence that "a disk could be exchanged without touching the disk" which was required of a disk changer mechanism mounted on such a disk recording and/or reproducing apparatus 1 was hampered.

To solve such a problem, it is conceivable to provide disk drive apparatuses 9a and 9b dedicated to respective sides of the optical disk, for example, as shown in FIG. 34. The two disk drive apparatuses 9a and 9b are disposed in positions separated by a rotation angle 90° of the turntable 2 around a rotation center thereof. Disk tables 5 of the disk drive apparatuses 9a and 9b are disposed outward so as to turn away from each other. By using such a configuration where the disk drive apparatuses 9a and 9b are dedicated to respective sides of the optical disk it is possible to conduct reproducing (or recording) on both sides of the optical disk.

When using two disk drive apparatuses 9a and 9b, however, the production cost increases because two disk drive apparatuses 9 are required. In addition, there also occurs a problem that the external dimensions of the entire apparatus become large because it is necessary to secure a space for disposing two disk drive apparatuses 9. In view of these problems with conventional apparatuses, the present invention has been made.

OBJECTS AND SUMMARY OF THE INVENTION

An object of the present invention is to solve the above described problems by making it possible to supply a disk from two opposite directions to a disk drive apparatus so as to automatically turn out the disk.

Another object of the present invention is to solve the above problems by making it possible to accommodate or remove the disk-like recording medium in and from the disk housing unit by lifting the disk-like recording medium only slightly and to convey the disk-like recording medium without the need of an apparatus with a large height.

In order to solve the above problems with conventional apparatuses and achieve the objects described above, a disk recording and/or reproduction apparatus of the present invention comprises a turntable capable of accommodating disk-like recording media in vertical direction in juxtaposition along the circumferential direction, a disk drive unit arranged in the center hole of the central portion of the turntable for mounting the disk-like recording medium to record and/or reproduce the information signal, and disk conveyance means for conveying the disk-like recording medium between the disk drive unit and the turntable, the apparatus being characterized in that the disk conveyance means includes a disk guide for lifting the disk-like recording medium from the disk housing unit of the turntable and limiting the movement thereof and a conveyance belt for conveying the disk-like recording medium to the disk mounting portion of the disk drive unit by applying the turning effort to the disk-like recording medium.

In the disk recording and/or reproduction apparatus of the present invention, the disk guide includes a vertically moving member arranged vertically movably in the center hole of the turntable and a restriction member for restricting the disk-like recording medium with the vertically moving member, the apparatus being characterized in that the conveyance belt is movably mounted on the vertically moving member.

In a disk recording and/or reproduction apparatus of the present invention, the disk drive unit includes a first support frame and a second support frame arranged in opposed relation to each other with the disk conveyance means therebetween, the apparatus being characterized in that the first support frame includes a disk table for mounting the disk-like recording medium and a pickup unit for recording and/or reproducing the information signal, and the second support frame includes a chucking plate for holding the disk-like recording medium with the disk table.

With the configuration described above, in the disk recording and/or reproduction apparatus of the present invention, the disk conveyance means includes a disk guide and a conveyance belt. Therefore, an arbitrary one of a multiplicity of the disk-like recording media arranged in vertical position along the circumferential direction on the turntable can be selectively picked up and conveyed to the disk mounting portion, or the disk-like recording medium after recording or reproduction operation can be returned from the disk mounting portion to the original disk housing unit, thus making it possible to set the whole apparatus to a low height.

In the disk recording and/or reproduction apparatus of the invention, the disk guide includes a vertically moving member and a restriction member, and the conveyance belt is mounted movably on the vertically moving member. Therefore, an arbitrary one of a multiplicity of disk-like recording media arranged in vertical position along the circumferential direction on the turntable can be selectively picked up and conveyed to the disk mounting portion, or the disk-like recording medium after recording or reproduction can be returned from the disk mounting portion to the original disk housing unit.

In the disk recording and/or reproduction apparatus of the invention, first and second support frames are arranged in opposed relation to each other with the disk conveyance means interposed therebetween, the first support frame has a disk table and a pickup unit and the second support frame includes a chucking plate. Therefore, the disk-like recording medium conveyed by the disk conveyance means can be accurately mounted on the disk mounting portion of the disk table.

These and other objects, advantages, and features of the present invention will become apparent to those skilled in the art upon consideration of the following description of the present invention.

DETAILED DESCRIPTION OF THE INVENTION

Figure 1:
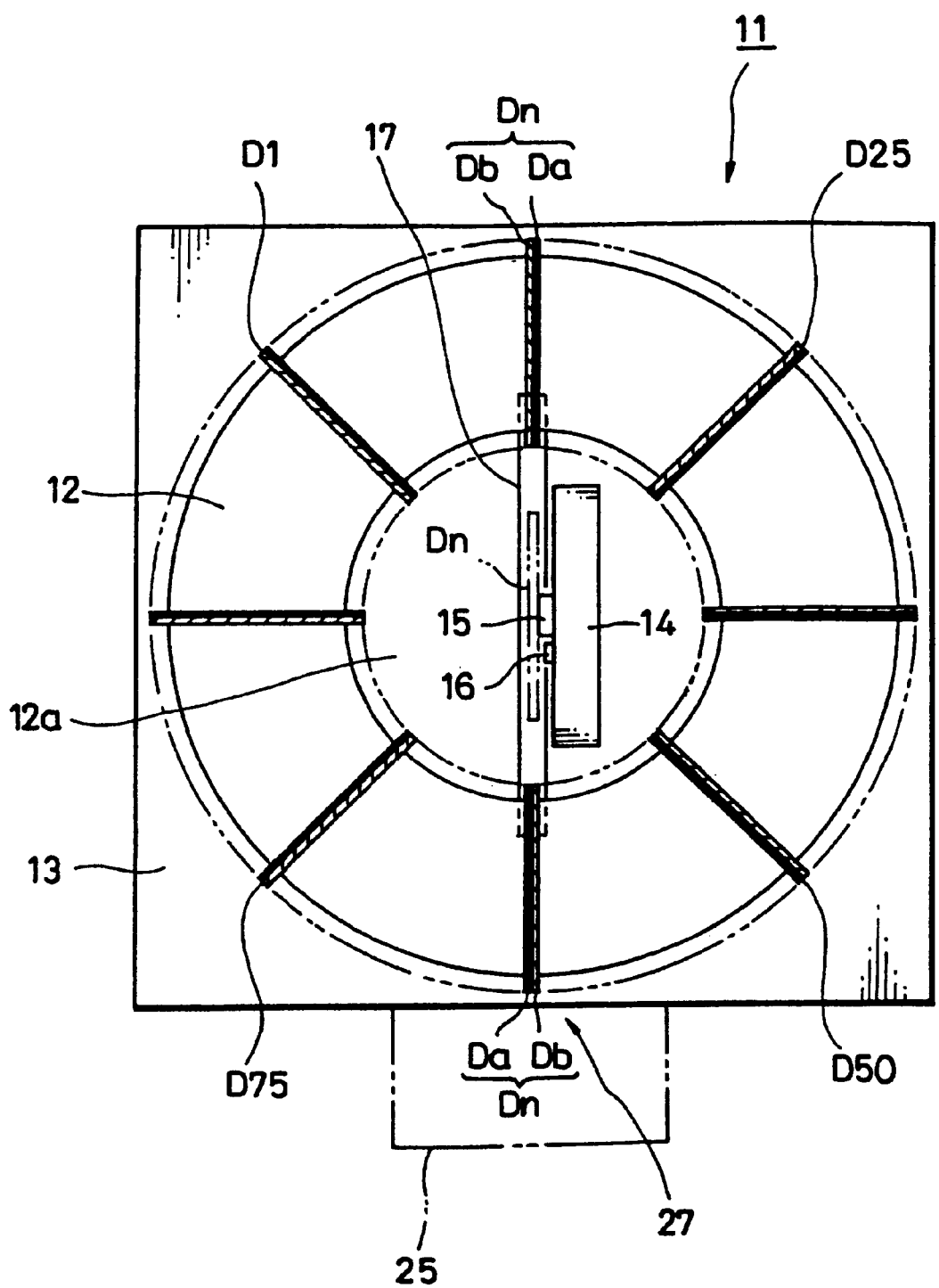
FIG. 1 is plan view showing an embodiment of a basic configuration of a disk reproduction unit of a disk recording and/or reproduction apparatus according to this invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawing.

Figure 2:
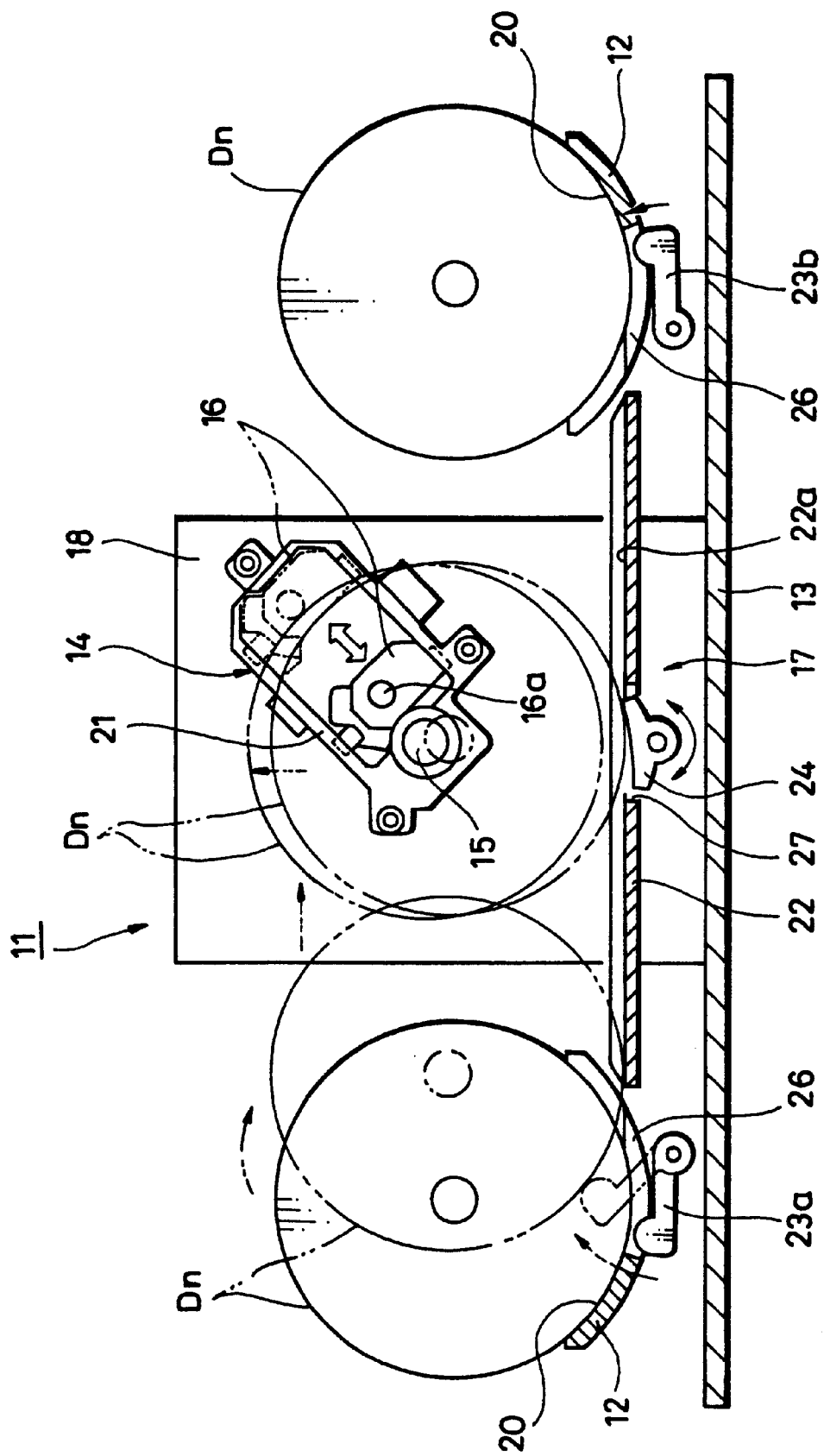
FIG. 2 is a front sectional view showing an embodiment of a basic configuration of a disk reproduction unit of a disk recording and/or reproduction apparatus according to this invention.

Now, an embodiment of the disk recording and/or reproduction apparatus according to this invention will be explained with reference to the drawings. FIGS. 1 and 2 show an example of the basic configuration of a disk recording and/or reproduction apparatus according to this invention, in which FIG. 1 is a plan view and FIG. 2 a side view. FIGS. 3 to 31 show specific configurations of an embodiment of the disk recording and/or reproduction apparatus according to the invention, in which an optical disk such as a CD or a DVD having a diameter of 12 cm is used as a disk-like recording medium, and a multiplicity of such optical disks are housed in a disk-stacking turntable so configured that an arbitrary one of the multiplicity of the optical disks housed therein is selectively picked up to reproduce (read) the information signal recorded on the information recording surface of the optical disk.

Figure 3:
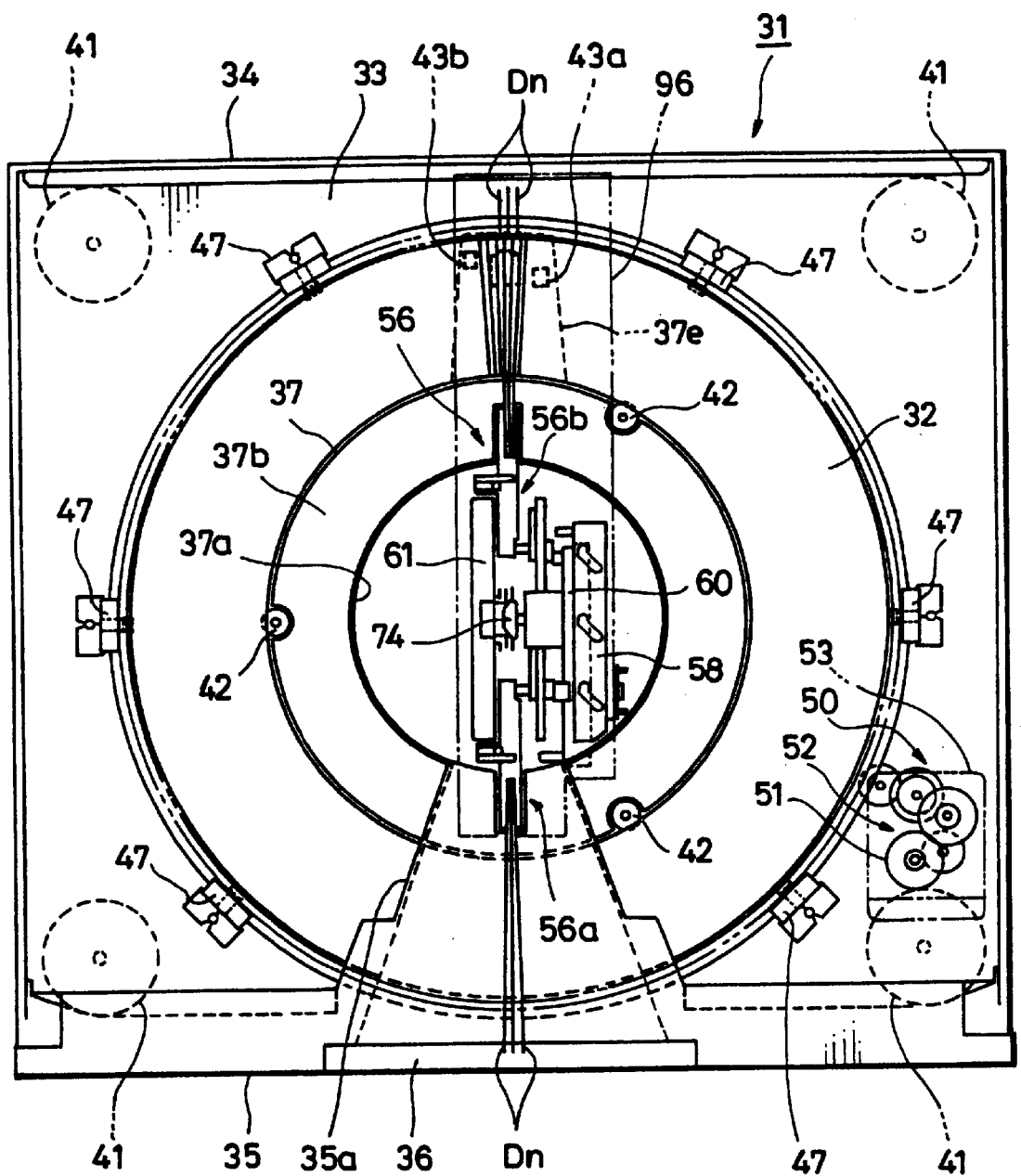
FIG. 3 is a plan view showing an embodiment of a specific configuration of a disk reproduction unit of a disk recording and/or reproduction apparatus according to this invention.
Figure 4:
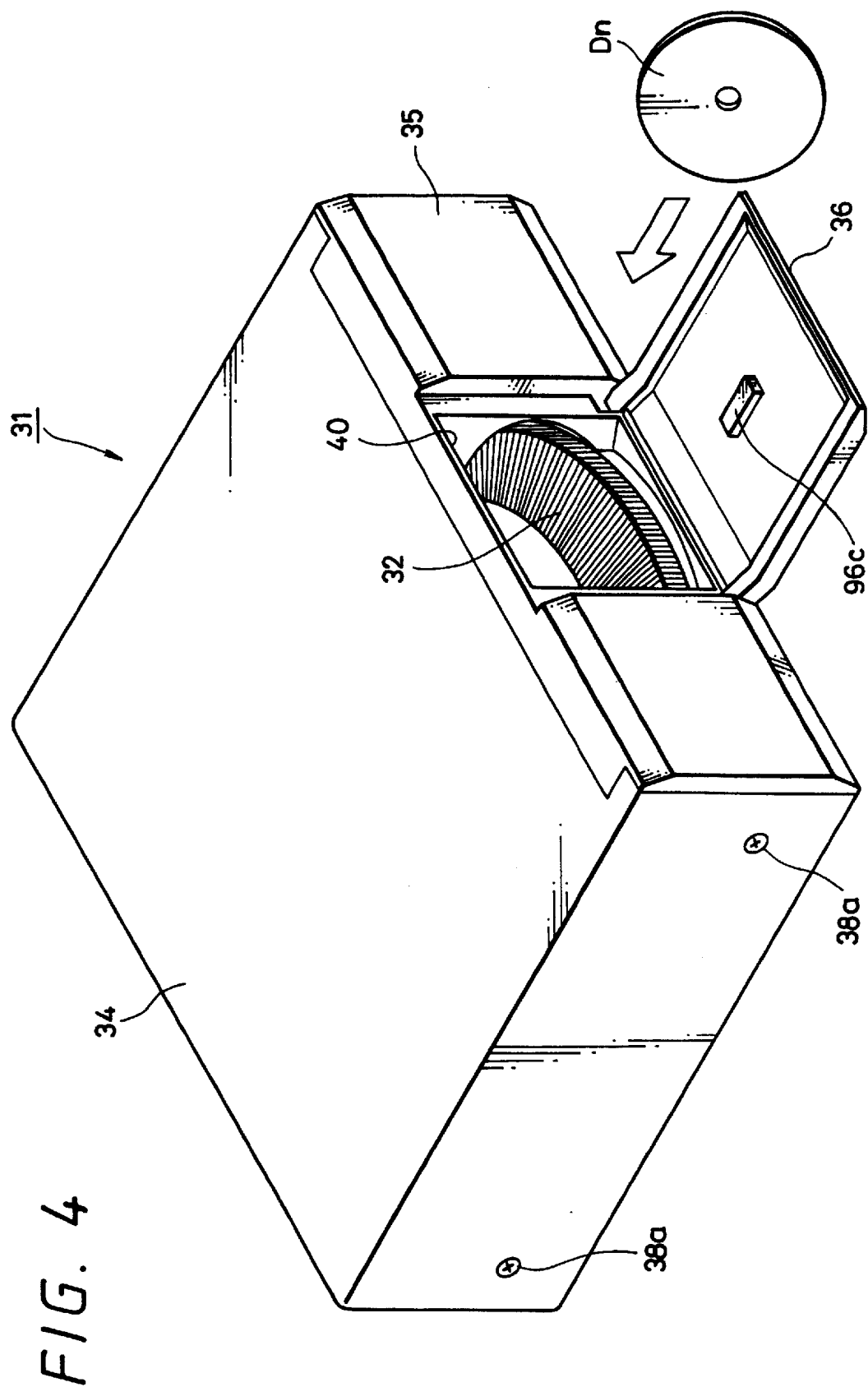
FIG. 4 is a perspective view of the appearance with the door open, showing an embodiment of a specific configuration of a disk reproduction unit of a disk recording and/or reproduction apparatus according to this invention.
Figure 5:
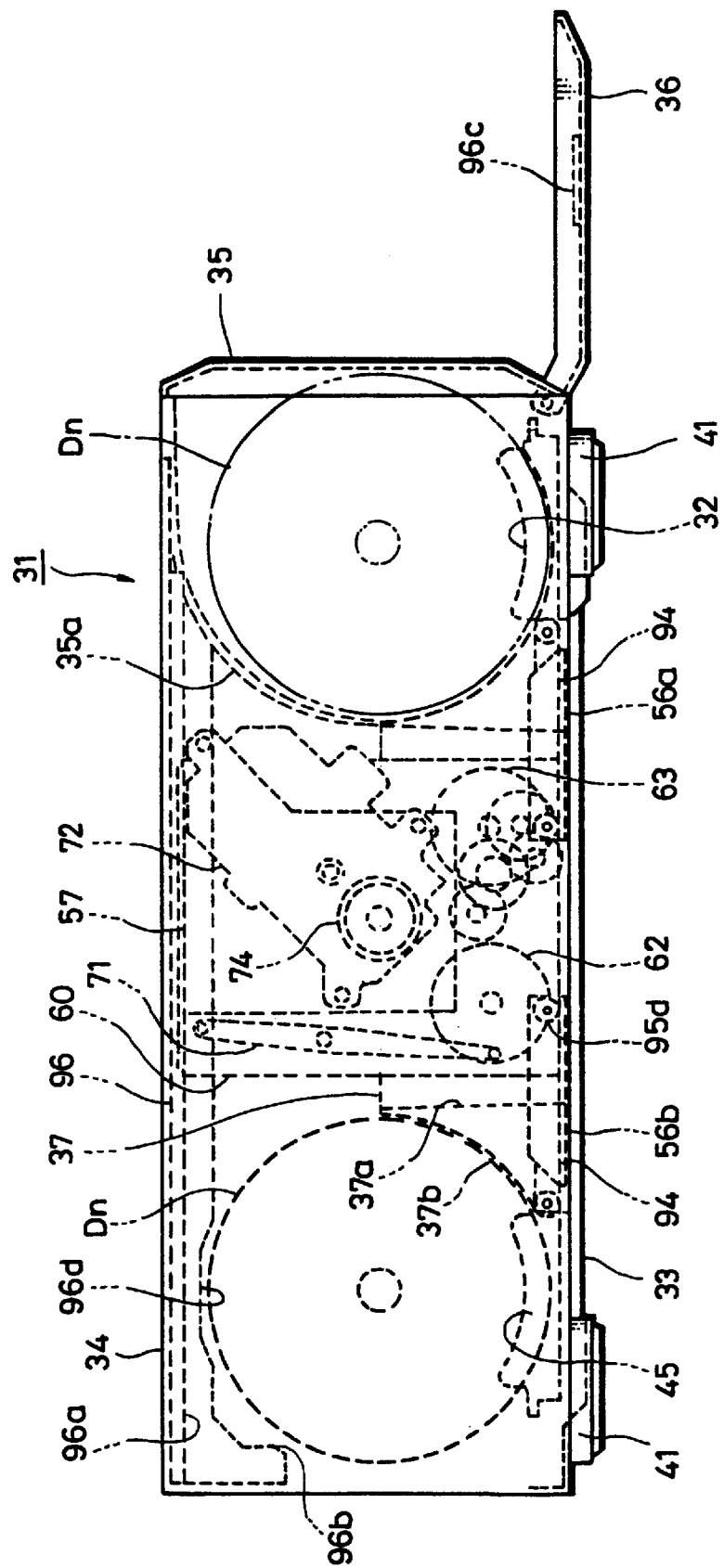
FIG. 5 is a side view with the door open, showing an embodiment of a specific configuration of a disk reproduction unit of a disk recording and/or reproduction apparatus according to this invention.
Figure 6:
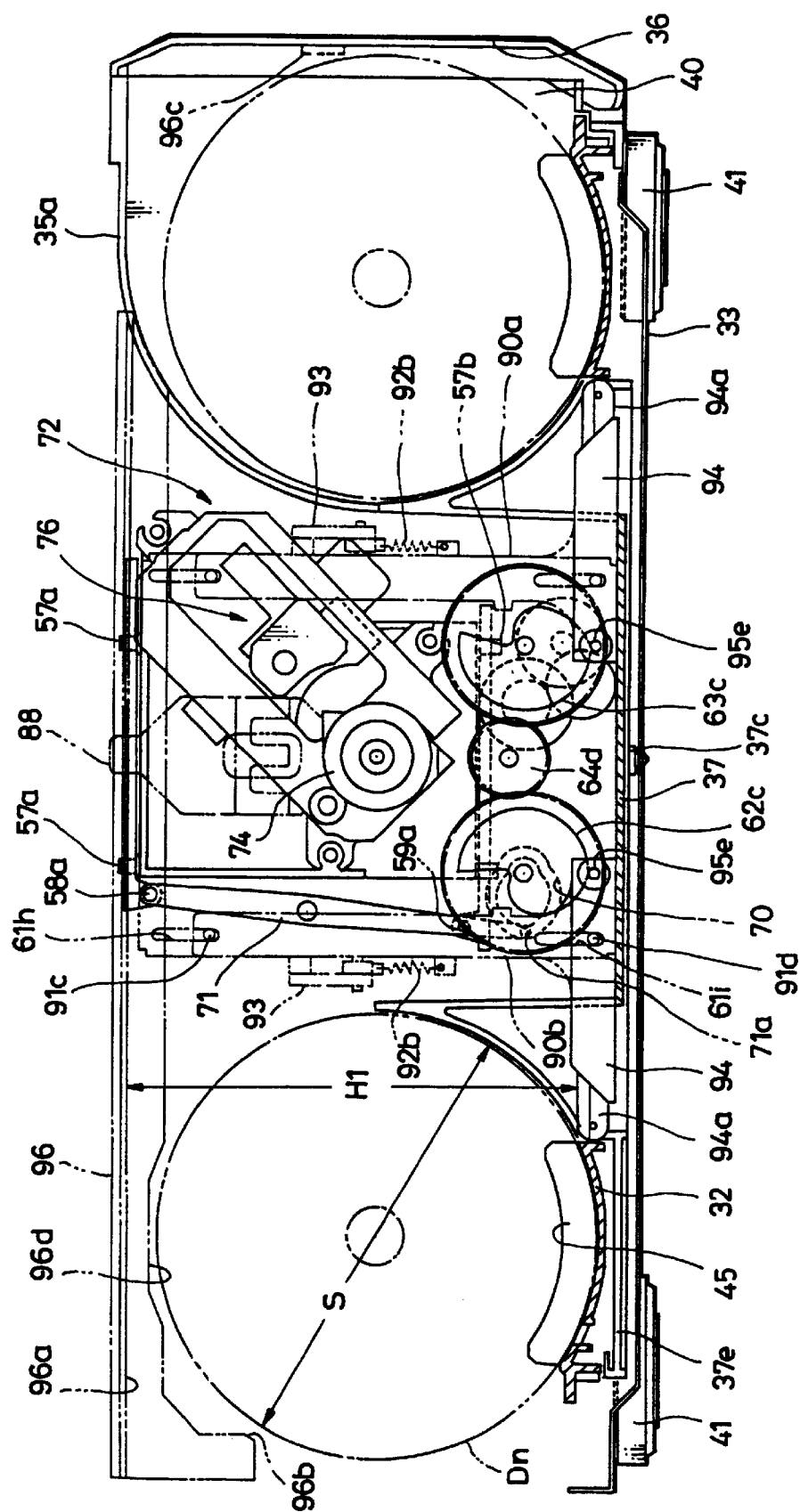
FIG. 6 is a sectional view for explaining the initial position for disk loading, according to a specific configuration of a disk reproduction unit of a disk recording and/or reproduction apparatus according to this invention.
Figure 19:
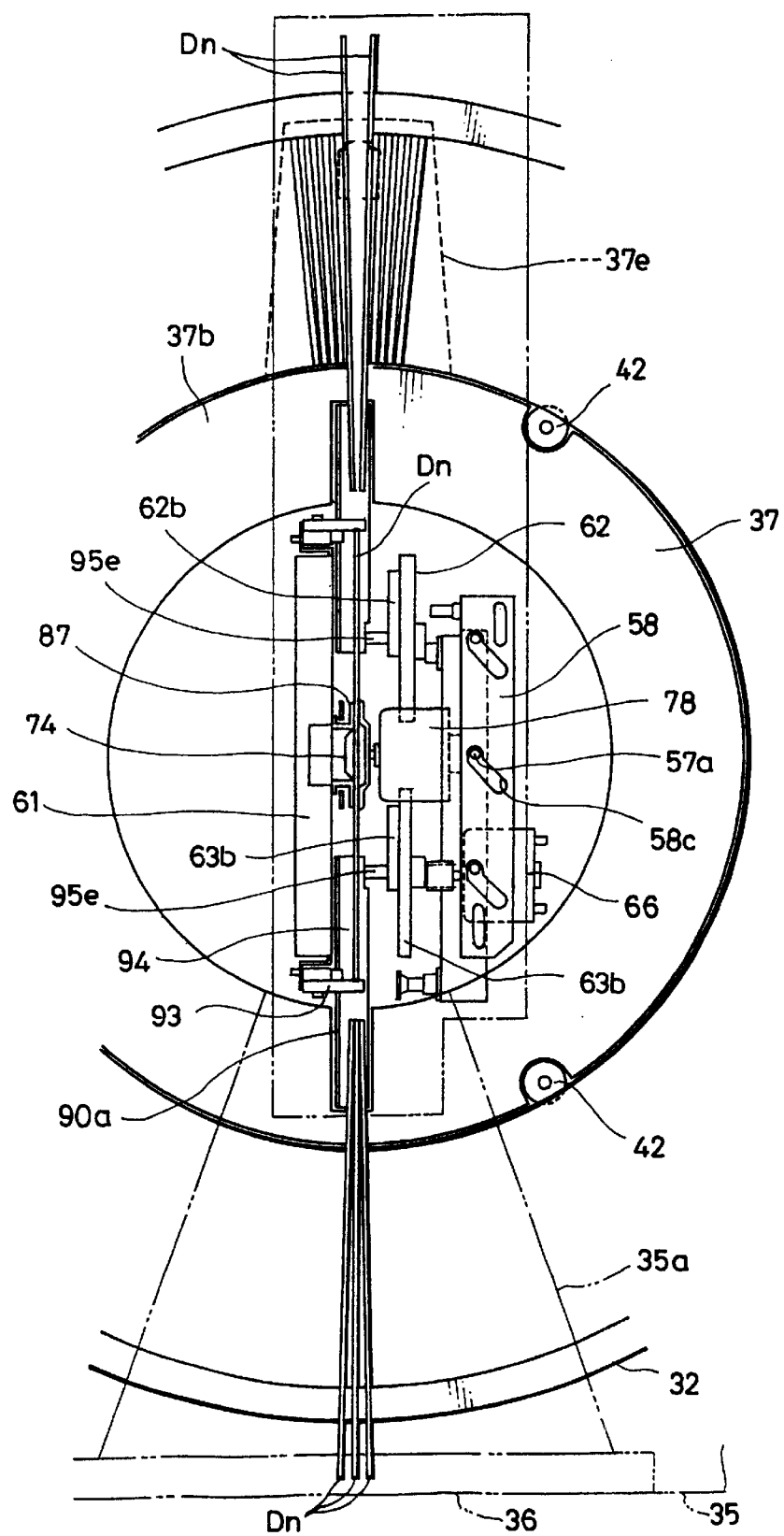
FIG. 19 is a plan view showing the essential parts with the rear disk completely chucked, according to an embodiment of a specific configuration of a disk reproduction unit of a disk recording and/or reproduction apparatus according to this invention.
Figure 20:
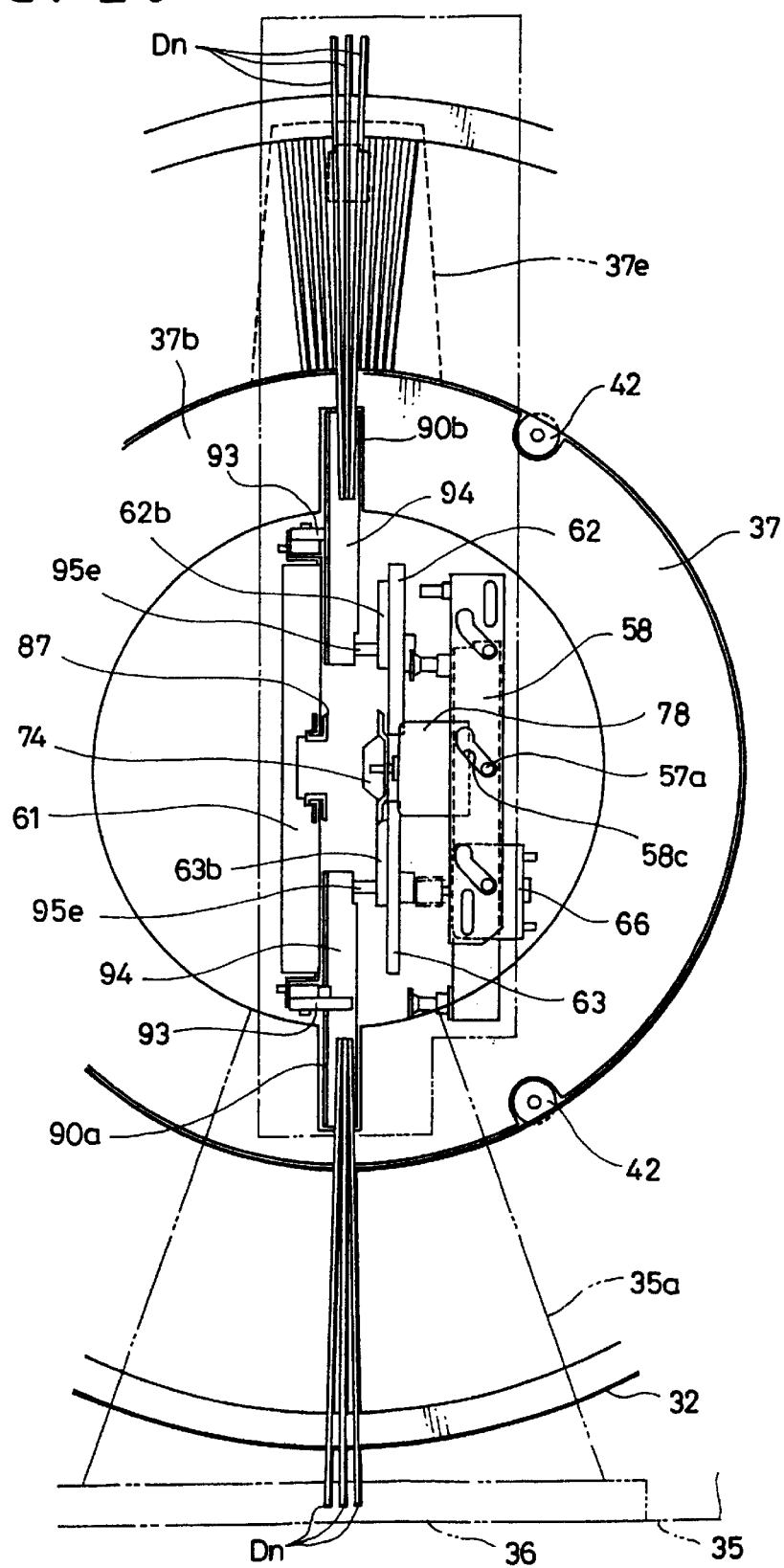
FIG. 20 is a plan view showing the essential parts with the front disk lifted up for disk loading, according to an embodiment of a specific configuration of a disk reproduction unit of a disk recording and/or reproduction apparatus according to this invention.
Figure 21:
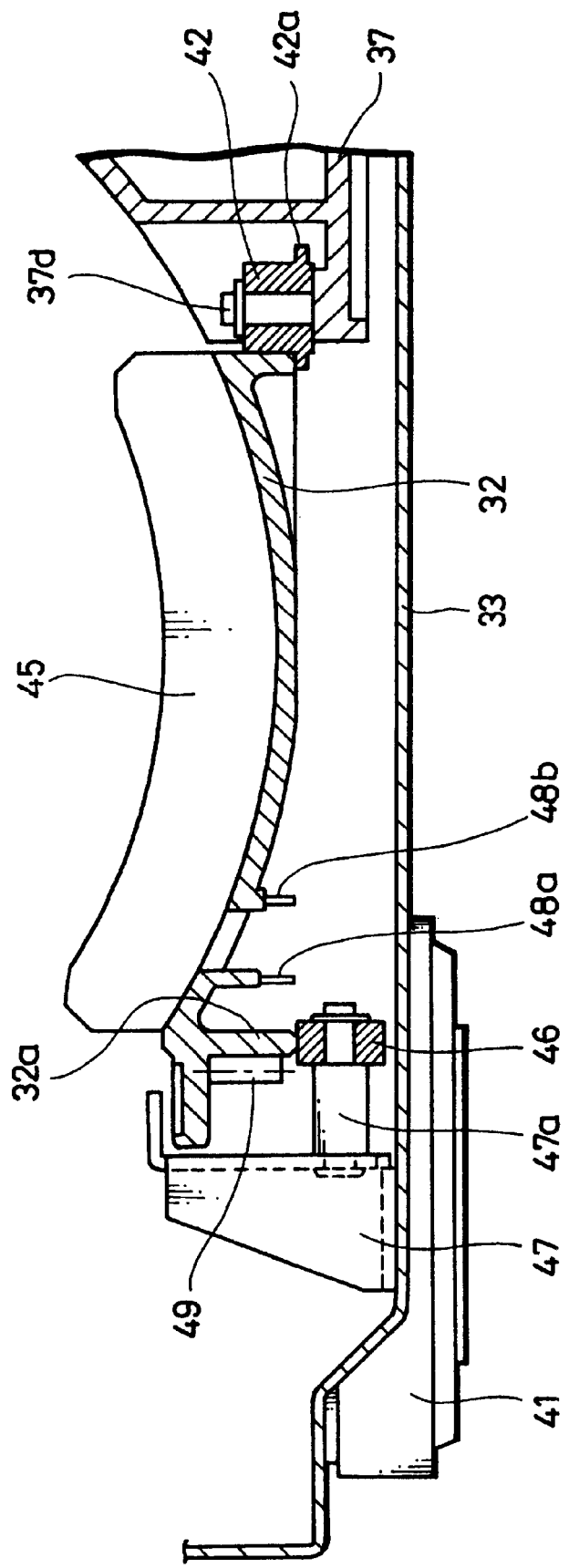
FIG. 21 is a sectional view for explaining the essential parts of the turntable according to an embodiment of a specific configuration of the disk reproduction unit shown in FIG. 3.
Figure 22:
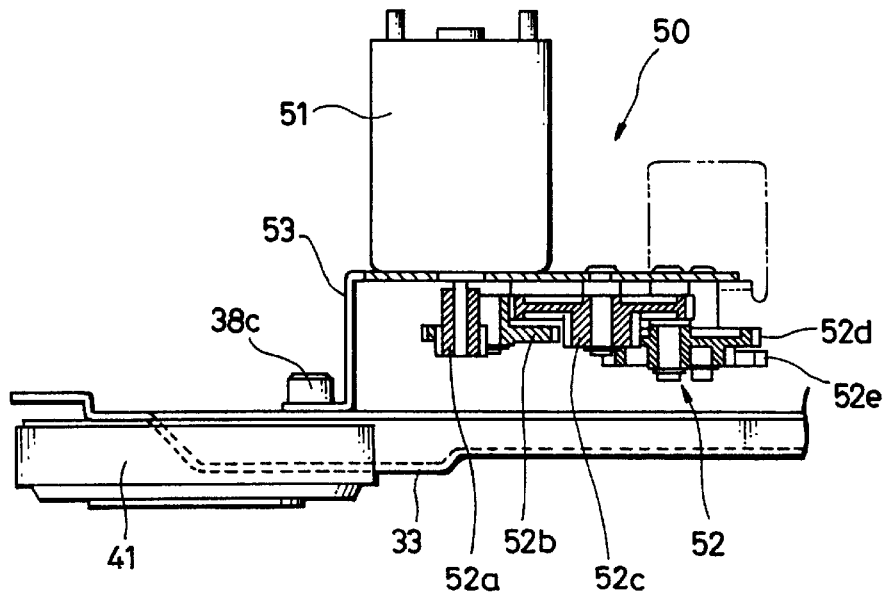
FIG. 22 is a sectional view showing the table rotational drive mechanism according to an embodiment of a specific configuration of the disk reproduction unit shown in FIG. 3.
Figure 23:
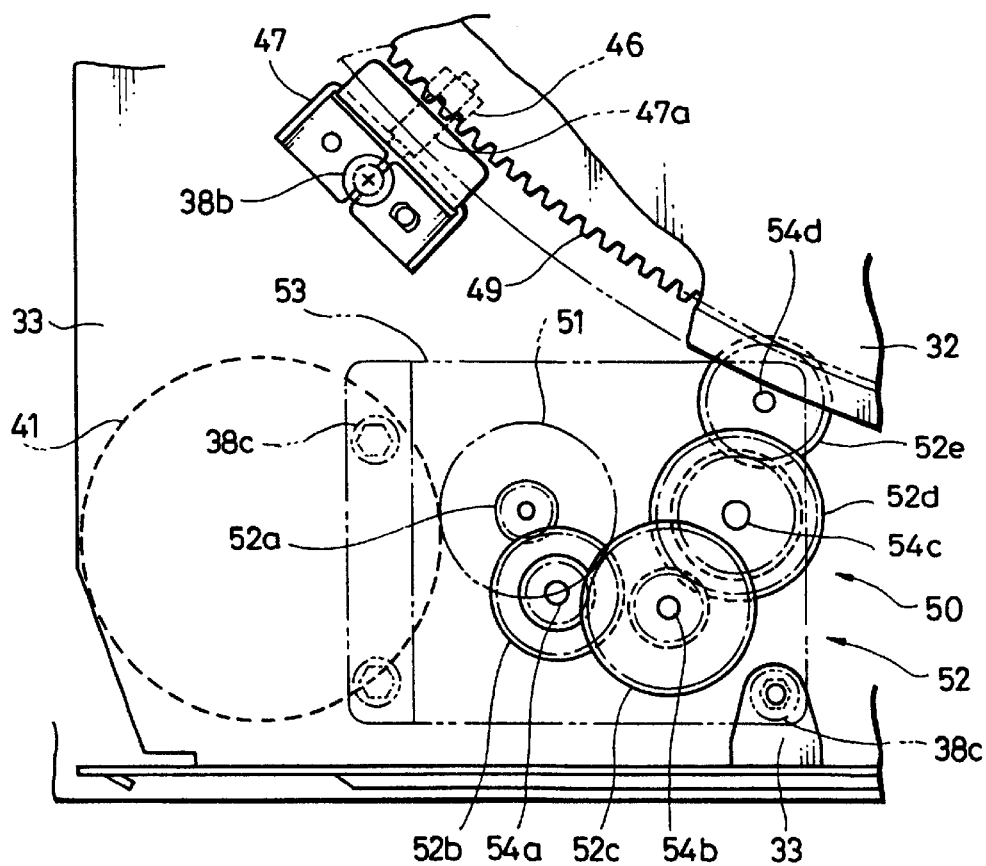
FIG. 23 is a plan view showing the table rotational drive mechanism according to an embodiment of a specific configuration of the disk reproduction unit shown in FIG. 3.
Figure 24:
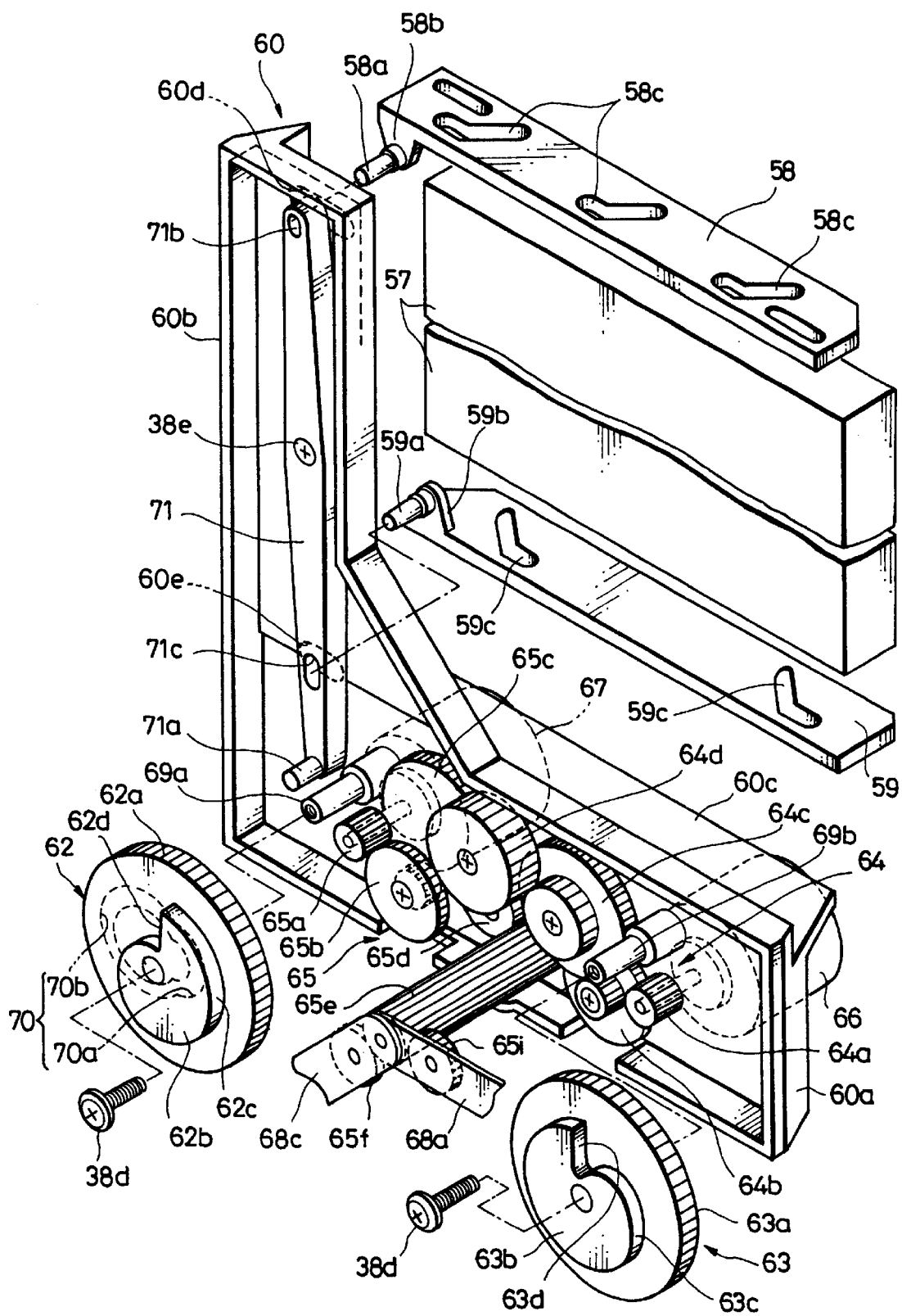
FIG. 24 is a perspective perspective view showing the cam drive mechanism according to an embodiment of a specific configuration of the disk reproduction unit shown in FIG. 3.
Figure 25:
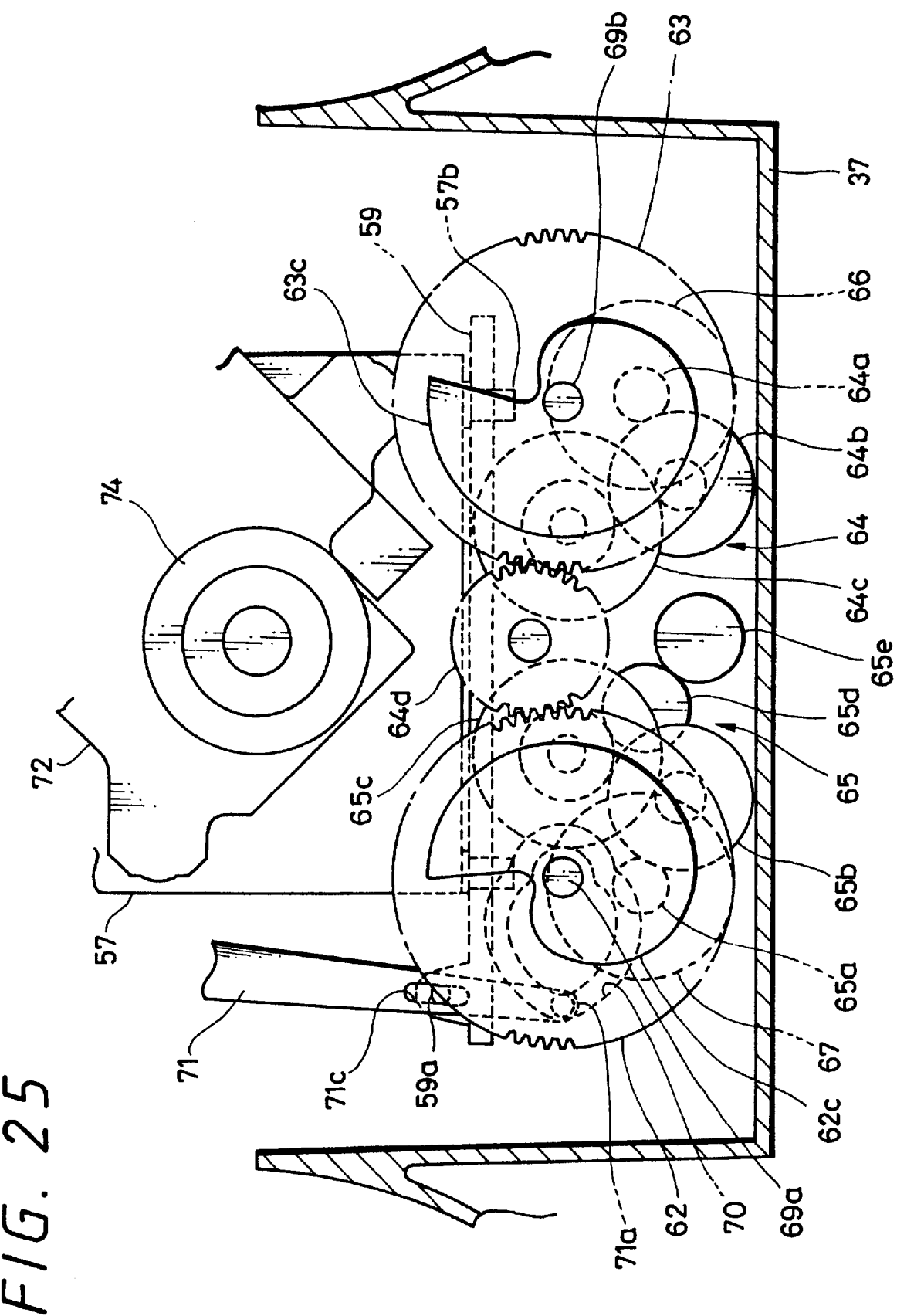
FIG. 25 is a front view showing the essential parts of the cam drive mechanism according to an embodiment of a specific configuration of the disk reproduction unit shown in FIG. 24.
Figure 26:
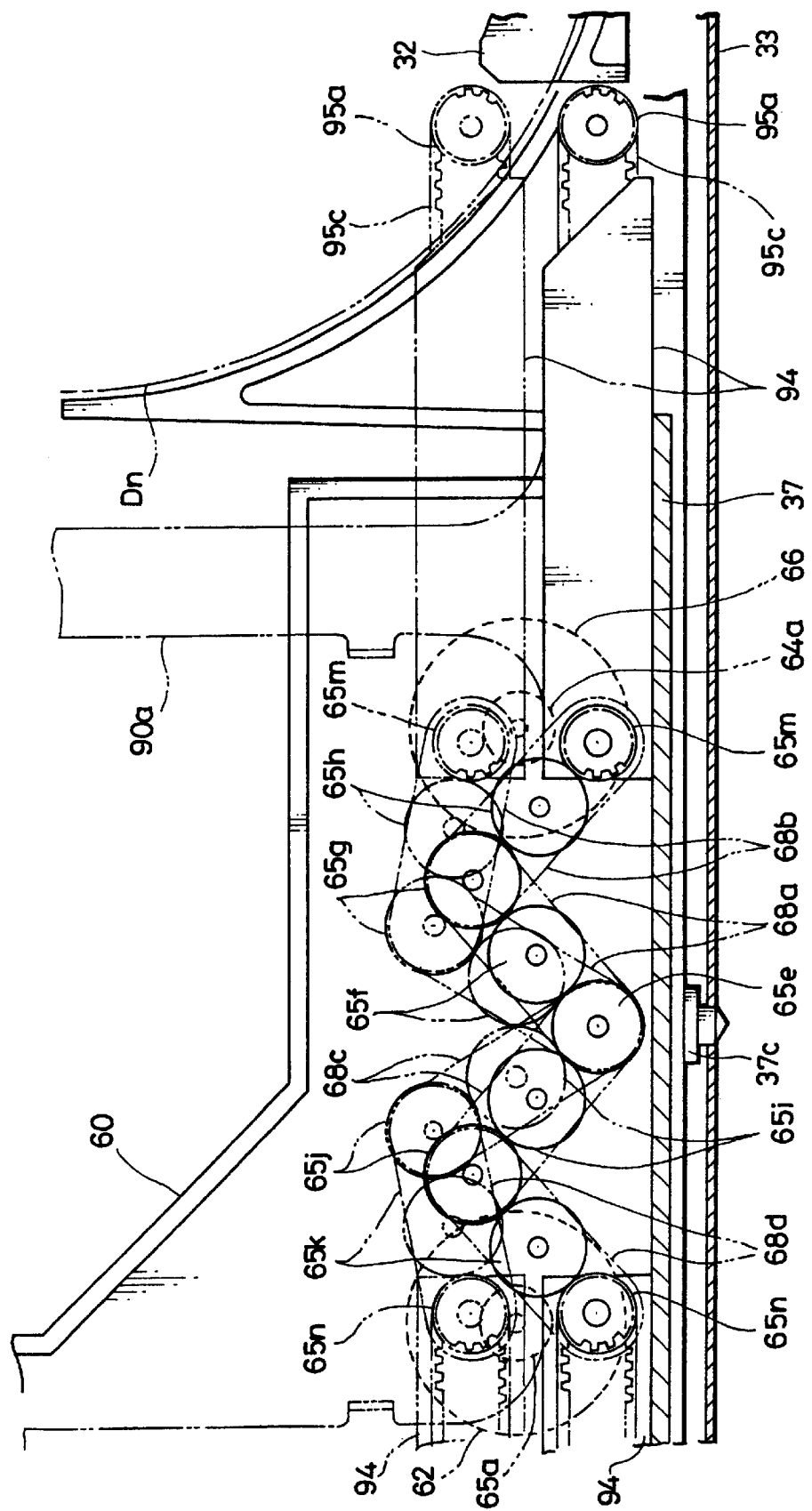
FIG. 26 is a front view showing the power transmission system for the disk conveyance mechanism according to an embodiment of a specific configuration of the disk reproduction unit shown in FIG. 6.
Figure 27:
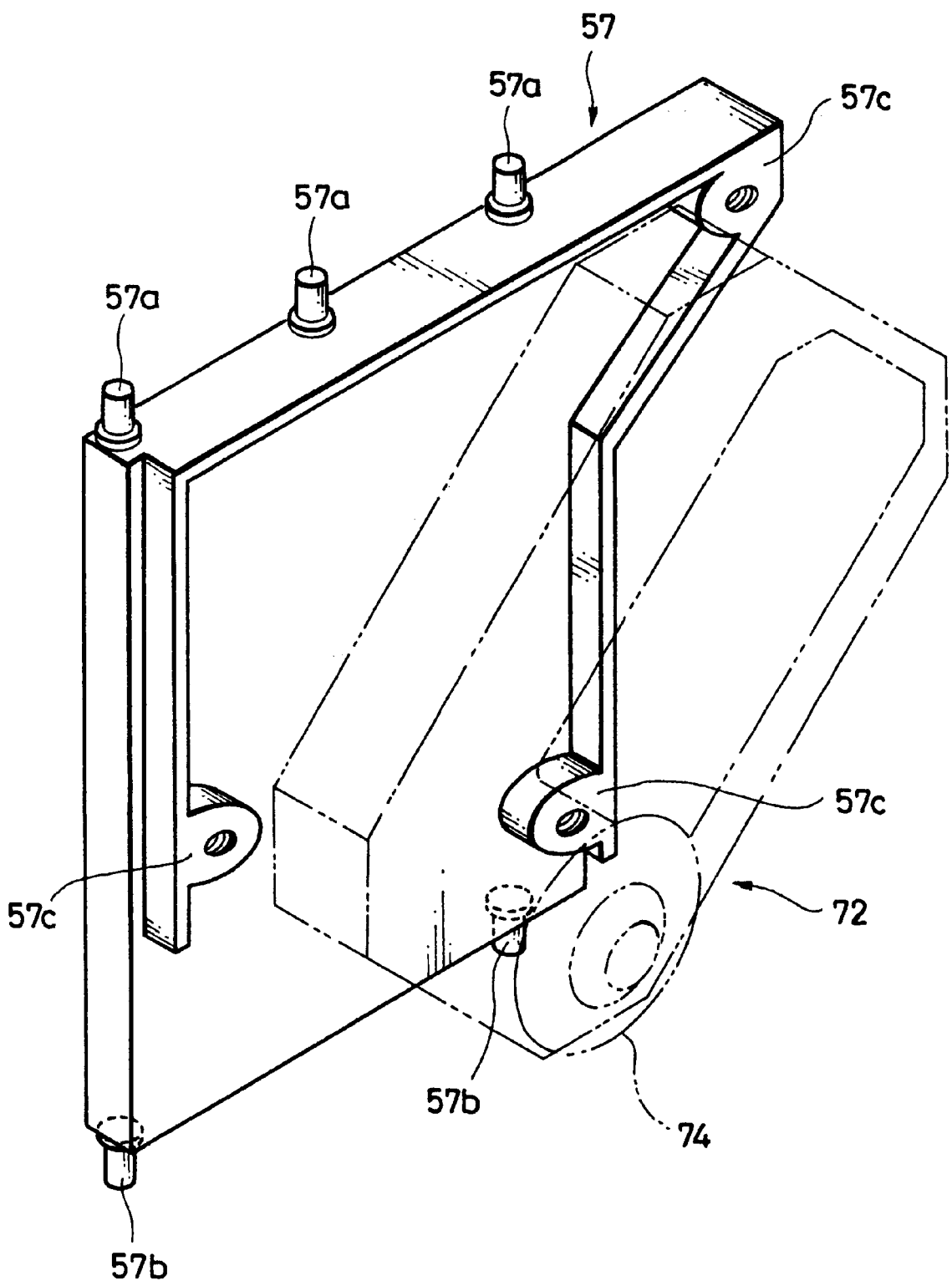
FIG. 27 is a perspective view showing the frame of the disk drive unit according to an embodiment of a specific configuration of the disk reproduction unit shown in FIG. 6.
Figure 28:
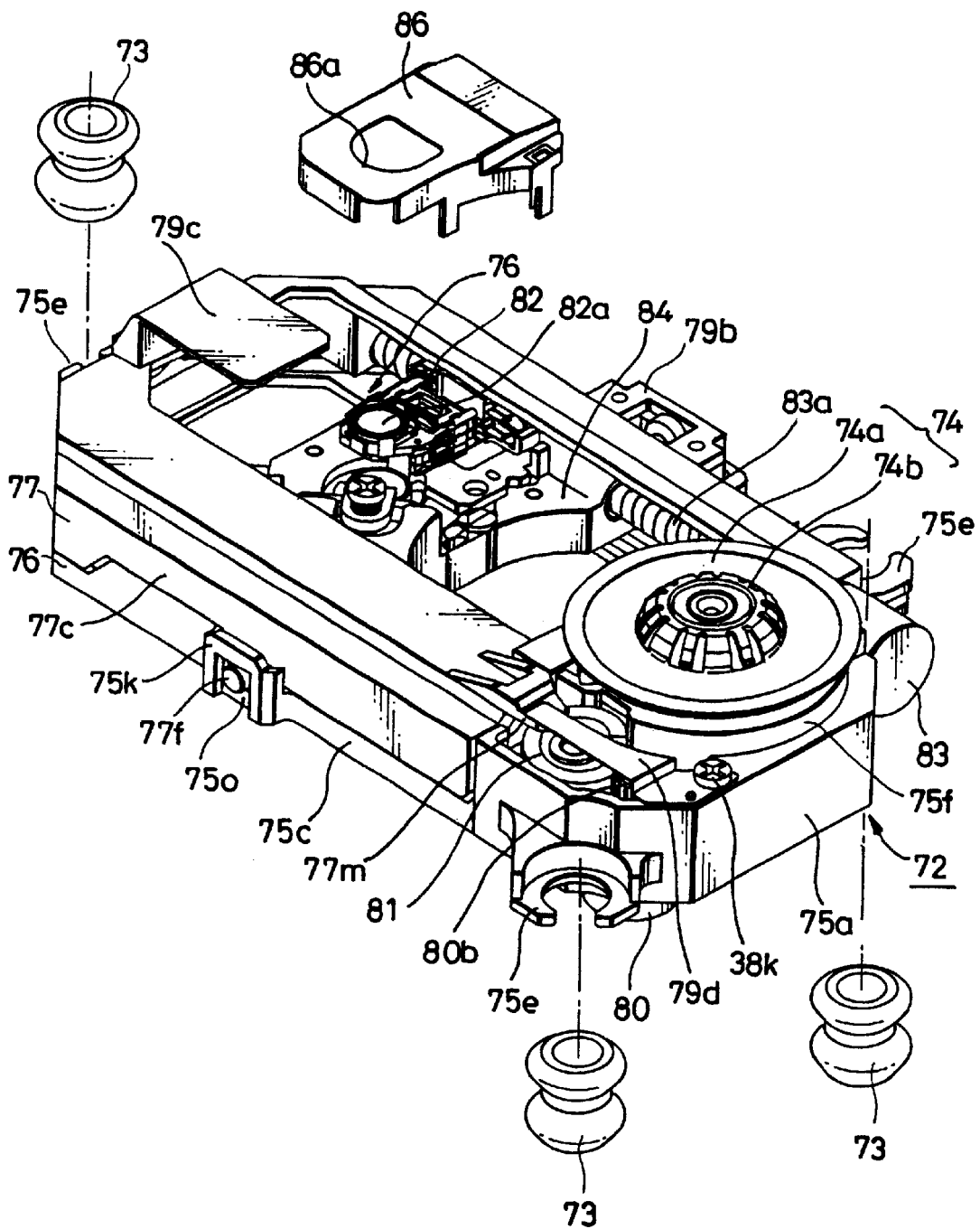
FIG. 28 is a perspective view showing the disk drive unit according to an embodiment of a specific configuration of the disk reproduction unit shown in FIG. 6.
Figure 29:
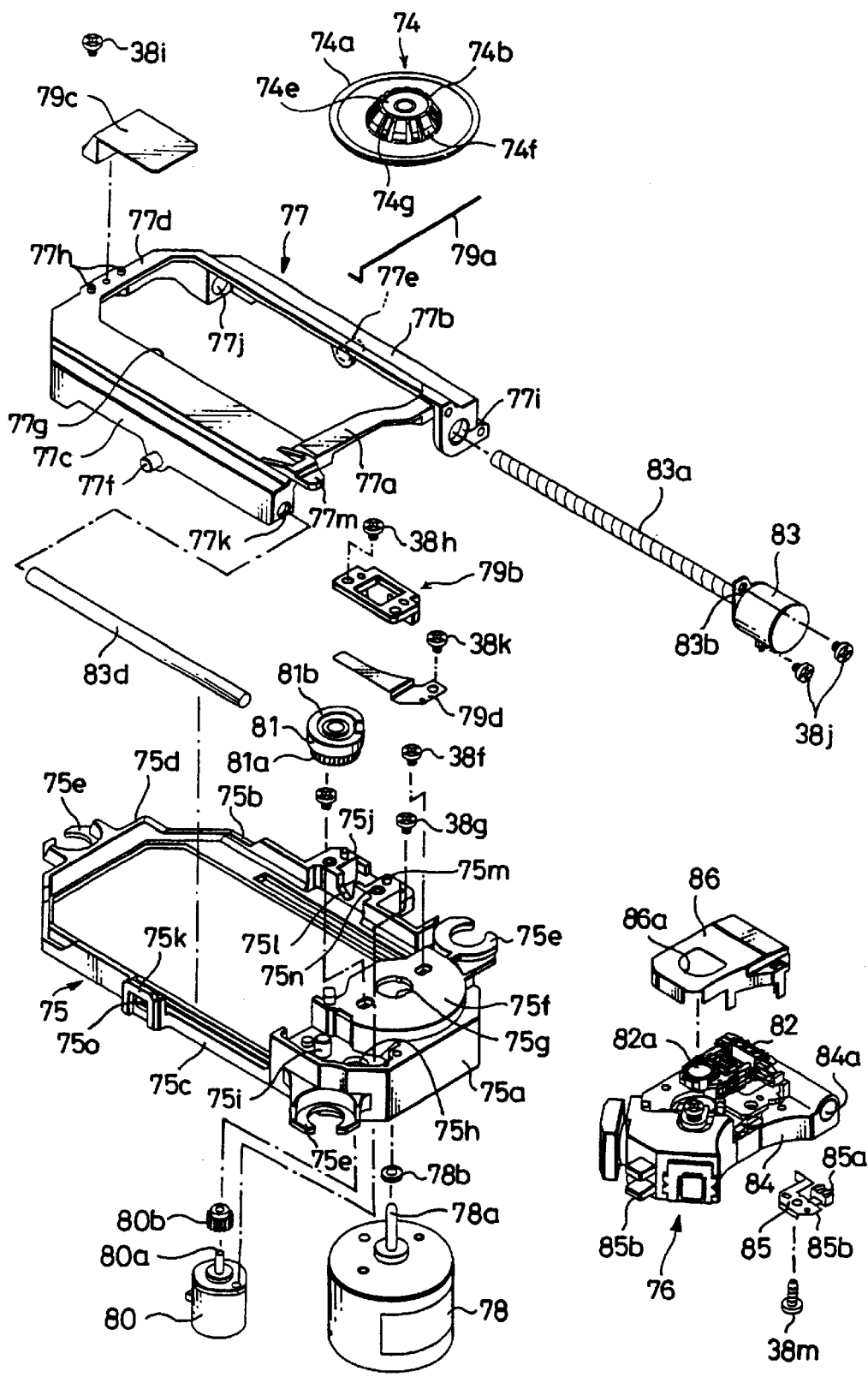
FIG. 29 is an exploded perspective view showing the disk drive unit according to an embodiment of a specific configuration of the disk reproduction unit shown in FIG. 6.
Figure 30:
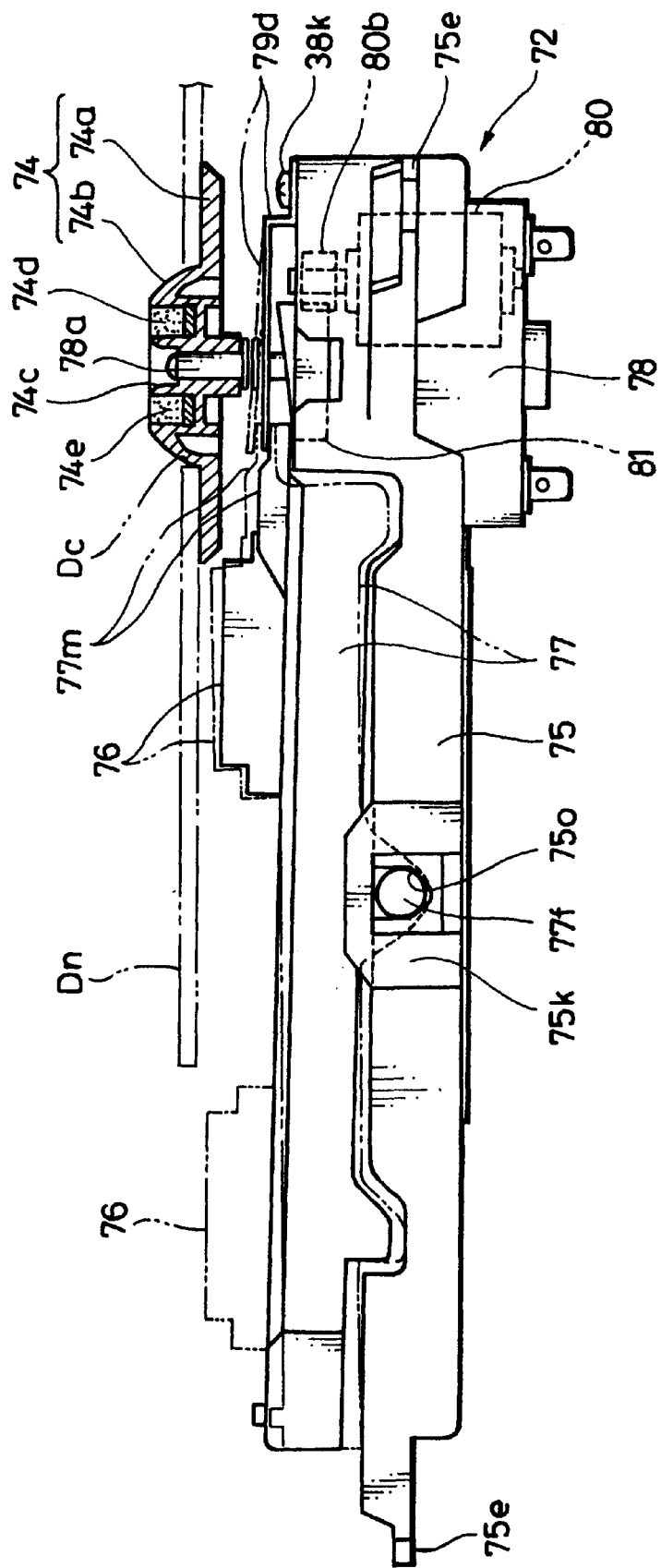
FIG. 30 is a side view showing the disk drive unit according to an embodiment of a specific configuration of the disk reproduction unit shown in FIG. 6.
Figure 31:
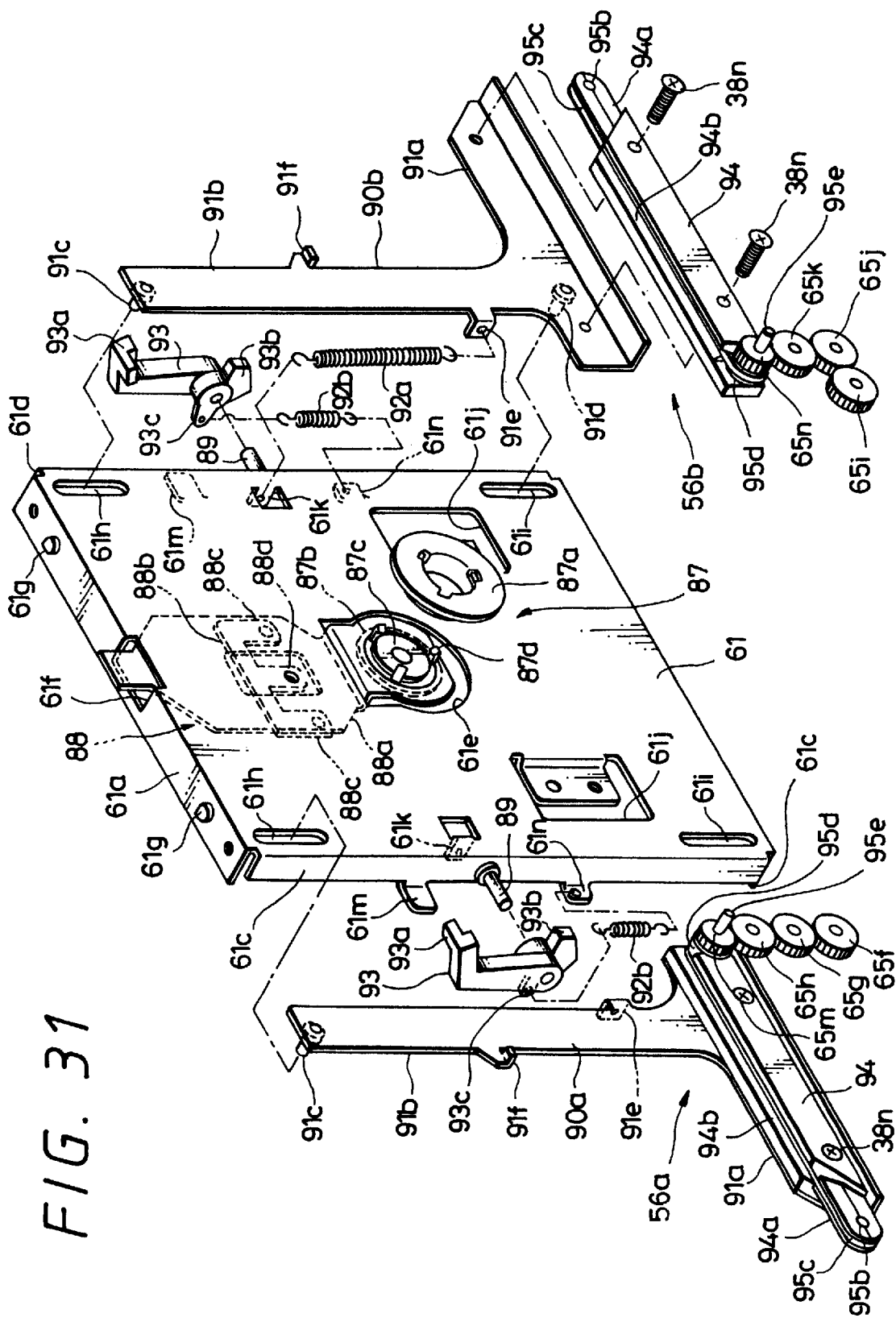
FIG. 31 is an exploded perspective view showing the disk conveyance mechanism, etc. according to an embodiment of a specific configuration of the disk reproduction unit shown in FIG. 6.
Figure 32:
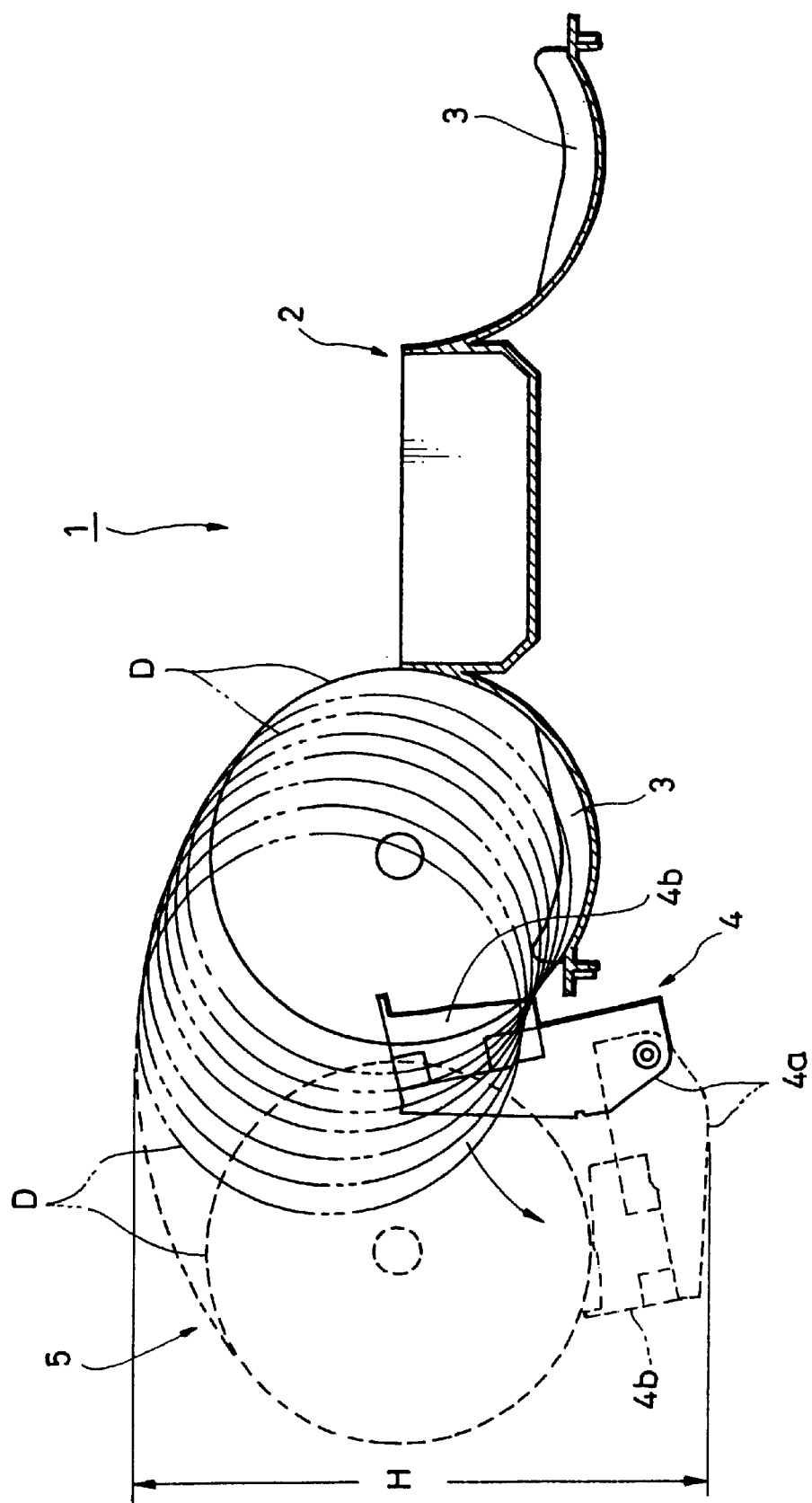
FIG. 32 is a diagram for explaining a general configuration of a conventional disk conveyance mechanism.
Figure 33:
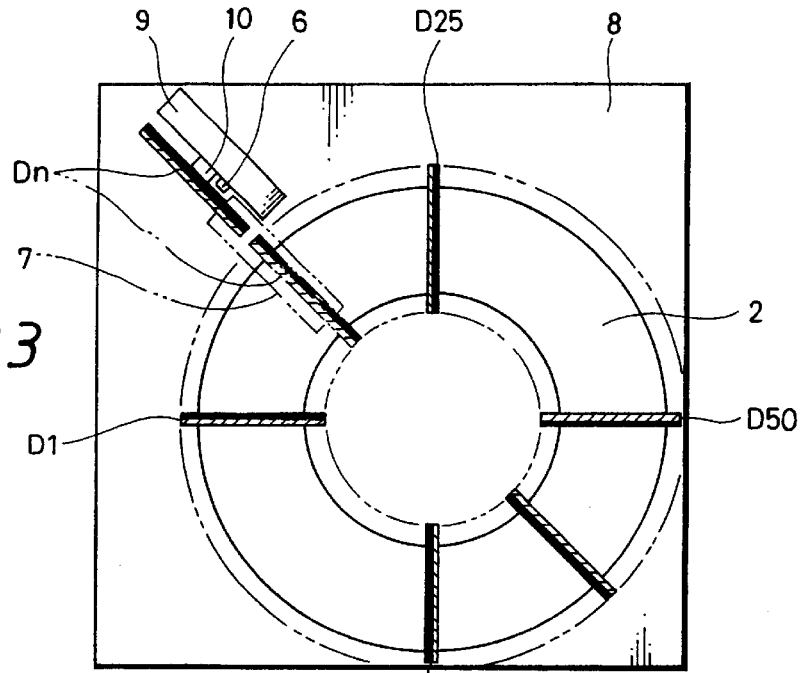
FIG. 33 illustrates a conventional disk reproducing apparatus.
Figure 34:
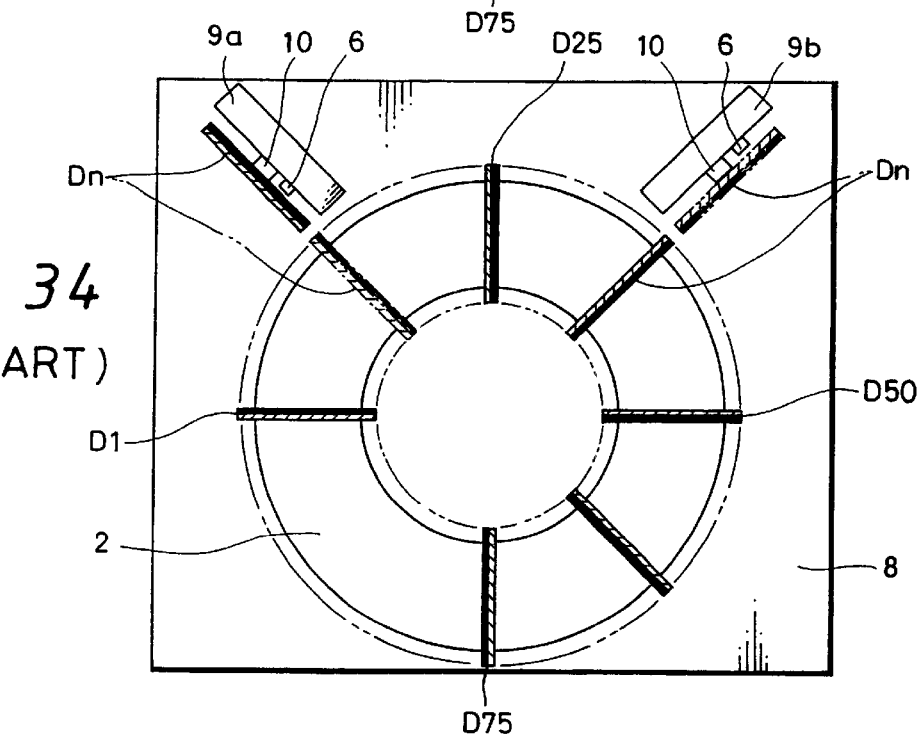
FIG. 34 illustrates another conventional disk reproducing apparatus.

Specifically, FIG. 3 is a plan view of a disk reproduction unit constituting a disk recording and/or reproduction apparatus according to an embodiment of the invention, FIG. 4 is a perspective view of the appearance of the same embodiment with the door opening, FIG. 5 is a side view of the same embodiment, FIGS. 6 to 14 are respectively sectional views as viewed from the side of the disk-like recording medium for explaining the manner in which it is loaded, FIGS. 15 to 20 are plan views for explaining the same, FIG. 21 is a sectional view showing the essential parts of the turntable of FIG. 6, etc., FIG. 22 is a side view showing a rotational drive mechanism of the turntable, FIG. 23 is a plan view thereof, FIG. 24 is an exploded perspective view showing a cam drive mechanism of a disk chucking unit, FIG. 25 is a diagram for explaining the power transmission system of the cam drive mechanism, FIG. 26 is a diagram for explaining the power transmission system of the disk conveyance means, FIG. 27 is a perspective view showing a disk drive frame for supporting the disk drive unit, FIG. 28 is a perspective view of the appearance of the disk drive unit, FIG. 29 is an exploded perspective view thereof, FIG. 30 is a side view thereof, and FIG. 31 is an exploded perspective view of the disk conveyance means.

As shown in an example of the basic configuration of FIGS. 1 and 2, the disk reproduction unit 11 of the disk recording and/or recording apparatus according to this invention is so configured as to reproduce (read) the information signal recorded using an optical disk Dn (such as a DVD (digital video disk)) constituting a specific example of the disk-like recording media in the information recording surfaces Da, Db formed on the two sides of the optical disk Dn. This disk reproduction unit 11 includes a disk-stacking turntable 12 capable of housing a multiplicity of (say, 100, 300, etc.) optical disks Dn at a time in vertical position and a main chassis 13 for rotatably supporting the turntable 12.

The turntable 12 is donut-shaped in plan view, and can accommodate optical disks Dn in vertical position along the circumferential direction thereof. One hundred disk housing units 20 are provided, for example. In the case where an optical disk Dn is housed in each disk housing unit 20, therefore, the optical disks Dn are arranged radially about the rotational center of the turntable 12. This turntable 12 is supported rotatably along the plan direction thereof substantially at the central portion of the main chassis 13 rectangular in shape.

The disk drive unit 14 for performing the reproduction operation of the optical disk Dn is arranged in the center hole 12a at the central portion of the turntable 12. This disk drive unit 14 includes a disk table 15 for chucking and rotationally driving the optical disk Dn, and an optical pickup unit 16 representing a specific example of the pickup unit mounted on the disk table 15 for reading the information signal from the optical disk Dn rotatively driven integrally therewith. The disk table 15 of the disk drive unit 14 is integrally mounted on the rotational shaft of a spindle motor (not shown) fixed at a longitudinal end of the base chassis 21 forming a frame body. Also, the optical pickup unit 16 is configured to be movable longitudinally of the base chassis 21. Specifically, the optical pickup unit 16 is movably supported on the feed shaft and the guide shaft mounted in parallel to each other on the base chassis 21. By being guided and moved by the two shafts, the optical pickup unit 16 is moved toward or away from the disk table 15. The movement of the optical pickup unit 16 moves the objective lens 16a of the optical head in radial direction along the information recording surface of the optical disk Dn.

The disk conveyance means 17 for conveying the optical disk Dn is interposed between the disk drive unit 14 and the turntable 12. The disk conveyance means 17 includes a conveyance rail 22 for connecting the inner peripheral edge of the turntable 12 in diagonal direction, a pair of disk take-out levers 23a, 23b arranged outside along the diagonal direction of the conveyance rail 22, and a disk return lever 24 arranged substantially at the central portion of the conveyance rail 22.

The disk take-out lever pair 23a, 23b are configured to protrude toward each disk housing unit 20 from the lower surface of the turntable 12. Thus, each disk housing unit 20 of the turntable 12 has a slit 26 opened radially inward. By protruding the disk take-out lever 23a (or 23b) upward of the turntable 12 through the slit 26, the optical disk Dn housed in the disk housing unit 20 is taken out and placed on the conveyance rail 22, as shown in FIG. 2.

This conveyance rail 22 includes a rail member having a guide groove 22a extending along the diagonal line toward the upper surface and is supported on the support frame 18 on which the disk drive unit 14 is mounted. This support frame 18 is fixed on the main chassis 13. Further, a disk return lever 24 is rotatably mounted on the support frame 18. This disk return lever 24 is configured to protrude into the guide groove 22a from a through hole 27 formed in the conveyance rail 22. The disk return lever 24 is rotated in the guide groove 22a, so that the optical disk Dn sent from the turntable 12 can be stopped under the disk drive unit 14 and the optical disk Dn sent from the disk drive unit 14 can be sent back to the turntable 12.

Further, by moving the disk return lever 24 upward with the optical disk Dn placed thereon, the optical disk Dn can be pushed up a predetermined amount and can be conveyed to the disk mounting portion of the disk drive unit 14. Also, the disk mounting portion receives the optical disk Dn from the disk mounting unit and lowers to the conveyance rail 22, then the disk mounting portion is rotated in a predetermined direction to push out the optical disk Dn with the turning effort thereof, thus making it possible to return the optical disk Dn in a predetermined disk housing unit.

Reference numeral 25 in FIG. 1 designates a door arranged on the front of the disk reproduction unit 11. This door 25 is arranged substantially at the central portion of a front panel not shown, and has the lower end thereof rotatably supported on the front panel by hinge means. The space portion formed by this door 25 makes up a disk entrance 27 for taking out and inserting the optical disk Dn. The disk drive unit 14 and the disk conveyance means 17 are arranged to extend longitudinally at right angles to the door 25 for opening and closing the disk entrance 27. By locating an end of the disk conveyance means 17 at a position facing the disk entrance 27 in this way, the optical disk Dn can be supplied to the disk mounting portion without rotating the turntable 12.

With the disk reproduction unit 11 having this configuration, the optical disk Dn is taken out of the disk housing unit 20 by operating the first disk take-out lever 23a arranged on one side along the diagonal direction of the turntable 12. Thus, the particular optical disk Dn is guided by the guide groove 22a of the conveyance rail 22 and moves to the central portion of the base chassis 13. Once the optical disk Dn reaches almost the central portion, it is lifted by the disk return lever 24 and conveyed to the disk mounting portion of the disk drive unit 14.

The optical disk Dn thus conveyed is mounted on the disk table 15 and rotationally driven. One of the information recording surfaces (say, surface A, Da) of the optical disk Dn is used for the reproduction operation by the optical pickup unit 16 thereby to reproduce the information signal recorded previously. Upon complete reproduction operation, the optical disk Dn involved is released from the disk table 15 and placed on the disk return lever 24. The optical disk Dn is thus returned onto the conveyance rail 22 together with the disk return lever 24, while at the same time being sent out by the rotation of the disk return lever 24 and returned into the original disk housing unit 20.

Then, the turntable 12 is rotated 180°, and the second disk take-out lever 23b arranged at the other end of the diagonal direction is activated thereby to take out the optical disk Dn from the disk housing unit 20. As a result, the optical disk Dn is guided, with the face thereof downward, along the guide groove 22a of the conveyance rail 22 and moves to the central portion of the main chassis 13. As in the case mentioned above, the optical disk Dn, after reaching almost the central portion, is lifted up by the disk return lever 24 and conveyed in similar manner to the disk mounting portion of the disk drive unit 14.

As a result, the optical disk Dn is mounted, with the face thereof downward, on the disk table 15. Under this condition, the optical disk Dn is used for the reproduction operation by the disk drive unit 14, so that the information signal previously recorded in the other information recording surface (say, surface B, Db) is reproduced. After that, upon complete reproduction, as in the case mentioned above, the optical disk Dn is released from the disk table 15 and placed on the disk return lever 24. After being returned onto the conveyance rail 22, the particular optical disk Dn is sent out by the rotation of the disk return lever 24 and returned into the original disk housing unit 20.

Now, with reference to FIGS. 3 to 31, a specific embodiment of the disk recording and/or reproduction apparatus according to this invention will be explained. This disk reproduction unit 31, as shown in FIGS. 3 to 5, includes the turntable 32, the main chassis 33, the exterior cover 34, the front panel 35, the door 36 and the table support member 37 and the like.

The main chassis 33 is formed of a metal plate frame member open to the upper surface and the front surface. The exterior cover 34 is fitted on the upper part of the main chassis 33. The main chassis 33 and the exterior cover 34 are fastened removably at a plurality of points with fixing screws 38a constituting a specific example of fixing means, thus forming a housing with an open front. The front panel 35 is mounted on the front opening of the housing, thereby making up a housing with all the six sides thereof covered.

A disk entrance 40 for taking out and inserting the optical disk Dn is formed substantially at the lateral central portion of the front panel 35. The disk entrance 40 is substantially rectangular, and adapted to be opened or closed by the door 36. The door 36 is rotatably supported at the lower end thereof on the front panel 35 by the hinge means. The door 36 is rotated about the hinge means and can selectively assume a state with the disk entrance 40 closed as shown in FIG. 3 and a state with the disk entrance 40 opened as shown in FIGS. 4 and 5, selectively. The front panel 35 has mounted thereon, though not shown, operating buttons, operating dials, other switches and a display unit such as a liquid crystal monitor, etc, as required.

Also, legs 41 with adjustable height are mounted at the four corners-of the lower surface of the main chassis 33. A table support member 37 is mounted by fixing means such as fixing screws on the upper surface substantially at the central portion of the main chassis 33. This table support member 37 includes a cylindrical member with a sharp top having an accommodation hole 37a at the central portion thereof. A curved portion 37b formed along the contour of the optical disk Dn is formed along the outer peripheral surface of the table support member 37. A positioning shaft portion 37c is arranged, as shown in FIGS. 6 to 14, at the central portion of the lower surface of the table support member 37. This positioning shaft 37c is fitted in the reference hole of the main chassis 33 thereby to set the table support member 37 in position with respect to the main chassis 33, so that the table support member 37 is set substantially at the central portion thereof.

Inner support rollers 42 for supporting the inner peripheral edge of the turntable 32 from underside are arranged at three points at the tail of the table support member 37. As shown in FIG. 3, the three inner support rollers 42 are arranged at equal angular intervals along the circumferential direction. As shown in FIG. 21, the inner support rollers 42 are supported rotatably in the horizontal direction by support pins 37d arranged on the table support member 37. An outer flange 42a is protruded radially outward under the outer peripheral edge of the inner support rollers 42. The inner peripheral edge of the turntable 32 is placed on the outer flange 42a of the inner support rollers 42.

Further, as shown in FIG. 3, a sensor mounting member 37e is protruded outward at the tail of the table support member 37. The sensor mounting member 37e includes a position detection sensor 43a and an address detection sensor 43b for controlling the rotational position of the turntable 32. The detection sensors 43a, 43b will be described in detail later.

The turntable 32 is formed in donut-shape in plan view and has 300 disk housing units 45 on the upper surface thereof. The 300 disk housing units 45 are arranged at equal angular intervals in the circumferential direction of the turntable 32 and has a radial arrangement as a whole. Each disk housing unit 45 is formed of a slit-like recess. The width of each disk housing unit 45, therefore, is set somewhat larger than the thickness of the optical disk Dn to be housed therein. As shown in FIG. 21, the bottom portion of the disk housing unit 45 is formed in concave arcuate form conforming with the outer peripheral edge of the optical disk Dn.

The outer peripheral edge of the turntable 32 is continuously formed with an outer peripheral ring portion 32a along the circumference. This outer peripheral ring portion 32a is supported from underside by six outer support rollers 46 arranged outside of the turntable 32. As shown in FIG. 3, the six outer support rollers 46 are arranged at appropriate intervals in the circumferential direction. Each outer support roller 46 is rotatably supported by the roller support member 47. Each roller support member 47 is composed of a bracket having a laterally protruded support pin 47a. The outer support roller 46 is rotatably mounted at the forward end of the support pin 47a. The roller support members 47 are mounted on the main chassis 33 by fixing means such as fixing screws 38b.

Further, annular protrusions 48a, 48b for the two sensors are arranged concentrically inside of the outer peripheral ring portion 32a of the turntable 32. Of these annular protrusions 48a, 48b, the first annular protrusion 48a located outside is formed with 300 slits which is the same number as the disk housing units 45. These 300 slits are arranged at equal angular intervals in positions corresponding to the 300 disk housing units 45. The position detection sensor 43a is mounted on the sensor mounting member 37e in a position corresponding to the first annular protrusion 48a.

Also, as many slits as the addresses each indicating an appropriate address number of disk housing units 45 are formed in the second annular protrusion 48b located inside. These addresses can be set as ten addresses, for example, by classifying the 300 disk housing units 45 into ten sections. The address detection sensor 43b is mounted on the sensor mounting member 37e in a position corresponding to the second annular protrusion 48b. By detecting the position of the turntable 32 with these detection sensors 43a, 43b, the position of the turntable 32 can be accurately controlled.

Further, as shown in FIG. 21, a table gear 49 covering the whole circumference of the outer peripheral surface of the outer peripheral ring portion 32a of the turntable 32 is integrally provided therewith. This table gear 49 includes a table rotation drive mechanism 50 for rotationally driving the turntable 32. This table rotation drive mechanism 50, as shown in FIGS. 22 and 23, includes a table drive motor 51, a gear train 52 having a plurality of gears and a support bracket 53. The table drive motor 51 is placed and fixed on the support bracket 53. The support bracket 53 bent in crank form is fixed on the main chassis 33 by a plurality of fixing screws 38c representing a specific example of fixing means.

The gear train 52 of the table rotation drive mechanism 50 includes an output gear 52a, three intermediate gears 52b to 52d having a small-diameter portion and a large-diameter portion, and a drive gear 52e. The output gear 52a is fixed on the rotational shaft of the table drive motor 51, and in mesh with the large diameter portion of the first intermediate gear 52b. The small diameter portion of the first intermediate gear 52b is in mesh with the large diameter portion of the second intermediate gear 52c, and the small diameter portion of the second intermediate gear 52c is in mesh with the large diameter portion of the third intermediate gear 52d. Further, the small diameter portion of the third intermediate gear 52d is in mesh with the drive gear 52e, which in turns is in mesh with the table gear 49. The first to third intermediate gears 52b to 52d and the drive gear 52e are supported rotatably on the four gear shafts 54a to 54d, respectively, erected on the support bracket 53.

As shown in FIGS. 3 and 6 to 20, the disk drive unit 72 and the disk conveyor 56 as a disk conveyance means are arranged in the accommodation hole 37a of the table support member 37 inserted in the center hole 32b of the turntable 32. The disk drive unit 72 is supported on the base frame 60 through a disk drive frame 57 and upper and lower slide plates 58, 59. Also, the disk conveyor 56 includes a front conveyance mechanism 56a and a rear conveyance mechanism 56b in tandem. These front and rear conveyance mechanism pair 56a, 56b are supported vertically movably on the plate frame 61.

As shown in FIG. 24, the base frame 60 is L-shaped as viewed from the front, and includes a base portion 60a extending laterally and a rise portion 60b continuously protruded upward from one side of the base portion 60a. By rimming the front periphery of the base portion 60a and the rise portion 60b, the base frame 60 makes up a frame member. A rack 60c extending horizontally is arranged at the upper rear part of the base portion 60a. This rack 60c has a lower slide plate 59 slidably placed thereon.

Within the framework of this base frame 60, a plurality of gears 64a to 64d making up a cam gear train 64 for rotationally diving a pair of cam gears 62, 63, and a plurality of gears 65a to 65d making up a loading gear train 65 for activating a pair of conveyance mechanisms 56a, 56b in tandem are accommodated. A cam drive motor 66 and a loading motor 67 providing a drive source for generating the power for driving the cam gear train 64 and the loading gear train 65 are mounted on the back side of the base frame 60.

The cam drive motor 66 and the loading motor 67 are arranged in juxtaposition at a predetermined interval. The rotary shafts of the motors 66, 67 are protruded forward of the base frame 60 through the base portion 60a. The rotary shafts have mounted thereon output gears 64a and 65a, respectively. A first output gear 64a, two intermediate gears 64b, 64c and a cam drive gear 64d make up the cam gear train 64. Also, a second output gear 65a, three intermediate gears 65b, 65c, 65d, a drive gear 65e, six movable gears 65f, 65g, 65h, 65i, 65j, 65k and two belt drive gears 65m, 65n make up the loading gear train 65.

As shown in FIG. 25, etc., the two intermediate gears 64b, 64c of the cam gear train 64 each have a large diameter portion and a small diameter portion, and the large diameter portion of the the first intermediate gear 64b is in mesh with the first output gear 64a. The small diameter portion of the first intermediate gear 64b is in mesh with the large diameter portion of the second intermediate gear 64c, and the small diameter portion of the second intermediate gear 64c is in mesh with the cam drive gear 64d. The two intermediate gears 64b, 64c and the cam drive gear 64d are rotatably supported on the gear support shaft protruded forward from the base portion 60a of the base frame 60.

Also, the two intermediate gears 65b, 65c of the loading gear train 65 each have a large diameter portion and a small diameter portion. The large diameter portion of the first intermediate gear 65b is in mesh with the second output gear 65a. The small diameter portion of the first intermediate gear 65b is in mesh with the large diameter portion of the second intermediate gear 65c. The small diameter portion of the second intermediate gear 65b is in mesh with the third intermediate gear 65d. The third intermediate gear 65d is in mesh with the drive gear 65e.

Further, the drive gear 65e of the loading gear train 65 is in mesh with the front and rear first movable gears 65f, 65i. These front and rear first movable gears 65f, 65i distribute the power transmission forward and rearward directions. The first movable gear 65f is in mesh with the second movable gear 65g, and the rear first movable gear 65i is in mesh with the rear second movable gear 65j. Further, the front second movable gear 65g is in mesh with the front third movable gear 65h, and the rear second movable gear 65j is in mesh with the third movable gear 65k. The front third movable gear 65h is in mesh with the front belt drive gear 65m, and the rear third movable gear 65k is in mesh with the rear belt drive gear 65n.

The three intermediate gears 65b, 65c, 65d and the drive gear 65e of the loading gear train 65 are rotatably supported on the gear support shaft protruding forward from the base portion 60a of the base frame 60. Also, as shown in FIG. 26, etc., an end of a pair of first coupling plates 68a, 68c is coupled rotatably to the gear support shaft for supporting the drive gear 65e.

The front first coupling plate 68a extends forward, and the front movable gear 65f is rotatably supported in the longitudinally intermediate portion of the front first coupling plate 68a. An end of the front second coupling plate 68b, together with the front second movable gear 65g, is coupled rotatably to the other end of the front first coupling plate 68a. The front third movable gear 65h is supported rotatably in the longitudinally intermediate portion of the front second coupling plate 68b. The other end of the front second coupling plate 68b is supported rotatably on the support shaft for rotatably supporting the front belt drive gear 65m.

The rear first coupling plate 68c extends rearward, and the rear first movable gear 65i is rotatably supported on the longitudinally intermediate portion of the rear first coupling plate 68c. An end of the rear second coupling plate 68d, together with the rear second movable gear 65j, is rotatably coupled to the other end of the rear first coupling plate 68c. The rear third movable gear 65k is rotatably supported in the longitudinally intermediate portion of the rear second coupling plate 68d. The other end of the rear second coupling plate 68d is rotatably supported on the support shaft for rotatably supporting the rear belt drive gear 65n.

Also, the cam drive gear 64d of the cam gear train 64 is in mesh with a pair of cam gears 62, 63. Thus, the cam gear pair 62, 63 are rotationally driven in the same direction in accordance with the rotational direction of the cam drive gear 64d. The cam gear pair 62, 63 are arranged at laterally symmetric positions, and are rotatably supported on the support shafts 69a, 69b, respectively, protruded forward of the base portion 60a. The cam gear pair 62, 63 are stopped by stop screws 38d screwed to the support shafts 69a, 69b.

These cam gears 62, 63 include disk-like gear portions 62a, 63a and cam portions 62b, 63b, respectively, protruded from one surface of the gear portions 62a, 63a. The cam portions 62b, 63b of the cam gears 62, 63 are laterally symmetric with each other and have the outer peripheral surface thereof formed with spiral cam surfaces 62c, 63c. The cam surfaces 62c, 63c are in sliding contact with the guide pin of the disk conveyance units described later. Thus, the front and rear disk conveyance units are driven reciprocally in vertical direction by an amount equal to the radial displacement (stroke) of the cam surfaces 62c, 63c.

Also, as shown in FIGS. 6 and 24, the surface of the first cam gear 62 far from the cam portion 62b is formed with a cam slot 70 continuously along the circumferential direction. This cam slot 70 includes a circumferential cam portion 70a set in the range of about 180 on the inner peripheral portion in radial direction and a displacement cam portion 70b including a curve extending radially outward from an end of the circumferential cam portion 70a and returning to the original inner peripheral portion. The maximum displacement portion of the displacement cam portion 70b is set to have an angle of about 90° with the stepped portion of the cam portion 62b. A cam copy pin 71a is slidably in mesh with the cam slot 70 of the first cam gear 62.

This cam copy pin 71a is protruded forward from an end of a swing lever 71. The swing lever 71 extends vertically and at the intermediate portion in the longitudinal direction thereof, is rotatably supported on the rise portion 60b of the base frame 60 by mounting means such as a mounting screw 38e.

An upper engaging hole 71b is formed at the upper end of the swing lever 71. Further, a lower engaging hole 71c extending longitudinally is formed between the cam copy pin 71a of the swing lever 71 and the mounting screw 38e. Through holes 60d, 60e extend horizontally in the rise portion 60b in positions corresponding to the upper and lower engaging holes 71b, 71c, respectively.

An upper engaging pin 58a on an upper slide plate 58 is inserted in the upper through hole 60d. This upper engaging pin 58a is rotatably in mesh with the upper engaging hole 71b of the swing lever 71. Also, a lower engaging pin 59a of the lower slide plate 59 is inserted in the lower through hole 60e. This lower engaging pin 59a is rotatably in mesh with the lower engaging hole 71c of the swing lever 71. With the swing motion of the swing lever 71, the upper engaging pin 58a is guided by the upper through hole 60d and moves laterally. In similar manner, the swing motion of the swing lever 71 causes the lower engaging pin 59a to be guided by the lower through hole 60e and move laterally in the direction opposite to the upper engaging pin 58a.

The lower slide plate 59 is slidably placed on the rack 60c of the base frame 60. This lower slide plate 59 is made of a thin elongate plate member and has a lower engaging pin 59a protruded forward from the rise member 59b at a longitudinal end thereof. The lower slide plate 59 is formed with a pair of lower guide slots 59c, 59c at predetermined intervals in longitudinal direction. The lower guide slot 59c includes a parallel portion formed on one transverse side and an obliquely inclined portion connected to an end of the parallel portion near the lower engaging pin 59a. A pair of lower guide pins 57b, 57b arranged on the lower end surface of the disk drive frame 57 are slidably in mesh with the lower guide slot pair 59c, 59c.

The disk drive frame 57, as shown in FIG. 27, is configured of a screen-like member having an upper wide portion. A set of three upper guide pins 57a are arranged on the upper end surface of the disk drive frame 57, while a pair of lower guide pins 57b are arranged on the lower end surface. A unit support portion 57c for supporting the drive unit 72 representing a specific example of the disk drive unit is arranged at three points including the upper, left and right side portions on the front surface of the disk drive frame 57. Through three insulators 73 in contact with the unit support portions 57c, the drive unit 72 is elastically supported by the disk drive frame 57. The insulators 73, as shown in FIG. 28, are formed of a rubber-like elastic material such as rubber or plastics in the shape of a gourd.

The upper slide plate 58 is slidably placed at the upper part of the disk drive frame 57. This upper slide plate 58 is also made of a thin elongate plate member. The upper engaging pin 58a is protruded forward from the rise member 58b arranged at a longitudinal end of the upper slide plate 58. The upper slide plate 58 is formed with a set of three upper guide grooves 58c, 58c at predetermined intervals in longitudinal direction. Each upper guide groove 58c includes a parallel portion formed on one transverse side, and an inclined portion connected to an end of the parallel portion far from the upper engaging pin 58a and extending obliquely. The upper guide groove set 58c to 58c are slidably in mesh with a set of three upper guide pins 57a to 57a formed on the upper end surface of the disk drive frame 57, respectively.

The parallel portion of the upper guide groove 58c and the parallel portion of the lower guide groove 59c are set to coincide with each other on the extensions thereof. Also, the inclined portion of the upper guide groove 58c and the inclined portion of the lower guide groove 59c cross each other.

Figure 7:
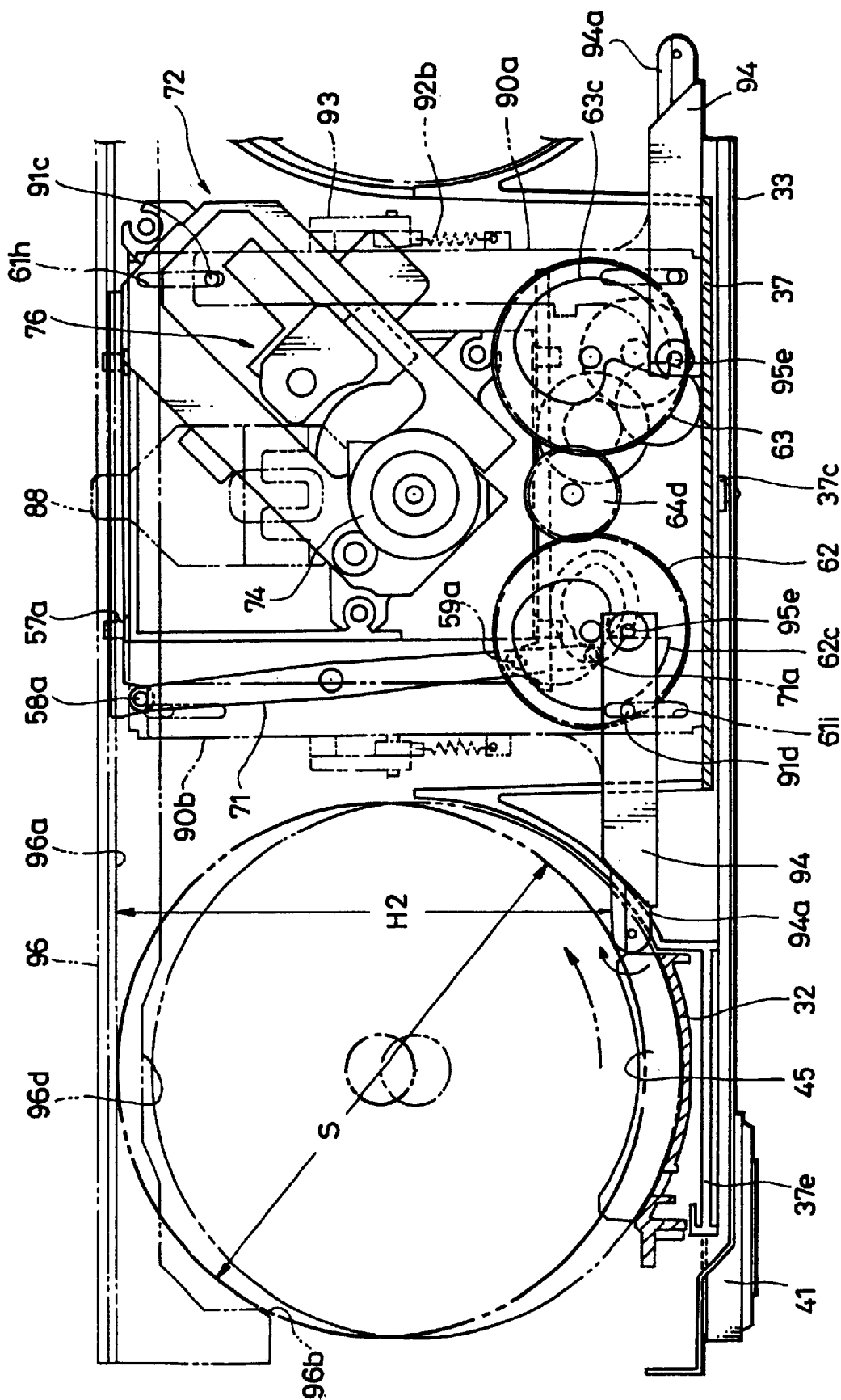
FIG. 7 is a sectional view for explaining a rear disk lifted up for disk loading, according to an embodiment of a specific configuration of a disk reproduction unit of a disk recording and/or reproduction apparatus according to this invention.

In this way, as long as the swing lever 71 is inclined rightward as shown in FIG. 6, the upper and lower guide pins 57a, 57b are located at the forward end of the inclined portions of the upper and lower guide grooves 58c, 59c, respectively. Thus, the disk drive frame 57 is located at a position retreated from the plate frame 61. In the process, the disk table of the drive unit 72 is in non-chucking mode. In the case where the swing lever 71 is inclined leftward as shown in FIG. 7, in contrast, the upper and lower guide pins 57a, 57b are located on the parallel portions of the upper guide grooves 58c, 59c, respectively. Thus, the disk drive frame 57 is located at a forward position nearer to the plate frame 61. At this time, the disk table is in chucking mode.

The drive unit 72 mounted on the disk drive frame 57 operated reciprocally in this way has a configuration as shown in FIGS. 28 to 30. Specifically, the drive unit 72 includes a spindle chassis 75 rotatably supporting the disk table 74 having mounted thereon the optical disk Dn used for reproducing the information signal, and a pickup chassis 77 for movably supporting the optical pickup unit 76 representing a specific example of the pickup unit for reading the information signal from the optical disk Dn mounted on the disk table 74. This spindle chassis 75 and the pickup chassis 77 make up a base chassis.

The spindle chassis 75, as shown in FIG. 29, includes a frame-like member having a front member 75a, left and right side members 75b, 75c and a rear member 75d. Only the front member 75a has a height about twice that of the remaining members. A support portion 75e for supporting the insulators 73 is arranged at a total of three points including one of the corners of the front member 75a, the front end of the side member 75b located on the side far from the front member 75a, and about the central portion of the rear member 75d. Each support portion 75e is a C-shaped pawl-like portion in plan view, and the bound portion of the insulator 73 is inserted in the support portion 75e. A fixing screw not shown is inserted into the insulator 73 from above, and the threaded forward portion thereof is screwed into a threaded hole formed in the unit support portion 57c. Thus, the drive unit 72 is elastically supported on the disk drive frame 57 through the three insulators 73.

Also, a motor mount 75f is arranged on the front member 75a of the spindle chassis 75 by expanding a portion thereof upward. The spindle motor 78 is mounted on the inside of the motor mount 75f, and integrally fixed by a plurality of fixing screws 38f. The rotational shaft 78a of the spindle motor 78 is protruded upward of the spindle chassis 75 through the through hole 75g of the motor mount 75f. An offset washer 78b is fixedly fitted at the intermediate portion of the rotational shaft 78a. The disk table 74 is fixedly fitted in the upper part of the offset washer 78b.

This disk table 74 has an integrated configuration including a mounting portion 74a where the peripheral edge portion of the center hole Dc of the optical disk Dn is placed and a fitting portion 74b fitted in the center hole Dc. The mounting portion 74a of the disk table 74 is in the shape of a disk having a diameter slightly larger than that of the center hole Dc of the optical disk Dn. The fitting portion 74b is protruded from one side of the central portion of the mounting portion 74a. The height of the fitting portion 74b is slightly larger than the thickness of the optical disk Dn.

The fitting portion 74b of the disk table 74 has substantially a shape of a tapered cone having a boss 74c at the central portion thereof thereby to form an annular recess. The rotary shaft 78a of the spindle motor 78 is inserted in the hole of the boss 74c, so that the disk table 74 is fixed by pressure or other fixing means integrally in the direction of rotation. An annular yoke plate 74d and a magnet 74e are placed in the recess of the fitting portion 74b. Further, a plurality of fixing members 74f arranged radially of the boss 74c and a plurality of elastic members 74g radially arranged and interposed between the adjoining fixing members 74f are configured along the outer periphery of the fitting portion 74b.

The fixing members 74f and the elastic members 74g are arranged alternately at predetermined angular intervals along the circumferential direction. Each fixing member 74f is configured to secure an appropriate rigidity with a sufficient thickness to accurately guide the center hole Dc of the optical disk Dn. In contrast, the elastic member 74g has a free end on the side thereof nearer to the mounting portion 74a and has an appropriately small thickness to secure elasticity. The free end of the elastic member 74g is pressure fitted at a plurality of points along the inner peripheral surface of the center hole Dc thereby to set the optical disk Dn in position. Reference numeral 79a in FIG. 29 designates an offset spring for restricting the movement of the rotary shaft 78a in axial direction. This offset spring 79a is set to cross the motor mount 75f, and has an intermediate portion thereof in mesh with the offset washer 78b while the two ends thereof engage the motor mount 78f.

A tilt motor 80 is mounted in juxtaposition with the spindle motor 78 on the inside of the motor mount 78f. This tilt motor 80 is integrated fixedly by a fixing screw 38g. The rotary shaft 80a of the tilt motor 80 is protruded upward of the spindle chassis 75 through the hole 75h of the motor mount 75f. A tilt gear 80b is fixedly fitted on the rotary shaft 80a of the tilt motor 80. The tilt gear 80b is in mesh with the gear portion 81a of the tilt cam 81. The tilt cam 81 is rotatably supported on the support shaft 75i erected on the upper surface of the front member 75a. A spirally extending cam surface 81b is formed on the upper surface of the tilt cam 81, so that the pickup chassis 77 is vertically swung by an amount corresponding to the stroke along the height of the cam surface 81b.

Also, the side members 75b, 75c and the rear member 75d of the spindle chassis 75 have a section thereof formed in the shape of L over substantially the whole length. This sectional structure increases the rigidity of the spindle chassis 75 as a whole. Further, a pair of laterally expanding bearings 75j, 75k are arranged at almost the central portion in the longitudinal direction of the side members 75b, 75c. The first and second bearings 75j, 75k rotatably hold a pair of axial portions 77e, 77f arranged on the pickup chassis 77.

The first bearing portion 75j includes a box-shaped housing expanded outward considerably and having an open upper surface. A V-shaped bearing surface 75l is arranged in the housing. A positioning pin 75m and a threaded hole 75n are formed on the upper surface of the first bearing 75j. The shaft 77e of the pickup chassis 77 is placed on the bearing surface 75l of the first bearing 75j. By pressing the shaft 77e with a holding member 79b from above, the shaft 77e is stopped. The holding member 79b is fixed on the upper surface of the first bearing 75j by a fixing screw 38h.

The second bearing 75k has a gate-shaped frame member slightly expanding outward and an internal V-shaped bearing surface 75o. On the bearing surface 75o of the second bearing 75k, the other shaft 77f of the pickup chassis 77 is placed. The shaft 77f is inserted between the bearing surface 77a and the frame member thereby to support rotatably while stopping the removal of the shaft 77f.

The pickup chassis 77 has substantially the same shape and the same size as the spindle chassis 75 lacking the front member 75a in plan view. Specifically, the pickup chassis 77 is arranged rearward of the front member 75a of the spindle chassis 75, and is formed of a frame-like member including a front member 77a adjoining the front member 75a, a pair of side members 77b, 77c in laterally opposed relation to each other, and a rearwardly connected rear member 77d. Inside the frame-like member, an opening 77g is formed through which the optical head 82 of the optical pickup unit 76 is arranged.

The side members 77b, 77c and the rear member 77d except for the front member 77a of the pickup chassis 77 have an L-shaped section over substantially the whole length. This sectional structure improves the rigidity of the pickup chassis 77 as a whole. The height of the side members 77b, 77c and the rear member 77d is set substantially the same as that of the side member 75b, etc. of the spindle chassis 75. Thus, when the pickup chassis 77 and the spindle chassis 75 are overlapped with each other at a predetermined position, the overlapped portion assumes substantially the same height as the front member 75a of the spindle chassis 75.

The front member 77a of the pickup chassis 77, on the other hand, is formed tabular in such a manner as to couple the left and right side members 77b, 77c only by the upper surface thereof. The upper surface of the front member 77a is inclined horizontally in the direction of extension with the side member 77b side lower than the other side. By providing an inclined surface of the front member 77a of the pickup chassis 77 in this way, the number of parts can be reduced as compared with the conventional drive unit and the assembly efficiency is improved thereby facilitating the assembly work.

Also, as shown in FIG. 29, a positioning protrusion 77h is formed on the upper surface of the rear member 77d of the pickup chassis 77. With this positioning protrusion 77h, a shield plate 79c is fixedly fastened on the rear member 77d with a fixing screw 38i. This shield plate 79c has a substantially L-shaped section and covers the upper part of the optical head 82, especially an objective lens 82a, of the optical pickup unit 76 in its outermost position.

Further, an insertion hole 77i is formed in the front edge of the side member 77b of the pickup chassis 77. A bearing 77j is arranged at the rear end of the side member 77b in a position corresponding to the insertion hole 77i. A bearing member of a feed motor 83 is fitted in the insertion hole 77i. The forward end of the feed shaft 83a inserted in the insertion hole 77i is rotatably supported on the bearing 77j. This feed shaft 83a constitutes the rotary shaft of the feed motor 83. A spirally threaded groove is formed on the outer peripheral surface of the feed shaft 83a, which itself constitutes the rotor of the feed motor 83. This feed motor 83 is fixed at the front edge of the side member 77b and protruded forward of the pickup chassis 77 by fastening the bracket 83b making up a fixing member with two fixing screws 38j.

Also, a guide shaft 83d is mounted on the inside of the other side member 77c of the pickup chassis 77 in parallel to the feed shaft 83a. As a result, a pair of insertion holes 77k are arranged in the front and rear edges of the side member 77c. The guide shaft 83d is supported in the pickup chassis at the ends thereof inserted under pressure in the insertion holes 77k.

The optical pickup unit 76 movably supported by the feed shaft 83a and the guide shaft 83d are adapted to move toward or away from the disk table 74 by being guided by the shafts 83c, 83d. This optical pickup unit 76 has a slide member 84 carrying the optical head 82. A bearing hole 84a is formed in one side of the slide member 84, and the feed shaft 83a is slidably inserted in the bearing hole 84a. A slide rack 85 is mounted on the lower surface of the slide member 84.

The slide rack 85 includes a rack portion 85a in mesh with the threaded groove of the feed shaft 83a and a support member 85b for elastically supporting the rack portion 85a. By fastening this support member 85b with a fixing screw 38m, the slide rack 85 is fixed on the slide member 84. A bearing 84b is arranged on the side of the slide member 84 far from the bearing hole 84a, and the guide shaft 83d is slidably held on the bearing 84b. The feed shaft 83a, the feed motor 83 and the slide rack 85 make up a head feed mechanism for moving the optical pickup unit 76.

Also, the optical head 82 of the optical pickup unit 76 has a biaxial actuator capable of moving the objective lens 82a in the focusing direction (vertical direction) and the tracking direction (horizontal direction) independently of each other. The electromagnetic force is exclusively used as the driving power for this biaxial actuator. This embodiment employs a biaxial actuator of spring plate type classified as having a different support system for the movable portion. Other types of biaxial actuator, such as wire supporting system, hinge system or axial slide system, can of course be used with equal effect.

Further, a cam member 77m protruded toward the tilt cam 81 is arranged on the upper front edge of the other side member 77c of the pickup chassis 77. The free end of the spring plate 79d is kept in pressure contact with the cam member 77m, and the cam member 77m, energized by the spring force of the spring plate 79d, is kept in pressure contact with the cam surface 81b of the tilt cam 81 located under the cam member 77m. The fixed end of the spring plate 79d is fixedly fastened to the upper surface of the front member 75a of the spindle chassis 75 by the fixing screw 38k.

By the way, reference numeral 86 in FIG. 29 designates a biaxial cover for the biaxial actuator. This biaxial cover 86 is formed with an open window 86a for exposing the objective lens 82a.

Also, the plate frame 61 in spaced and opposed relation to the base frame 60 substantially in parallel thereto has the following configuration. Specifically, the plate frame 61 is formed of a screen-like member having a square front portion. The four sides of the square front portion are bent in the same direction thereby to form an upper surface member 61a, a lower surface member 61b, and left and right surface members 61c, 61d. An open window 61e for accommodating and removing the chucking plate 87 for chucking by holding the optical disk Dn with the disk table 74 is formed at the substantially central portion of the base frame 60.

The chucking plate 87 includes a circular disk holding plate 87a, a yoke plate 87b and a yoke holding plate 87c. The disk holding plate 87a is in contact with the non-recording area formed on the peripheral edge of the center hole Dc of the optical disk Dn. A cylindrical portion is arranged on the inner peripheral edge of the disk holding plate 87a, and three engaging holes are opened in the inner peripheral edge thereof. These engaging holes are in mesh with three legs 87d arranged on the yoke holding plate 87c. The three legs 87d are arranged on an arc so that the circumscribed circle thereof forms a part of the circumference. A yoke plate 87b made of an iron plate or the like adsorbed by the magnet 74e built in the disk table 74 is housed in the three leg members 87d.

The chucking plate 87 is mounted on the chucking lever 88 and adapted to be moved into or out of the open window 61e by the elastic deformation of the chucking lever 88. The chucking lever 88 includes a lever body 88a having the chucking plate 87 mounted thereon, and an elastic member 88b for elastically supporting the lever body 88a on the plate frame 61. The elastic member 88b has a lever-side coupling member 88c and a frame-side coupling member 88d extending in parallel to each other.

The free end of the lever-side coupling member 88c is fixed at the intermediate portion along the length of the lever body 88a by fixing means such as caulking, so that the elastic member 88b is integrated with the lever body 88a. The free end of the frame-side coupling member 88d is fixed on the plate frame 61 with fixing means such as caulking, so that the chucking lever 88 is elastically supported on the plate frame 61. The chucking plate 87 is mounted at an end of the chucking lever 88 in such a manner as to hold it between the disk holding plate 87a and the yoke holding plate 87c. This chucking plate 87 is mounted in spaced relation with the chucking lever 88, and configured to be displaceable by a predetermined amount along the surface and the direction perpendicular thereto.

The other end of the chucking lever 88 is protruded upward through the opening 61f formed in the upper surface member 61a. By operating the upward protruded portion of the chucking lever 88, the chucking plate 87 can be inserted in or taken off from the open window 61e. By the way, the upper surface member 61a has a positioning pin 61g.

Guide holes 61h, 61i extending vertically are arranged at the four corners of the plate frame 61. Further, left and right openings 61j, 61j are formed at the upper portion of the inner slope of the lower guide hole 61i. Left and right first spring support members 61k, 61k formed by folding out a part of the plate frame 61 are arranged at an intermediate portion of the upper and lower guide holes 61h, 61i. Also, a support pin 89 protruded sideways is arranged for each of the left and right side members 61c, 61d. The left and right support pins 89, 89 are set at almost the central portion along the vertical direction. A stopper support member 61m and a second spring support member 61n connected with the side members 61c, 61d are arranged above and below each of the support pins 89, 89.

A pair of lift plates 90a, 90b are arranged on the two sides of the front portion of the plate frame 61. The lift plates 90a, 90b each include a rail support portion 91a having an L-shaped section and a rise portion 91b connected in a position crossing the length of the rail support portion 91a. An upper guide pin 91c is formed at the upper part of the rise portion 91b, and a lower guide pin 91d is formed at the lower part thereof. These upper and lower guide pins 91c, 91d are protruded toward the plate frame 61. The upper guide pin 91c is slidably inserted in the upper guide hole 61h of the plate frame 61, and the lower guide pin 91d is slidably inserted in the lower guide hole 61i. The guide pins 91c, 91d are guided by the guide holes 61h, 61i so that the lift plate pair 90a, 90b are movable upward or downward.

Further, a spring support member 91e arranged inside and a stopper control member 91f arranged outside are formed on the rise portion 91b of the lift plates 90a, 90b. The spring support member 91e is arranged at the lower part of the rise portion 91b and inserted in the opening 61j of the plate frame 61. The spring support member 91e is in mesh with an end of the coil spring 92a representing a specific example of the elastic member, the other end of which is in mesh with the first spring support member 61k of the plate frame 61. The lift plates 90a, 90b are kept urged upward by the spring force of the coil spring 92a.

Each support pin 89 of the plate frame 61 rotatably supports the disk stopper 93. The disk stopper 93 is made of a arm member having a boss at an end thereof. A stopper portion 93a for stopping the movement of the optical disk Dn is protruded from the other end of the disk stopper 93 over the conveyance route of the optical disk Dn. A rotational operating portion 93b and a spring receiver 93c are arranged on the boss of the disk stopper 93. The stopper portion 93a is protruded in the direction crossing the extension of the disk stopper 93, and so is the rotational operating portion 93b in the same direction. As a result, the rotational operating portion 93b is protruded over the travel route of the lift plates 90a, 90b.

The spring receiver 93c of the disk stopper 93 is protruded in the direction opposite to the rotational operating portion 93b, and engages an end of the coil spring 92b representing a specific example of the elastic member. The other end of the coil spring 92b is in mesh with the second spring support member 61n of the plate frame 61. The disk stoppers 93, 93 are kept urged to rotate rearward by the spring force of the coil spring 92b. The rearward rotation of the disk stoppers 93 is prevented by the stopper support member 61m.

Also, a movable guide rail 94 representing a specific example of the vertically moving member is mounted by fixing means such as a fixing screw 38n on the rail support portion 91a of the lift plates 90a, 90b. The movable guide rail 94 is a parallelopipedal member having an appropriate length, width and thickness. A longitudinal end of the movable guide rail 94 is provided with a disk lifting portion 94a for lifting the optical disk Dn encased in the disk housing unit 45 of the turntable 32. The width of the disk lifting portion 94a is set slightly larger than the width of the optical disk Dn. The upper half of the disk lifting portion 94a is composed of an inclined portion having a slope on the two sides with the width reduced upward.

At the forward end of the disk lifting portion 94a, a toothed pulley 95a having teeth on the outer peripheral surface thereof is supported rotatably by the support shaft 95b. An end of the conveyance belt 95c made of a timing belt, for example, is hung over the toothed pulley 95a. The width of the conveyance belt 95c is set substantially equal to the thickness of the optical disk Dn. The other end of the conveyance belt 95c is hung over a toothed pulley 95d in similar fashion. This toothed pulley 95d is rotatably supported by a cam pin 95e at the other longitudinal end of the movable guide rail 94. The movable guide rail 94 for suspending the conveyance belt 95c is provided with a belt relief groove 94b allowing the passage of the conveyance belt 95c.

In this way, the front conveyance mechanism 56a is configured of the conveyance belt 95c, the movable guide plate 94, etc. mounted on the front lift plate 90a arranged in front of the main chassis 33. Also, the rear conveyance mechanism 56b is constituted of the conveyance belt 95c, the movable guide rail 94, etc. mounted on the rear lift plate 90b arranged rearward of the main chassis 33.

The cam pin 95e of the front conveyance mechanism 56a is brought into contact with the cam portion 63b of the second cam gear 63 of the cam drive mechanism described above. The front lift plate 90a is urged upward by the coil spring 92a, whereby the cam pin 95e is pressure-contacted by the cam surface 63c of the second cam gear 63 from underside. Thus, the front lift plate 90a is vertically activated along the cam surface 63c. The cam pin 95e of the rear conveyance mechanism 56b, on the other hand, is brought into contact with the cam portion 62b of the first cam gear 62, and the rear lift plate 90b is urged upward by the coil spring 92a, so that the cam pin 95e is brought into pressure contact with the cam surface 62c of the first cam gear 62 from underside. In this way, the rear lift plate 90b is vertically operated along the profile of the cam surface 62c.

Above the base plate 60 and the plate frame 61 having the configuration described above, an upper guide rail 96 representing a specific example of the restriction member is provided for restricting the motion of the optical disk Dn. As shown in FIGS. 3 and 5 to 20, the upper guide rail 96 is a tabular member extending from the upper part of the base plate 60 and the plate frame 61 and reaching the vicinity of the rear surface of the exterior cover 34.

A guide groove 96a extending longitudinally is formed almost at the central portion of the lower surface of the upper guide rail 96. At the time of conveyance, the optical disk Dn is inserted into the guide groove 96a from underside. The optical disk Dn, held between the guide groove 96a and the conveyance belt 95c on the upper and lower sides thereof, is conveyed forward or rearward. For this purpose, a rubber, soft plastics, etc. which can softly support the peripheral edge portion of the optical disk Dn is desirably laid on the bottom portion of the guide groove 96a.

Also, in order to restrict the motion of the optical disk Dn lifted by the movable guide rail 94, a rear guide member 96b is arranged on the back of the exterior cover 34. This rear guide member 96b prevents the rearward movement of the optical disk Dn lifted by the movable guide rail 94 of the rear conveyance mechanism 56b. In similar fashion, a front guide member 96c is arranged on the back of the door 36. This front guide member 96c prevents the forward movement of the optical disk Dn lifted by the movable guide rail 94 of the front conveyance mechanism 56a.

By the way, the main chassis 33, the exterior cover 34, the plate frame 61 and the lift plates 90a, 90b described above may be made of synthetic resin as well as such a material as a stainless steel sheet or other metal plates. On the other hand, the turntable 32, the front panel 35, the door 36, the table support member 37, the disk drive frame 57, the base frame 60, the slide plates 58, 59 and the upper guide rail 96 may be made of an aluminum alloy or other metal materials as well as such synthetic resin such as ABS resin.

By the way, reference numeral 35a in FIGS. 3 and 5 designates a tunnel portion integrated with the front panel 35. This tunnel portion 35a is formed by being curved and connected to the upper part of the table support member 37.

The disk reproduction unit 31 configured as described above can be used in the following manner, for example. The desired optical disk Dn is selected from among a multiplicity of the optical disks Dn mounted in the disk housing units 45 on the turntable 32, the information signal recorded in the information recording surface formed on the two sides of the particular optical disk Dn is continuously reproduced or the information signal recorded in the information recording surface formed only on one surface of the optical disk Dn can be reproduced.

First, as shown in FIG. 4, the disk entrance 40 is opened by opening the door 36, and an appropriate number of optical disks Dn are loaded in arbitrary ones of a multiplicity of the disk housing units 45 formed in the turntable 32. The turntable 32 has 300 disk housing units 45, each adapted to accommodate one optical disk Dn. Thus, according to this embodiment, a maximum of 300 optical disks Dn can be accommodated at a time. By the way, the optical disk Dn used is generally a disk-like recording medium having a diameter of 12 cm in size. The use of an adaptor, however, makes it possible to use an optical disk Dn having a diameter of 8 cm.

The job of loading the optical disks Dn in the disk housing units 45 of the turntable 32 is performed at the hands of the user. Pulling the door 36 toward the user and thus opening the disk entrance 40, the front portion of the turntable 32 is exposed. Under this condition, the optical disk Dn held in hand in vertical position is inserted by way of the disk entrance 40 thereby to load it in an arbitrary disk housing unit 45. Each disk housing unit 45 is assigned a unique position number (No. 1 to No. 300 in this embodiment) and a unique address number (address 1 to address 10 in this embodiment). Therefore, the information on the optical disk Dn loaded are recorded in a control unit as information associated with the position number and the address number of the particular optical disk Dn.

Also, when a plurality of optical disks Dn are loaded, the input means (the operating dial, the operating button, etc. for example) arranged on the front surface of the front panel 35 are operated to rotate the turntable 32 in an arbitrary direction. Then, the optical disk Dn is loaded in an empty disk housing unit 45. The optical disk Dn, once loaded in the disk housing unit 45 of the turntable 32 in this way, is mounted in substantially vertical position on the turntable 32. As a result, an arbitrary optical disk Dn can be selected and automatically operated for reproduction.

Figure 15:
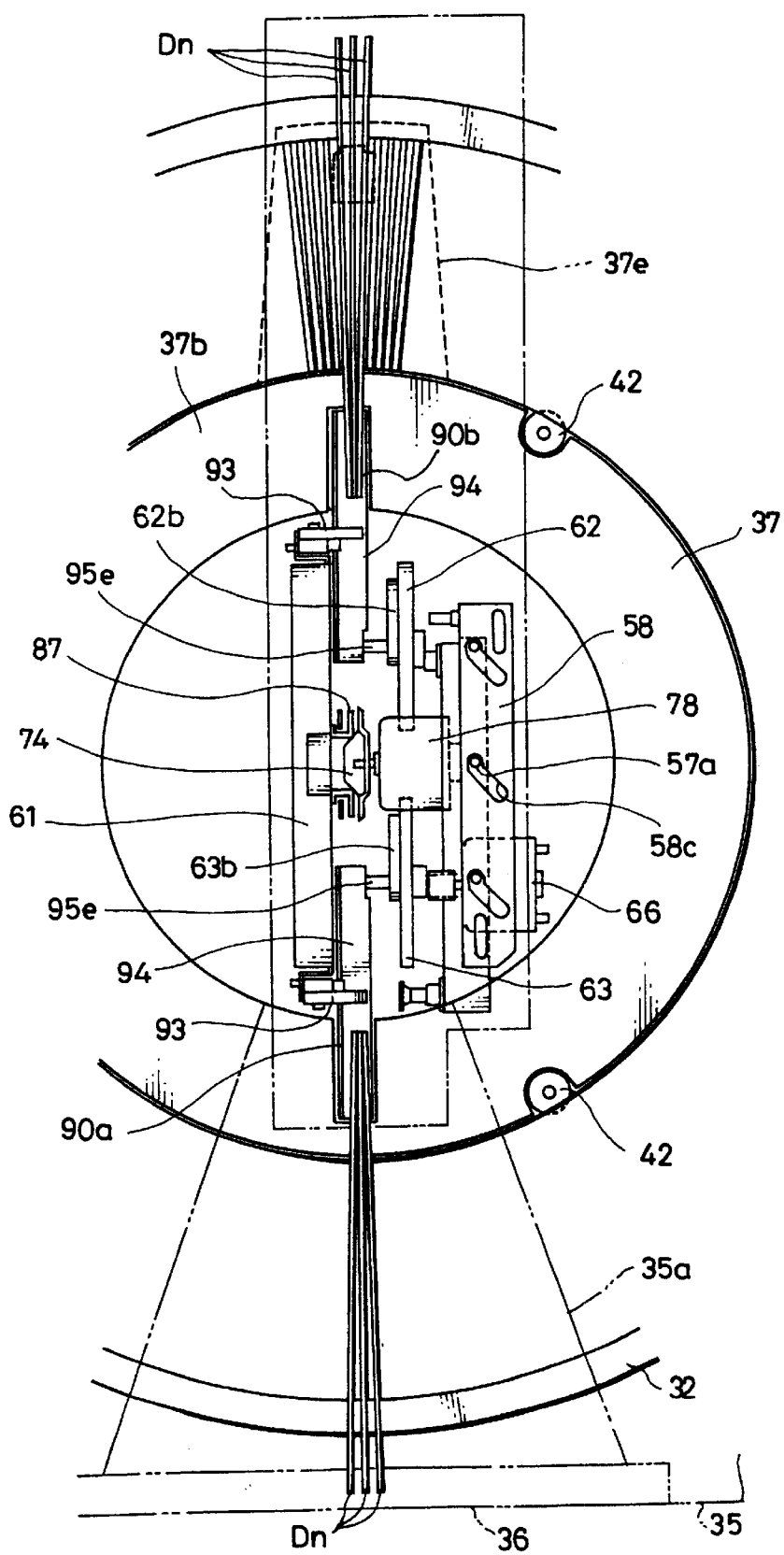
FIG. 15 is a plan view showing the essential parts in initial position for disk loading, according to an embodiment of a specific configuration of a disk reproduction unit of a disk recording and/or reproduction apparatus according to this invention.

This reproducing operation of the optical disk Dn comprises a disk loading step and a disk chucking step. The disk loading step is to perform the operation of taking the optical disk Dn out of the disk housing unit 45, conveying it to the disk mounting portion and returning it from the disk mounting portion to the disk housing unit 45. This disk loading step can be performed from the rear or front side of the disk reproduction unit 31. From which the optical disk Dn is to be loaded first, the rear side or the front side, can be arbitrarily set. In this embodiment, however, an explanation will be given of the case in which the rear side loading is given priority, and after the rear side loading, the front side loading is performed. The disk chucking step, on the other hand, consists in chucking the optical disk Dn conveyed to the disk mounting portion, to the disk table 74 or canceling the chucking. FIGS. 6 and 15 show the initial state of the disk reproduction unit 31. The loading of the optical disk Dn is started from this state. In the initial state of the disk reproduction unit 31, as shown in FIG. 6, the conveyance mechanisms 56a, 56b before and after the disk conveyance unit 56 are both stationary with the movable guide rails 94 before and after it lowered to the lower end thereof.

At this time, the disk lifting portion 94a at the forward end of the movable guide rail 94 is located somewhat lower than the optical disk Dn loaded in the disk housing unit 45 of the turntable 32. Let H1 be the distance from the upper end of the disk lifting portion 94a to the guide groove 96a of the upper guide rail 96. The distance H1 is somewhat larger than the diameter S of the optical disk Dn (H1>S).

Also, a pair of the cam gears 62, 63 are in such a state that the stepped portions 62d, 63d of the cam portions 62b, 63b thereof are both directed upward. As a result, the first cam gear 62 is displaced in the cam groove 70 to the greatest extent at a position far from the other cam gear 63. Thus, as shown in FIG. 15, the disk drive frame 57 is protruded forward. The disk table 74 approaches the plate frame 61 so that the chucking plate 87 is mounted on the disk table 74.

After power is switched in from this state, the corresponding position number of the disk housing unit 45 is input in order to select the desired optical disk Dn, and the reproduction start switch is turned on. Thus, the turntable 32 is rotated to a predetermined position through the operation of the table rotational drive mechanism 50 shown in FIGS. 22 and 23.

Specifically, upon manipulation of the reproduction start switch, power is supplied to the table drive motor 51 of the table rotational drive mechanism 50. As a result, the torque of the rotary shaft of the table drive motor 51 is transmitted from the output gear 52a to the large diameter portion of the first intermediate gear 52b, which transmission power is then transmitted to the large diameter portion of the second intermediate gear 52c from the small diameter portion. The torque is further transmitted to the large diameter portion of the third intermediate gear 52d from the small diameter portion of the second intermediate gear 52c. Thus, the transmission power is transmitted to the large diameter portion of the third intermediate gear 52d from the small diameter portion, and from the small diameter portion of the third intermediate gear 52d to the table gear 49 of the turntable 32.

As a result, the turntable 32 is rotationally driven about the table support member 37. At the same time, the turntable 32 has the inner peripheral edge thereof supported at three points by the inner support roller 42 and has the outer peripheral edge thereof supported at six points by the outer support roller 46. As a result, the turntable 32 is positively rotated by the operation of the table rotational drive mechanism 50. Also, the rotational position of the turntable 32 is detected by the position detection sensor 43a and the address detection sensor 43b, and therefore the rotational position of the turntable 32 can be accurately controlled.

Figure 16:
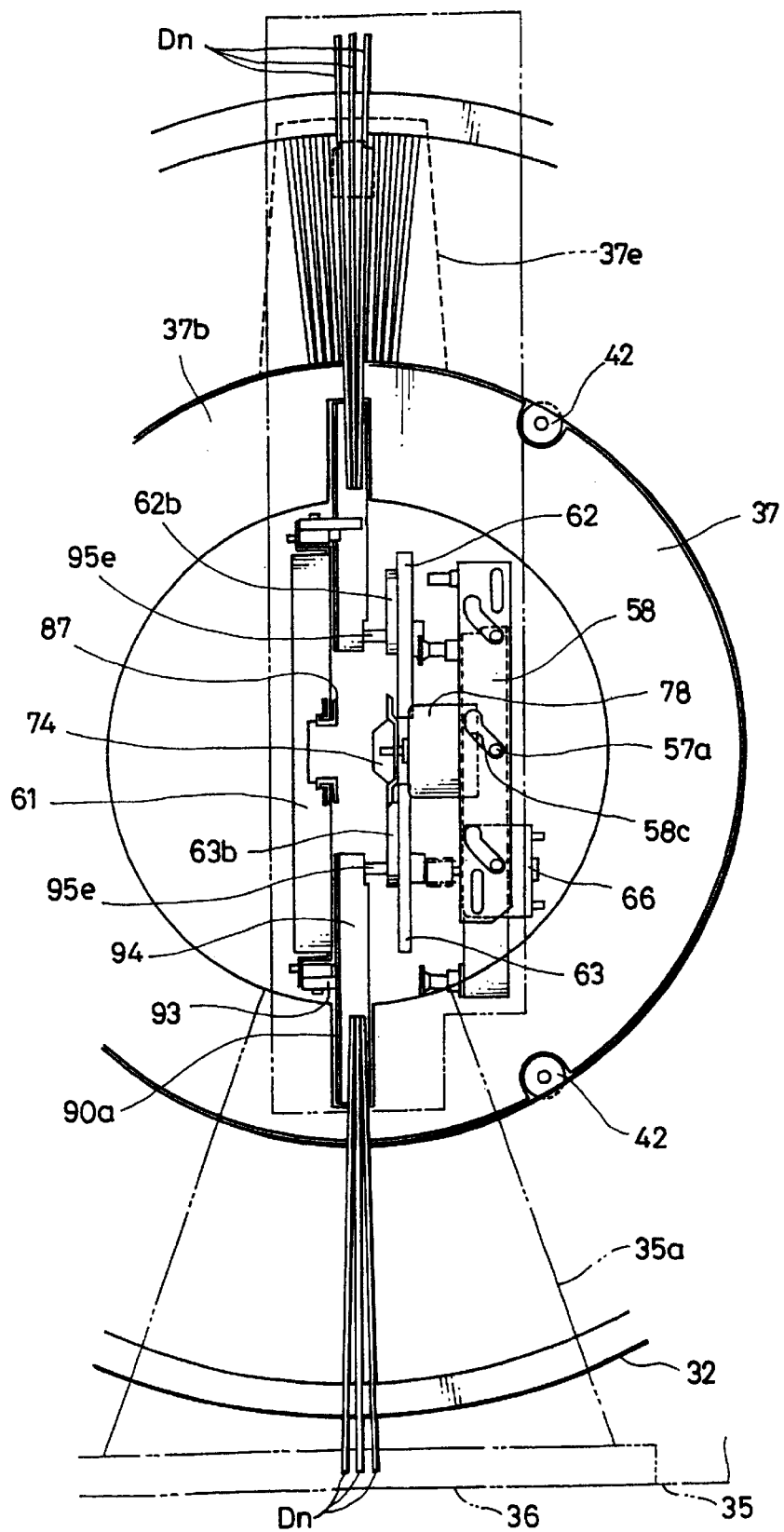
FIG. 16 is a plan view showing the essential parts with the rear disk lifted up for disk loading, according to an embodiment of a specific configuration of a disk reproduction unit of a disk recording and/or reproduction apparatus according to this invention.

Then, assume that the turntable 32 has rotated to a predetermined position and the disk housing unit 45 of the position number selected by the user has moved to the rear loading position. A disk detection sensor not shown detects whether the optical disk Dn is available in the particular disk housing unit 45 or not. This disk detection sensor is configured with a light emitter and a photo detector arranged at upper and lower positions each at the rear loading position and the front loading position. With this disk detection sensor, the light is passed between the two elements, so that upon detection of the light from the light emitter by the photo detector, it is determined that an optical disk Dn exists, and vice versa. Then, an explanation will be given of the case where the optical disk Dn is loaded from the rear loading position. In this case, as shown in FIGS. 7 and 16, the rear conveyance mechanism 56b of the disk conveyance mechanism 56 is activated, while the front conveyance mechanism 56a is held inactive. First, the cam drive motor 66 is driven, and the turning effort thereof is transmitted from the output gear 64a to the large diameter portion of the first intermediate gear 64b of the cam gear train 64. The resulting turning effort is transmitted from the small diameter portion of the first intermediate gear 64b to the large diameter portion of the second intermediate gear 64c, so that the torque is transmitted from the small diameter portion to the cam drive gear 64d, and further to a pair of cam gears 62, 63.

As a result, the cam gear pair 62, 63 are rotated counterclockwise by about 180° in FIG. 6. Consequently, the cam pin 95e on the movable guide rail 94 of the rear conveyance mechanism 56b is moved along the cam surface 62c of the first cam gear 62 while moving upward slowly. Thus, the movable guide rail 94 is lifted upward integrally with the lift plate 90b by the spring force of the coil spring 92a that has energized the lift plate 90b upward. As a result, the conveyance belt 95c with an end thereof suspended on the disk lifting portion 94a arranged at the forward end of the movable guide rail 94 is brought into contact with the lower inner edge of the optical disk Dn from underside. With the rise of the conveyance belt 95c, the optical disk Dn is lifted up and taken out of the disk housing unit 45.

The disk lifting portion 94a has the upper portion thereof formed as thin as a cutting blade and the width of the upper end thereof is set to about the same size as the thickness of the optical disk Dn. This disk lifting portion 94a enters that portion of the three optical disks Dn facing the loading position which has a wider outer gap than in the innermost peripheral portion. As a result, while the left and right optical disks Dn are forced open laterally with the disk lifting portion 94a, the intermediate optical disk Dn alone can be placed on the conveyance belt 95c and lifted upward.

At this time, as shown in FIG. 7, the cam slot 70 formed in the back of the first cam gear 62 is rotated 180 the displacement cam portion 70b moves rightward. Therefore, the cam copy pin 71a is guided by the cam slot 70 to the circumferential cam portion 70a. The swing lever 71 is rotated counterclockwise to a position where the right position thereof is lowered. Consequently, as shown in FIG. 16, the disk drive frame 57 moves away from the plate frame 61 so that the disk table 74 is separated from the chucking plate 87.

On the other hand, the second cam gear 63 is also rotated counterclockwise by 180° like the first cam gear 62. However, the cam pin 95e arranged on the movable guide rail 94 of the front conveyance mechanism 56a moves through the outermost peripheral portion along the profile of the cam surface 63c of the cam portion 63b. Thus, the cam pin 95e remains in the same height, and therefore the lift plate 90a is not lifted upward with the front movable guide rail 94 held at the initial lower end position.

As shown in FIG. 7, the optical disk Dn that has been lifted up to a predetermined position by the disk lifting portion 94a enters the guide groove 96a of the upper guide rail 96 arranged at an upper position. The optical disk Dn, that is thus brought into contact with the bottom surface in the guide groove 96a and the rear guide member 96b, is supported elastically at three points including these parts and the conveyance belt 95c.

Under this condition, the loading motor 67 is started. As the loading motor 67 is driven, the turning effort thereof is transmitted from the output gear 65a to the large diameter portion of the first intermediate gear 65b of the loading gear train 65. The turning effort is further transmitted from the small diameter portion of the first intermediate gear 65b to the drive gear 65e through the second intermediate gear 65c and the third intermediate gear 65d. Further, the turning effort of the drive gear 65e is distributed in two opposite longitudinal directions, and one of them is transmitted to the front first movable gear 65f of the front conveyance mechanism 56a while the other is transmitted to the rear first movable gear 65i of the rear conveyance mechanism 56b.

From the front first movable gear 65f, the turning effort is transmitted through the front second and third movable gears 65g, 65h to the front belt drive gear 65m. From the rear first movable gear 65i, on the other hand, the turning effort is transmitted through the rear second and third movable gears 65j, 65k to the rear belt drive gear 65n. With the rotation of the belt drive gears 65m, 65n, the front and rear conveyance belts 95c, 95c are driven in the same direction.

In this case, with the rear disk up as shown in FIG. 7, the rear belt drive gear 65n is rotated clockwise. Thus, the turning effort for counterclockwise rotation is applied to the optical disk Dn. In the process, the upper part of the optical disk Dn is restricted by the upper guide rail 96 and the rear guide member 96b, and therefore the optical disk Dn is prevented from moving rearward. On the other hand, the distance H2 between the guide groove 96a of the upper guide rail 96 and the conveyance belt 95c is smaller than the diameter S of the optical disk Dn (H2<S). Since the movable guide rail 94 is energized upward by the coil spring 92a, however, the distance H2 can be increased beyond the diameter S.

Figure 8:
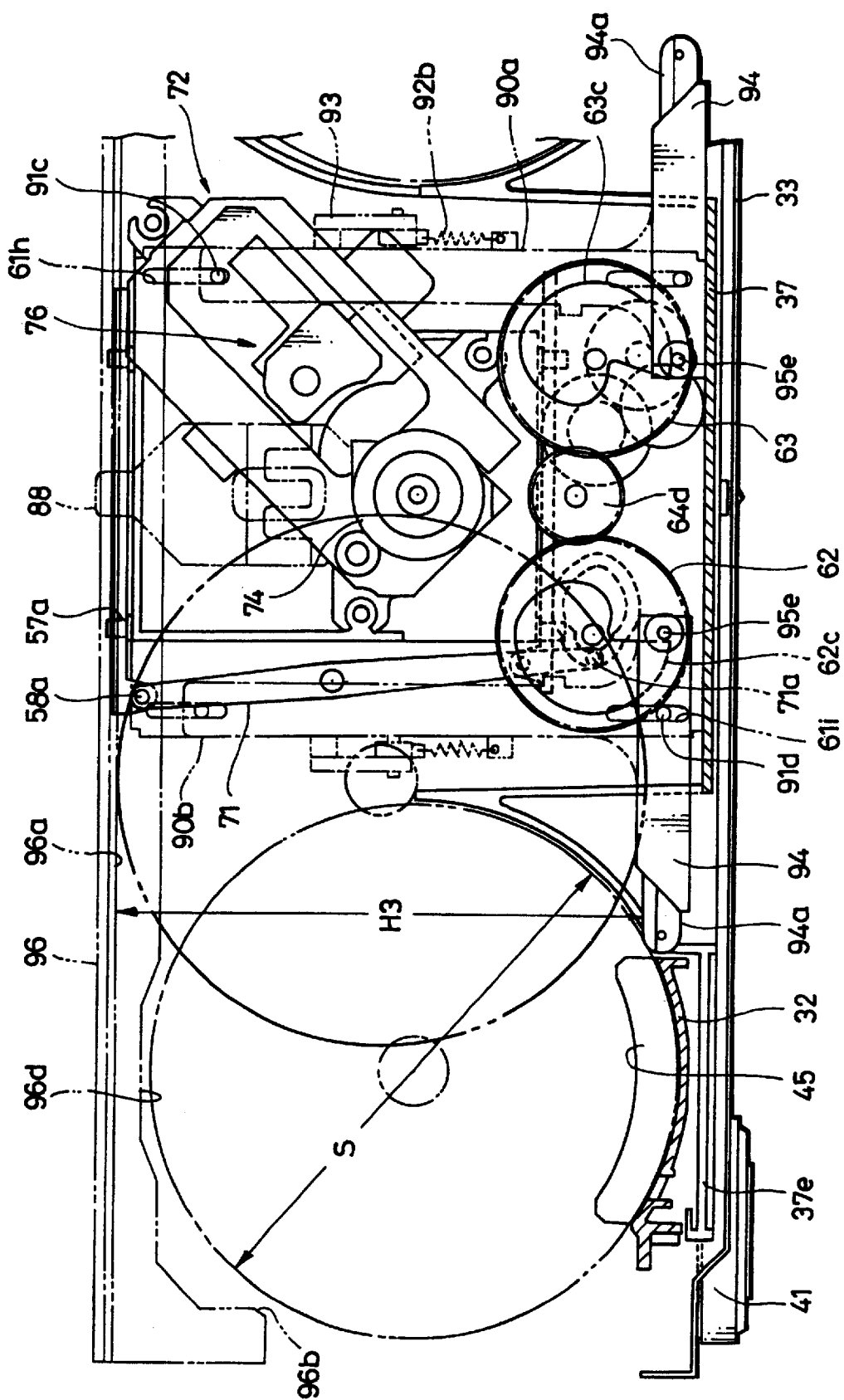
FIG. 8 is a sectional view for explaining a rear disk loaded, according to an embodiment of a specific configuration of a disk reproduction unit of a disk recording and/or reproduction apparatus according to this invention.
Figure 17:
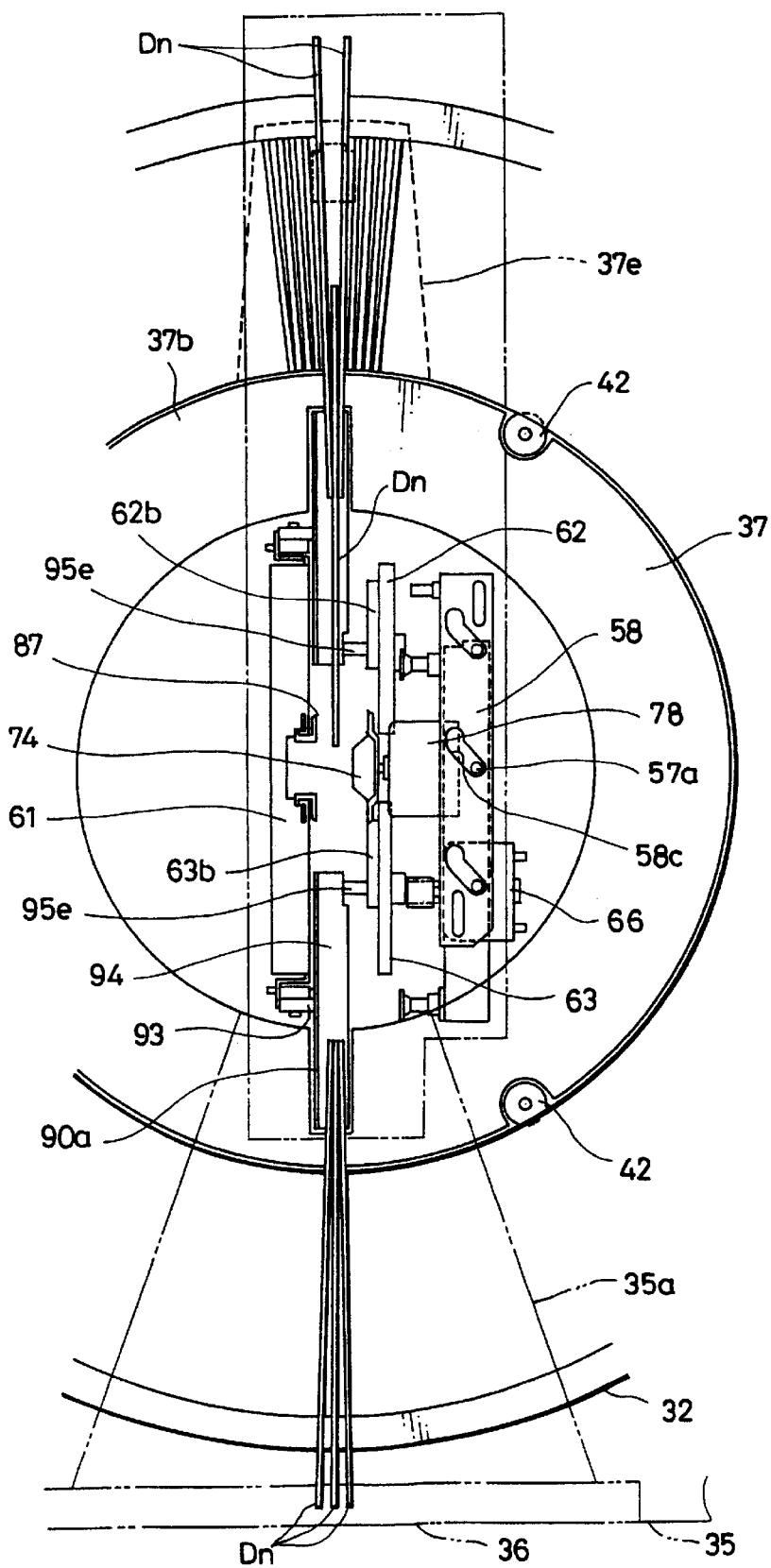
FIG. 17 is a plan view showing the essential parts with the rear disk loaded, according to an embodiment of a specific configuration of a disk reproduction unit of a disk recording and/or reproduction apparatus according to this invention.

Therefore, as the force of the optical disk Dn to move forward resulting from the rotation thereof comes to surpass the spring force of the coil spring 92a, as shown in FIGS. 8 and 17, the optical disk Dn enters the distance H2 and pushes down the movable guide rail 94. As a result, the distance H3 becomes equal to the diameter S (H3=S). In the process, a pair of the cam gears 62, 63 are held stationary, so that the cam pin 95e in contact with the cam surface 62c of the first cam gear 62, guided by the stepped portion 62d of the cam portion 62b, moves radially outward. As a result, the optical disk Dn is relocated from the position shown in FIG. 7 to the position shown in FIG. 9 through the position shown in FIG. 8, thus performing the loading operation of the optical disk Dn.

Figure 9:
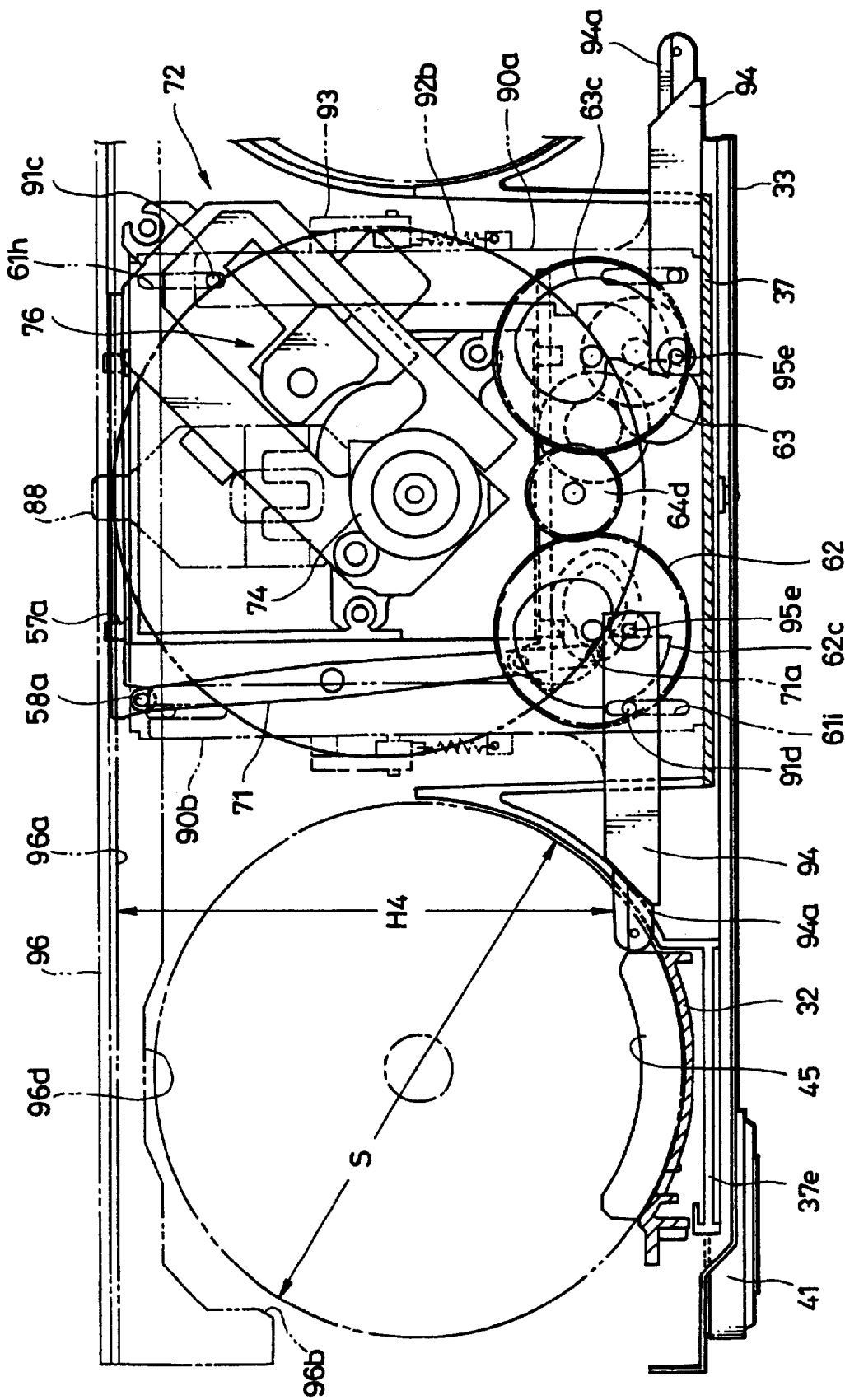
FIG. 9 is a sectional view for explaining a rear disk completely loaded, according to an embodiment of a specific configuration of a disk reproduction unit of a disk recording and/or reproduction apparatus according to this invention.
Figure 18:
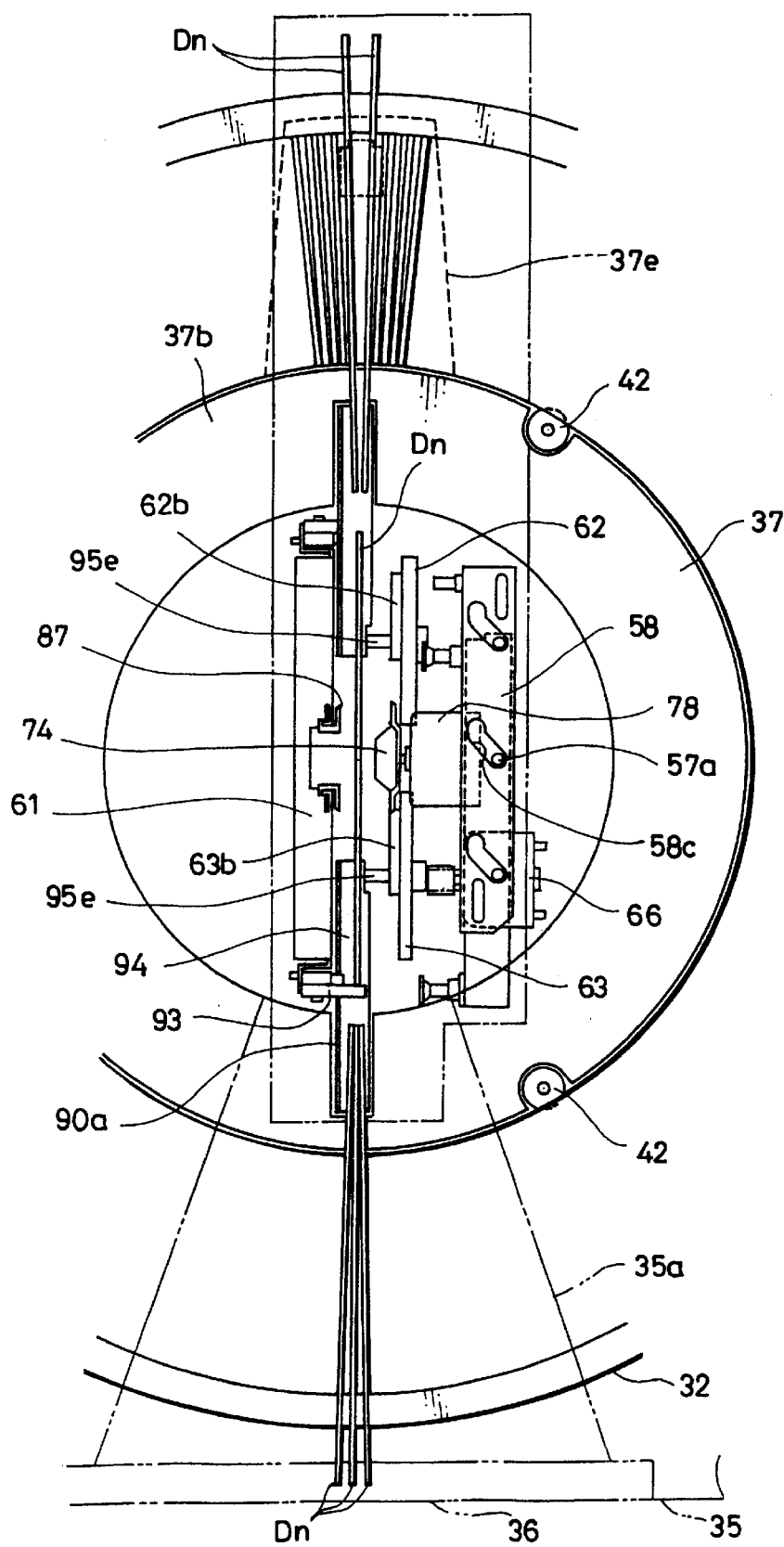
FIG. 18 is a plan view showing the essential parts with the rear disk completely loaded, according to an embodiment of a specific configuration of a disk reproduction unit of a disk recording and/or reproduction apparatus according to this a invention.

As a result, as shown in FIGS. 9 and 18, the optical disk Dn is conveyed to the central portion thereby to complete the loading of the optical disk Dn. At this time, the rotational operating portion 93b of the disk stopper 93 is pushed down by the stopper restriction member 91f of the front lift plate 90a, and therefore the front end of the optical disk Dn is brought into contact with the stopper portion 93a protruded over the travel locus of the optical disk Dn thereby to prevent the forward movement thereof. Also, the position of the optical disk Dn is slightly higher than the disk mounting portion used for the reproducing operation.

At this time, the front end of the optical disk Dn is ejected forward of the inner end of the conveyance belt 95c, whereby the inner end of the third conveyance belt 95c in contact with the optical disk Dn is brought into contact with a portion slightly higher than the lowest end of the optical disk Dn. Thus, the rear lift plate 90b is lifted up by the spring force of the coil spring 92a, so that the distance H4 between the guide groove 96a and the conveyance belt 95c becomes shortest (H4<S).

In the process, the cam pin 95e in contact with the cam surface 62c of the first cam gear 62 moves radially inward along the stepped portion 62d of the cam portion 62b.

Next, the cam drive motor 66 is started thereby to rotate the cam gears 62, 63 about 180° in the clockwise direction in FIG. 9. Thus, the cam pin 95e is moved downward by the cam surface 62c of the first cam gear 62, thereby pushing down the rear movable guide rail 94. Consequently, the optical disk Dn moves downward by its own weight.

At the same time, the cam copy pin 71a in mesh with the cam groove 70 of the first cam gear 62 moves outward radially. The swing lever 71 is swung clockwise about the mounting screw 38e. As a result, the upper engaging pin 58a in mesh with the upper engaging hole 71b of the swing lever 71 moves rightward in FIG. 9, while at the same time, the lower engaging pin 59a in mesh with the lower engaging hole 71c moves leftward in FIG. 9. With the rightward movement of the upper slide plate 58, the lower slide plate 59 moves leftward.

Figure 10:
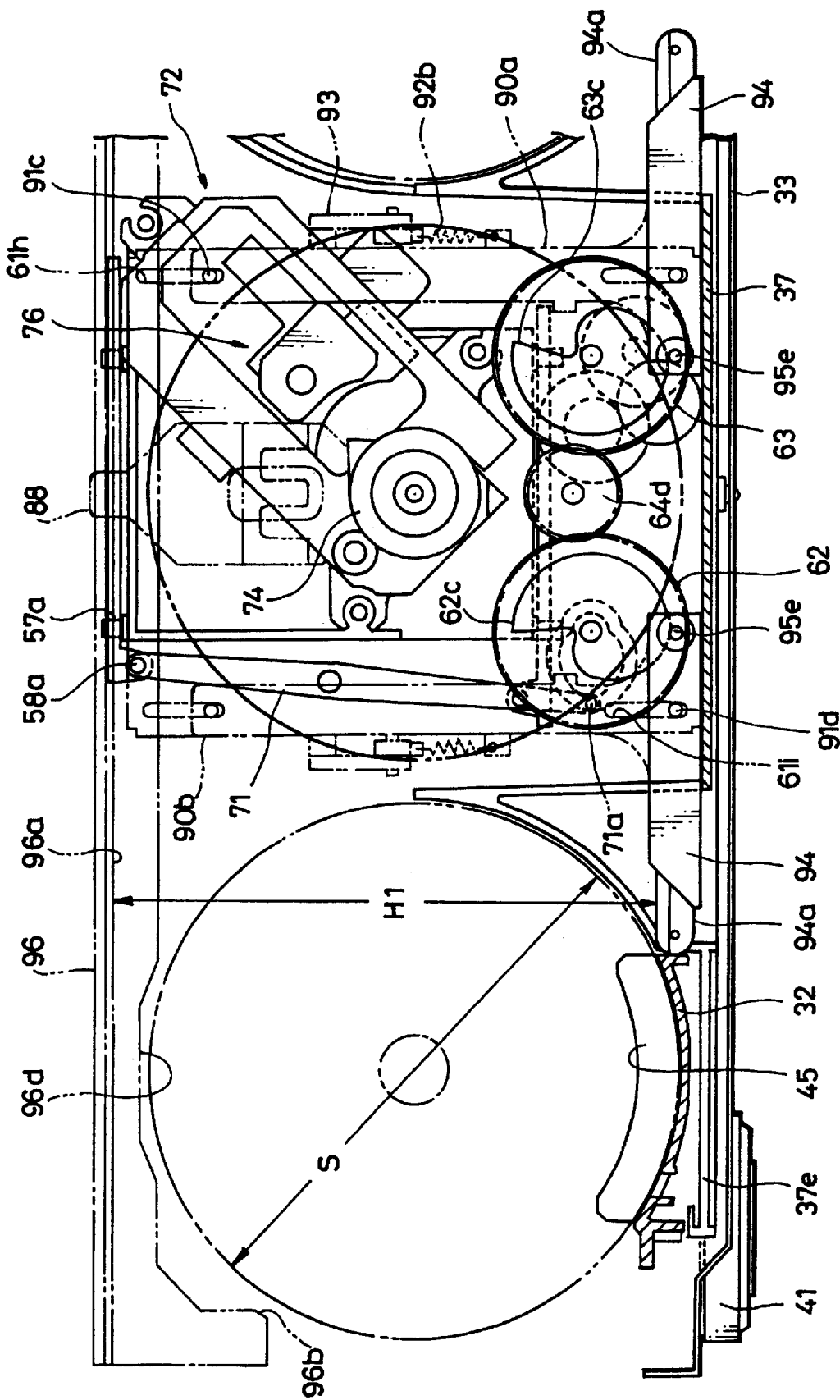
FIG. 10 is a sectional view for explaining a rear disk completely chucked, according to an embodiment of a specific configuration of a disk reproduction unit of a disk recording and/or reproduction apparatus according to this invention.

As shown in FIGS. 10 and 19, the upper guide pin 57a of the disk drive frame 57 in mesh with each guide groove 58c of the upper slide plate 58 moves toward the parallel portion of the guide groove 58c. In similar fashion, the lower guide pin 57b of the disk drive frame 57 in mesh with each guide groove 59c of the lower slide plate 59 moves toward the parallel portion of the guide groove 59c. As a result, the disk drive frame 57 approaches the plate frame 61, so that the disk table 74 of the drive unit 72 elastically supported on the disk drive frame 57 approaches the optical disk Dn.

At the time point when the optical disk Dn has lowered to the disk mounting portion, the fitting portion 74b of the disk table 74 is fitted in the center hole Dc of the optical disk Dn. At the same time, the chucking plate 87 supported on the chucking lever 88 mounted on the plate frame 61 is adsorbed to the magnet 74e built in the disk table 74. As a result, the optical disk Dn is held between the disk table 74 and the chucking plate 87 thereby to complete the chucking. After that, the movable guide rail 94 is pushed further downward thereby to separate the conveyance belt 95c completely from the optical disk Dn.

Thus, the reproduction of the optical disk Dn by the drive unit 72 becomes possible. Driving the spindle motor 78 of the drive unit 72, the optical disk Dn is rotationally driven (at a constant linear speed, for example), while at the same time moving the optical pickup unit 76 along the radial direction of the optical disk Dn thereby to read the information signal. As a result, the reproduction of the information signal recorded on the information recording surface of the optical disk Dn chucked is carried out.

After completely reproducing one surface of the optical disk Dn, assume that the reproduction of the remaining surface is reproduced without interruption. The particular optical disk Dn is returned to the original disk housing unit 45 provisionally. Also when reproducing operation is completed from only one surface of the optical disk Dn, the optical disk Dn is returned to the original disk housing unit 45. The operation of returning the optical disk Dn is performed by the process reverse to the loading operation described above.

Specifically, in the state shown in FIGS. 10 and 19, the cam drive motor 66 is rotationally driven in reverse direction, so that a pair of the cam gears 62, 63 are rotated about 180 counterclockwise through the cam gear train 64a to 64. As a result, the cam copy pin 71a in mesh with the cam slot 70 of the first cam gear 62 moves toward the inner circumferential cam portion 70a inward of the displacement cam portion 70b located radially outward. Thus, the swing lever 71 is swung counterclockwise about the mounting screw 38e. The upper engaging pin 58a in mesh with the upper engaging hole 71b of the swing lever 71 moves leftward, and at the same time, the lower engaging pin 59a in mesh with the lower engaging hole 71c moves rightward. As a result, the upper slide plate 58 moves leftward, and the lower slide plate 59 moves rightward.

Thus, the upper guide pin 57a of the disk drive frame 57 in mesh with each guide groove 58c of the upper slide plate 58 moves toward the inclined portion from the parallel portion of the guide groove 58c. In similar manner, the lower guide pin 57b of the disk drive frame 57 in mesh with each guide groove 59c of the lower slide plate 59 moves toward the inclined portion from the parallel portion of the guide groove 59c. As a result, the disk drive frame 57 moves away from the plate frame 61, so that the disk table 74 of the drive unit 72 is separated from the chucking plate 87. Thus, the chucking of the optical disk Dn in the disk mounting portion is released.

The optical disk Dn that has moved off from the disk table 74 is placed on the rear conveyance belt 95c while at the same time being supported at three points including the front disk stopper 93 and the upper guide rail 96. In the process, the upper end portion of the optical disk Dn is supported by the lower edge of the upper guide rail 96, and therefore the optical disk Dn is prevented from falling out of the disk mounting portion.

At the same time, the cam pin 95e moves upward along the cam surface 62c of the first cam gear 62, and the rear movable guide rail 94 is pulled up. Thus, the optical disk Dn placed on the conveyance belt 95c of the rear movable guide rail 94 is pulled up by the spring force of the coil spring 92a into the state shown in FIG. 9. At the same time, the front conveyance mechanism 56a operates only in such a manner that the cam pin 95e of the front movable guide rail 94 moves along the outer peripheral portion of the cam surface 63c of the second cam gear 63. Therefore, the lift plate 90a is not vertically driven but held at the initial lower end position.

Next, in the state of FIG. 9, the conveyance belt 95c is driven in counterclockwise direction by driving the loading motor 67. As a result, the turning effort is applied from the conveyance belt 95c to the optical disk Dn, which is thus turned clockwise. The turning effort from the optical disk Dn pushes down the rear movable guide rail 94 against the spring force of the coil spring 92a. As a result, the optical disk Dn rides over the conveyance belt 95c, and held between the conveyance belt 95c and the guide groove 96a of the upper guide rail 96 (FIG. 8), is conveyed rearward.

After the optical disk Dn reaches the outer end of the conveyance belt 95c, the rear end of the optical disk Dn is ejected outward of the outer end of the conveyance belt 95c (FIG. 7). Thus the optical disk Dn is supported at three points including the outer end portion of the conveyance belt 95c, the guide groove 96a of the upper guide rail 96 and the rear guide member 96b.

Next, the first cam gear 62 is rotated 180° clockwise through the operation of the cam drive motor 66. The cam pin 95e is pushed down by the cam surface 62c, and the rear movable guide rail 94 moves downward. As a result, the optical disk Dn similarly moves down and placed into the original disk housing unit 45 (FIG. 6). Thus, the optical disk Dn returns to the initial position and the disk reproduction unit 31 is restored to the initial state.

For reproducing the other surface of this optical disk Dn immediately without interruption, the turntable 32 is rotated 180° through the operation of the table rotation drive mechanism 50, so that the optical disk Dn is moved to the conveyance position of the front conveyance mechanism 56a. In the process, the upper end of the optical disk Dn placed in the disk housing unit 45 of the turntable 32 has the same height as the upper end of the optical disk Dn in chucked state shown in FIG. 10. In view of the fact that a notch 96d is formed at the lower edge of the upper guide rail 96 above the disk housing unit 45, however, the optical disk Dn on the disk housing unit 45 is prevented from coming into contact with the upper guide rail 96 when rotating the turntable 32.

Once the optical disk Dn is conveyed to the front conveyance position by the rotation of the turntable 32, the front conveyance mechanism 56a conveys the optical disk Dn through the conveyance operation similar to that due to the rear conveyance mechanism 56b.

Figure 11:
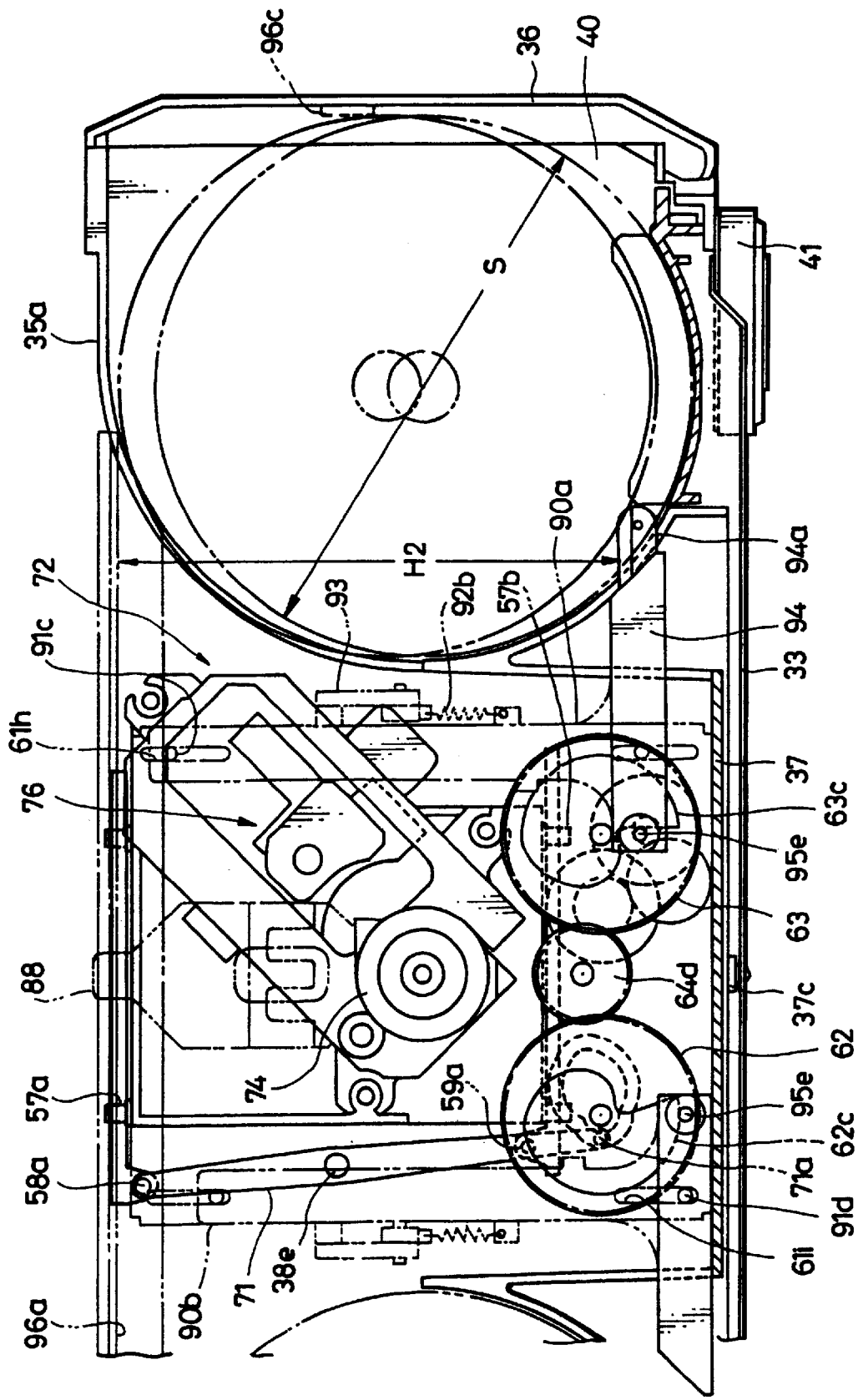
FIG. 11 is a sectional view for explaining a front disk lifted up for disk loading, according to an embodiment of a specific configuration of a disk reproduction unit of a disk recording and/or reproduction apparatus according to this invention.

Next, an explanation will be given of the case in which the optical disk Dn is loaded from the front loading position. In this case, as shown in FIGS. 11 and 20, the front conveyance mechanism 56a of the disk conveyance mechanism 56 is activated while the rear conveyance mechanism 56b is held out of operation. First, the cam drive motor 66 is driven, and the turning effort thereof is transmitted from the output gear 64a of the cam gear train 64 through the first intermediate gear 64b and the second intermediate gear 64c to the cam drive gear 64d. From the cam drive gear 64d, the turning effort is transmitted to a pair of cam gears 62, 63.

As a result, the cam gear pair 62, 63 are rotationally driven by about 180° clockwise in FIG. 11. Thus, the cam pin 95e arranged in the front movable guide rail 94 of the front conveyance mechanism 56a moves along the cam surface 63c of the second cam gear 63 and thus slowly moves upward. The movable guide rail 94 is lifted up integrally with the lift plate 90a by the spring force of the coil spring 92a that has energized the front lift plate 90a. Then, the conveyance belt 95c with an end thereof suspended on the disk lifting portion 94a arranged at the outer end of the movable guide rail 94 is brought into contact with the lower inner edge of the optical disk Dn from underside. With the upward movement of the conveyance belt 95c, the optical disk Dn is lifted and taken out of the disk housing unit 45.

At this time, the disk lifting portion 94a has the upper portion thereof formed thinner and the width of the upper end thereof is set to a value almost the same as the thickness of the optical disk Dn. The disk lifting portion 94a thus enters that portion of the three optical disks Dn facing the loading position which has a wider gap outside than in the innermost peripheral portion of the optical disks Dn. As a result, while pushing open the left and right optical disks Dn laterally with the disk lifting portion 94a, only the middle optical disk Dn is placed on the conveyance belt 95c and can be lifted upward.

In the process, the cam groove 70 formed in the back of the first cam gear 62 rotates by 180, and the displacement cam portion 70b moves leftward. Therefore, the cam copy pin 71a, guided by the cam groove 70, moves to the circumferential portion 70a. As a result, the swing lever 71 rotates clockwise into a state with the right part thereof lowered. Thus, as shown in FIG. 20, the disk drive frame 57 moves in the direction away from the plate frame 61, so that the disk table 74 comes away from the chucking plate 87.

On the other hand, the first cam gear 62 is also rotated 180° in the clockwise direction like the second cam gear 63. The cam pin 95e on the movable guide rail 94 of the rear conveyance mechanism 56b simply moves through the outermost peripheral portion along the cam surface 62c of the cam portion 62b. Therefore, the height of the cam pin 95e remains unchanged. Thus, the rear lift plate 90b is not moved upward, and the rear movable guide rail 94 is held at the initial low end position. Thus, the optical disk Dn in the disk housing unit 45 corresponding to the rear portion is not taken out.

As shown in FIG. 11, the optical disk Dn that has been lifted to a predetermined position by the disk lifting portion 94a enters the guide groove 96a of the upper guide rail 96 arranged at an upper position, and is brought into contact with the bottom surface of the guide groove 96a and the front guide member 96c arranged on the inner surface of the door 36. The optical disk Dn thus is elastically supported at three points including the bottom surface of the guide groove 96a, the front guide member 96c and the conveyance belt 95c.

Under this condition, the loading motor 67 is driven, and the turning effort thereof is transmitted from the output gear 65a of the loading gear train 65 through the first intermediate gear 65b, the second intermediate gear 65 and the third intermediate gear 65d to the drive gear 65e. Further, the turning effort of the drive gear 65e is distributed in two opposite longitudinal directions, and transmitted to the front first movable gear 65f of the front conveyance mechanism 56a on the one hand and to the rear first movable gear 65i of the rear conveyance mechanism 56b on the other hand. From the front first movable gear 65f, the turning effort is transmitted through the front second and third movable gears 65g, 65h to the front belt drive gear 65m. From the rear first movable gear 65i, on the other hand, the turning effort is transmitted through the rear second and third movable gears 65j, 65k to the rear belt drive gear 65n. With the rotation of the belt drive gears 65m, 65n, the front and rear conveyance belts 95c, 95c are driven in the same direction.

In this case, with the front disk up as shown in FIG. 11, the front belt drive gear 65m is rotated in counterclockwise direction. Therefore, the turning effort in the clockwise direction is imparted to the optical disk Dn. Since the upper portion of the optical disk Dn is restricted by the upper guide rail 96 and the front guide member 96c, the particular optical disk Dn is not moved forward. The distance H2 between the guide groove 96a of the upper guide rail 96 and the conveyance belt 95c, on the other hand, is smaller than the diameter S of the optical disk Dn (H2 <S). In view of the fact that the movable guide rail 94 is energized upward by the coil spring 92a, however, the distance H2 can be increased beyond the diameter S.

Figure 12:
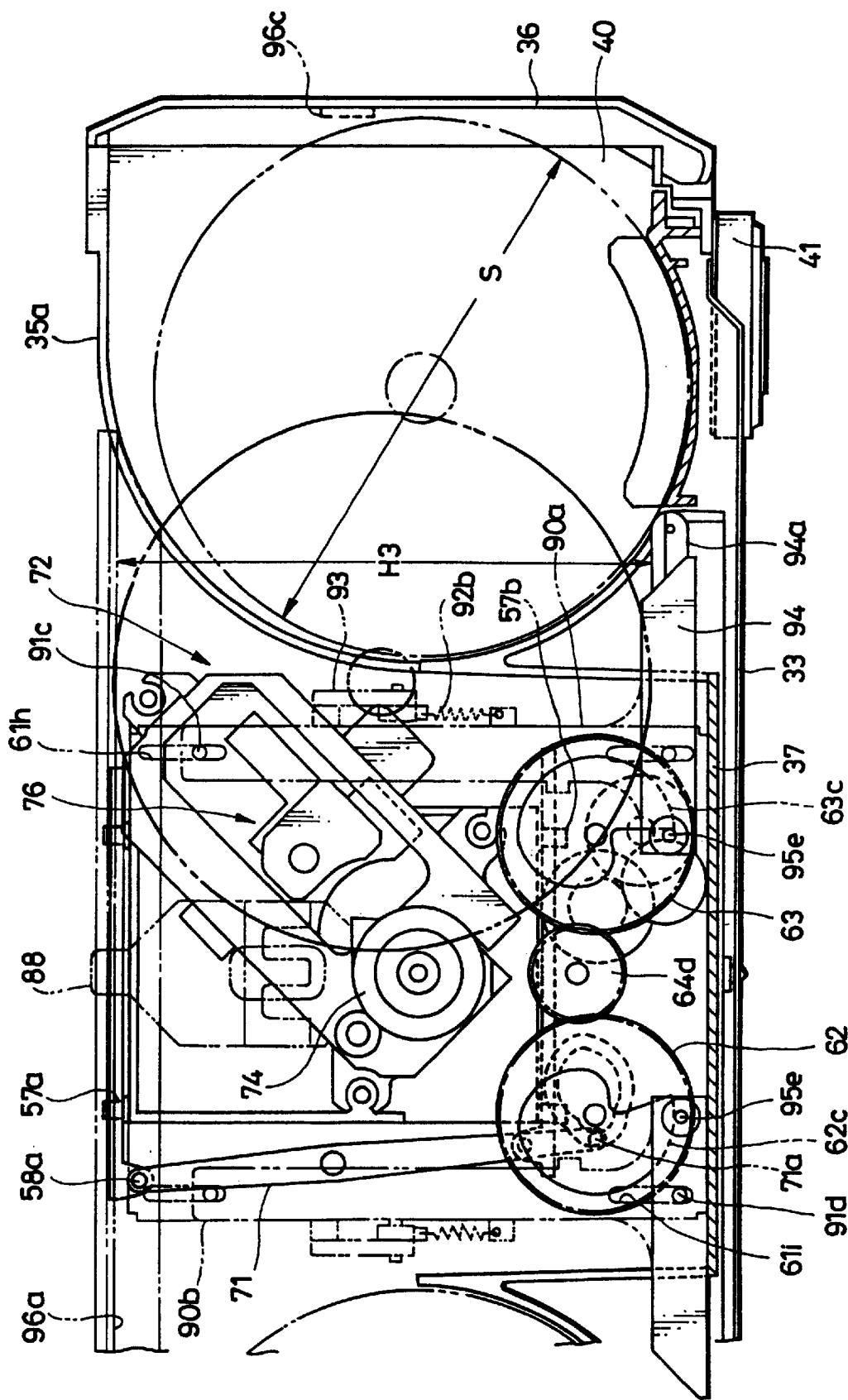
FIG. 12 is a sectional view for explaining a front disk loaded, according to an embodiment of a specific configuration of a disk reproduction unit of a disk recording and/or reproduction apparatus according to this invention.

Thus, as the force for forward movement due to the rotation of the optical disk Dn surpasses the spring force of the coil spring 92a, as shown in FIG. 12, the optical disk Dn enters within the distance H2 and pushes down the movable guide rail 94. As a result, the distance H3 becomes equal to the diameter S (H3=S). At the same time, a pair of the cam gears 62, 63 are held in stationary state, and the cam pin 95e in contact with the cam surface 63c of the second cam gear 63 moves radially outward by being guided by the stepped portion 63d of the cam portion 63b. Thus, the optical disk Dn is relocated to the position shown in FIG. 13 through the position shown in FIG. 12 from the position shown in FIG. 11, thus carrying out the loading of the optical disk Dn.

Figure 13:
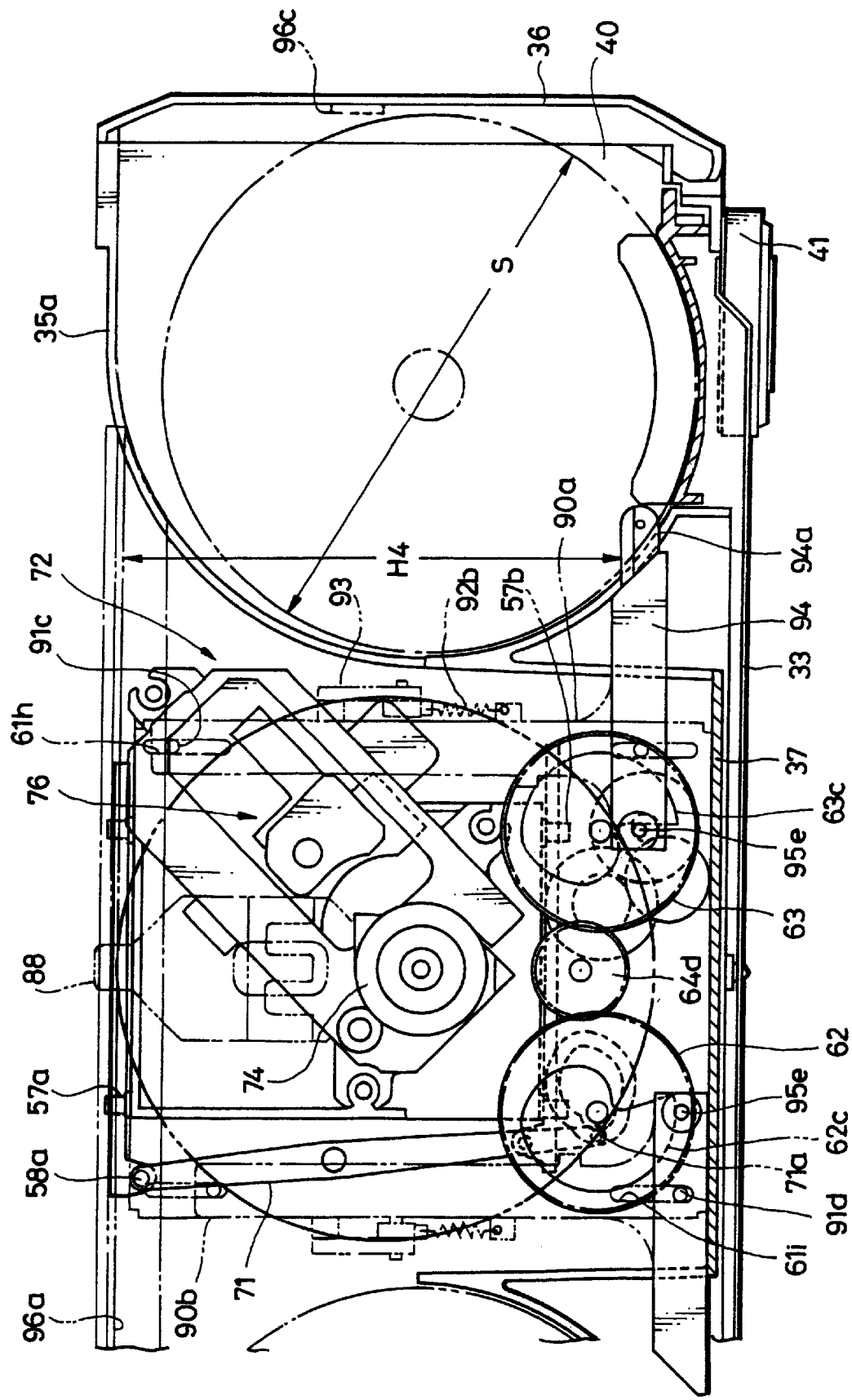
FIG. 13 is a sectional view for explaining a front disk completely loaded, according to an embodiment of a specific configuration of a disk reproduction unit of a disk recording and/or reproduction apparatus according to this invention.

As a result, as shown in FIG. 13, the optical disk Dn is conveyed to the central portion, thus completing the loading of the optical disk Dn. At this time, the rotational operating portion 93b of the disk stopper 93 is pushed down by the stopper restriction member 91f of the rear lift plate 90b. Therefore, the rear end of the optical disk Dn is brought into contact with the stopper portion 93a protruded over the travel locus of the optical disk Dn, and thus the optical disk Dn is prevented from moving rearward. Also, the position of the optical disk Dn is slightly higher than the disk mounting portion operated for reproduction.

At this time, the rear end of the optical disk Dn is ejected rearward of the inner end of the conveyance belt 95c, so that the inner end of the third conveyance belt 95c in contact with the optical disk Dn is brought into contact with a portion slightly higher than the lowest end of the optical disk Dn. As a result, the front lift plate 90a is lifted by the spring force of the coil spring 92a, and the distance H4 between the guide groove 96a and the conveyance belt 95c becomes shortest (H4<S). At this time, the cam pin 95e in contact with the cam surface 63c of the second cam gear 63 moves radially inward along the stepped portion 63d of the cam portion 63b.

Next, the cam drive motor 66 is started to rotate the cam gears 62, 63 about 180 counterclockwise in FIG. 13. As a result, the cam pin 95e moves downward by the cam surface 63c of the second cam gear 63, and the front movable guide rail 94 is pushed down, thereby causing the optical disk Dn to move down by its own weight.

At this time, the cam copy pin 71a in mesh with the cam slot 70 of the first cam gear 62 moves outward from inner radial direction, and therefore the swing lever 71 is swung clockwise about the mounting screw 38e. Consequently, the upper engaging pin 58a in mesh with the upper engaging hole 71b of the swing lever 71 moves rightward in the drawing, while at the same time the lower engaging pin 59a in mesh with the lower engaging hole 71c moves leftward in the drawing. Thus, the upper slide plate 58 moves rightward, and the lower slide plate 59 moves leftward.

Figure 14:
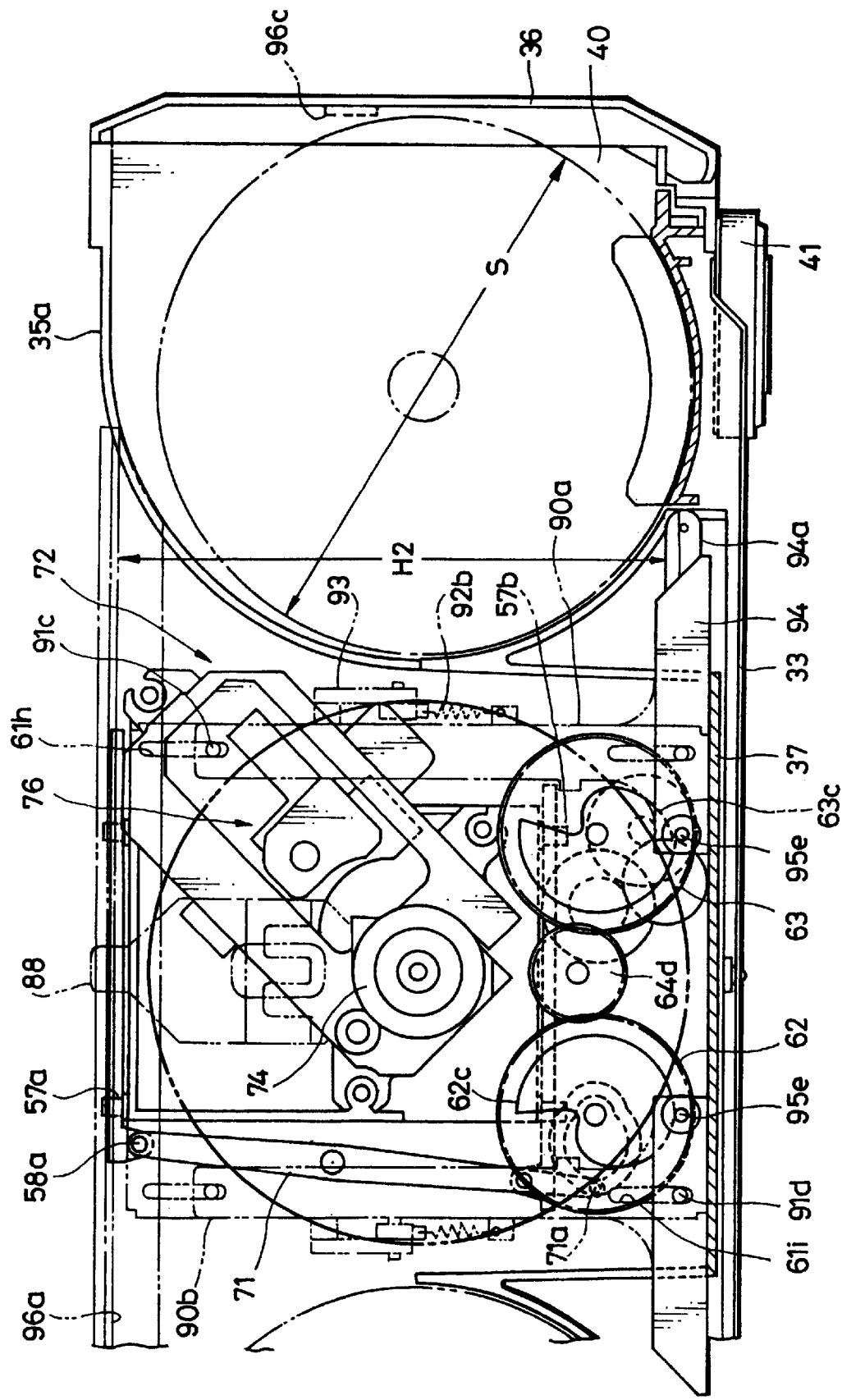
FIG. 14 is a sectional view for explaining a front disk completely chucked, according to an embodiment of a specific configuration of a disk reproduction unit of a disk recording and/or reproduction apparatus according to this invention.

As a result, as shown in FIG. 14, the upper guide pin 57a of the disk drive frame 57 in mesh with each guide groove 58c of the upper slide plate 58 moves toward the parallel portion of the guide groove 58c. In similar fashion, the lower guide pin 57b of the disk drive frame 57 in mesh with each guide groove 59c of the lower slide plate 59 moves toward the parallel portion of the guide groove 59c. Thus, the disk drive frame 57 approaches the plate frame 61, so that the disk table 74 of the drive unit 72 elastically supported by the disk drive frame 57 approaches the optical disk Dn.

When the optical disk Dn lowers to the disk mounting portion, the fitting portion 74b of the disk table 74 is fitted in the center hole Dc of the optical disk Dn. At the same time, the chucking plate 87 supported on the chucking lever 88 mounted on the plate frame 61 is adsorbed to the magnet 74e built in the disk table 74. As a result, the optical disk Dn is held between the disk table 74 and the chucking plate 87 thereby to complete the chucking. After that, the movable guide rail 94 is slightly pushed down so that the conveyance belt 95c is separated completely from the optical disk Dn.

As a result, the reproduction of the other surface of the optical disk Dn is made possible by the drive unit 72. The spindle motor 78 of the drive unit 72 is driven thereby to rotationally drive the optical disk Dn (at a constant linear speed, for example), while moving the optical pickup unit 76 along the radial direction of the optical disk Dn for reading the information signal. As a result the reproduction of the information signal recorded in the second information recording surface of the optical disk Dn chucked is carried out. Consequently, the reproduction of the information signal recorded in the two surfaces of a single optical disk Dn can be continuously performed.

Also, with the disk reproduction unit 31 according to this embodiment, one of the conveyance mechanisms of the disk conveyance unit 56 is arranged on the front side, i.e. at the disk entrance 40, and therefore the optical disk Dn can be mounted on the disk drive unit 72 without rotating the turntable 32. In this case, the optical disk Dn is accommodated in the disk housing unit 45 located at the central portion of the front conveyance mechanism 56a. Thus, the reproduction operation can be carried out by loading the optical disk Dn with the front conveyance mechanism 56a without rotating the turntable 32. In this case, the rotation time of the turntable 32 is not required, and therefore the reproduction can be started at an early time from the start of operation for an improved operability. Further, since the only requirement is that the disk conveyance unit 56 is located slightly higher than the optical disk Dn, the height of the disk reproduction unit 31 as a whole can be set as low as possible.

In spite of the foregoing description, the present invention is not limited to the embodiments described above. For example, although the embodiments described above refer to the case of application to a disk reproduction unit dedicated to the reproduction of the information signal, the invention is also applicable to a disk recording and reproduction apparatus capable of both recording and reproduction as well as a disk recording unit dedicated to the recording of the information signal. Further, instead of 300 optical disks that can be accommodated in the turntable as in the embodiments described above, more than 300 or less than 300 optical disks can of course be accommodated with equal effect.

Also, although the embodiments described above refer to an application of the DVD as a disk-like recording medium. The invention is not limited to such a recording medium, but various optical disks including any disk-like recording medium capable of recording or reproduction into and from the two sides thereof can be used. Further, the CD, the CD-ROM or the like optical disk having the information signal recorded only in one surface thereof can be used. In the case of one-side optical disks, the surface having no information signal recorded thereon is not used for reproduction of the information signal. Nevertheless, either the left or right position can be used for reproduction of the information signal, thereby leading to the advantage that the optical disk such as CD can be accommodated without taking the disk orientation into consideration. Further, the invention is usable with the disk-like recording media of recording type such as a magnetic disk and a magneto-optic disk other than the optical disks. In this way, the present invention is modifiable within the scope without departing from the spirit thereof.

As described above, in the disk recording and/or reproduction apparatus of the present invention, a disk guide and a conveyance belt are provided as disk conveyance means, and therefore an arbitrary one of a multiplicity of disk-like recording media arranged in vertical direction along the circumference of the turntable can be selectively picked up and conveyed to the disk mounting portion, or the disk-like recording medium after recording or reproduction can be returned to the original disk housing unit, thus making it possible to set the whole apparatus to a low height. In addition, the reproduction and/or recording operation can be performed on one side or two sides of the disk-like recording medium by a single disk drive unit thereby providing an inexpensive disk recording and/or reproduction apparatus with a suppressed cost. Further, even when the disk-like recording medium is accommodated in the disk housing unit of the turntable without taking the direction of the information recording surface into consideration, the information signal can be reproduced or recorded as it is without repositioning the disk.

In a disk recording and/or reproduction apparatus of the present invention, a disk guide includes a vertically moving member and a restriction member, and a conveyance belt is movably mounted on the vertically moving member. Thus, an arbitrary one of a multiplicity of disk-like recording media arranged in vertical position along the circumference of the turntable can be selectively picked up and conveyed to the disk mounting portion or the disk-like recording medium after recording or reproduction can be returned from the disk mounting portion to the original disk housing unit accurately.

A disk recording and/or reproduction apparatus according to the present invention comprises first and second support frames in opposed relation to each other with the disk conveyance means therebetween, wherein a disk table and a pickup unit are arranged on the first support frame, and a chucking plate is arranged on the second support frame. Therefore, the disk-like recording medium conveyed by the disk conveyance means can be accurately mounted on the disk table at the disk mounting portion.

As described above, according to a disk recording and/or reproduction apparatus of the present invention, the disk-like recording medium can be mounted on the disk drive unit without rotating the turntable, and therefore a rapid recording and/or reproduction operation can be realized for the disk-like recording medium. In addition, the two sides or one side of the disk-like recording medium can be reproduced and/or recorded by a single disk drive unit making it possible to provide an inexpensive disk recording and/or reproduction apparatus. Further, even when the disk-like recording medium is accommodated in the disk housing portion of the turntable without considering the direction of the information recording surface, the information signal can be reproduced or recorded directly without repositioning the disk.

According to a disk recording and/or reproduction apparatus of the present invention, the disk conveyance means for conveying the disk-like recording medium is arranged on the front part of the turntable, and therefore the disk-like recording medium can be rapidly and accurately mounted on the disk drive unit using the particular disk conveyance means.

According to a disk recording and/or reproduction apparatus of the present invention, the disk conveyance means includes a disk guide and a conveyance belt, thereby leading to the advantage that an arbitrary one of a multiplicity of disk-like recording media arranged in vertical position along the circumferential direction on the turntable can be taken out and conveyed to the disk mounting portion, or the disk-like recording medium after recording or reproduction can be returned from the disk mounting portion to the original disk housing portion.

According to a disk recording and/or reproduction apparatus of the present invention, the disk guide has a vertically moving member and a restriction member, and a conveyance belt is movably mounted on the vertically moving member. Therefore, an arbitrary one of a multiplicity of disk-like recording media arranged in vertical position along the circumferential direction can be selected out and conveyed to the disk mounting portion, or the disk-like recording medium after recording or reproduction can be returned positively from the disk mounting portion to the original disk housing portion.

According to a disk recording and/or reproduction apparatus of the present invention, the first and second support frames are arranged in opposed relation to each other with the disk conveyance means therebetween, and the disk table and the pickup apparatus are mounted on the first support frame, while the chucking plate is arranged on the second support frame. Therefore, the disk-like recording medium conveyed by the disk conveyance means can be mounted positively on the disk table at the disk mounting portion.

As has been described above, according to a disk recording and/or reproducing apparatus according to claim 1 of the present invention, a disk drive device is arranged at the central portion of a turntable, and disk conveying means are arranged at two positions on a diagonal of the turntable. For this reason, when a disk recording medium is removed from a disk accommodation unit to be conveyed, the disk-like recording medium can be set on the disk table such that one surface (e.g., A surface) faces a pickup device. In addition, after the turntable is rotated half-way, the disk-like recording medium is conveyed by another disk conveying means, so that the disk-like recording medium can be set in the disk table while the other surface (e.g., B surface) of the disk-like recording medium faces the pickup device. In this manner, reproducing or recording of both the surfaces of the disk-like recording medium can be continuously performed.

Furthermore, reproducing and/or recording of both the surfaces or one surface of an optical disk can be performed by one disk drive device, and an inexpensive disk recording and/or reproducing apparatus can be provided. In addition, when a disk-like recording medium is accommodated in a disk accommodation unit of a turntable without considering the direction of an information recording surface, reproducing or recording of information signals can be advantageously executed without changing disks.

According to a disk recording and/or reproducing apparatus of the present invention, since a disk guide and a conveying belt are arranged in a disk conveying means, the following advantages can be obtained. That is, an arbitrary disk-like recording medium can be selected and picked from a large number of disk-like recording media uprightly arrayed on the turntable in a circumference direction to be conveyed to a disk setting unit, or the disk-like recording medium subjected to a recording or reproducing operation can be returned from the disk setting unit to an original disk accommodation unit.

According to a disk recording and/or reproducing apparatus of the present invention, since a disk guide has a vertical moving member and a restraining member, and a conveying belt is travelably attached to the vertical moving member, the following advantages can be obtained. That is, an arbitrary disk-like recording medium can be selected and picked from a large number of disk-like recording media uprightly arrayed on the turntable in a circumference direction to be conveyed to a disk setting unit, or an operation of returning the disk-like recording medium subjected to a recording or reproducing operation from the disk setting unit to an original disk accommodation unit can be reliably performed.

According to a disk recording and/or reproducing apparatus of the present invention, since operations of one pair of disk conveying means are controlled by a cam drive mechanism, the following advantages can be obtained. That is, when a disk-like recording medium is conveyed by one disk conveying means, the other disk convey means is held in a non-convey state, the disk-like recording medium can be always conveyed by only one disk convey means, and the pair of disk conveying means can be driven by one drive source.

According to a disk recording and/or reproducing apparatus of the present invention, first and second support frames are oppositely arranged to sandwich a disk convey means, a disk table and a pickup device are arranged on the support frame, and a chucking plate is arranged on the second support frame. For this reason, an advantage that a disk-like recording medium conveyed by the disk convey means can be reliably set in a disk setting unit to the disk table can be obtained.

In the disk recording and/or reproducing apparatus of the present invention, the disk drive apparatus is disposed in the central portion of the turntable, and the disk conveyance means are disposed in two locations on the diagonal line of the turntable, as heretofore described. If a disk is conveyed by one disk conveyance means, therefore, then the disk is attached to the disk drive apparatus in such a state that one side (for example, A side) of the disk is opposed to the optical pickup apparatus. Furthermore, by rotating the turntable by half a circumference and then conveying the disk by using the other disk conveyance means, the disk can be attached to the disk drive apparatus in such a state that the other side (for example, B side) of the disk is opposed to the optical pickup apparatus. Therefore, there can be obtained an effect that reproducing or recording can be conducted automatically on each side of the disk, such as a DVD, having both sides as information recording faces.

In addition, it is possible to provide a disk recording and/or reproducing apparatus which is capable of conducting both side recording and both side reproducing of a disk by using a single disk drive apparatus and which is inexpensive without increasing the cost. Furthermore, in the case where a turntable capable of housing a large number of tables is used, reproducing or recording of an information signal can be executed even when disks are housed without considering the direction of the disks. Such an advantage is also obtained.

In the disk recording and/or reproducing apparatus of the present invention, there can be obtained an effect that a disk is taken out from the disk housing portion of the turntable by the disk takeout portion of the disk conveyance means, and the disk thus taken out is guided by the conveyance rail and conveyed to the disk attachment portion of the disk drive apparatus.

Thus, it is apparent that in accordance with the present invention an apparatus that fully satisfies the objectives, aims, and advantages is set forth above. While the invention has been described in conjunction with specific embodiments, it is evident that many alternatives, modifications, permutations, and variations will become apparent to those skilled in the art in the light of the foregoing description. Accordingly, it is intended that the present invention embrace all such alternatives, modifications and variations as fall within the scope of the appended claims.

What is claimed is:

1. A disk recording and/or reproduction apparatus comprising:

a turntable for housing disk-like recording media in a vertical position and side by-side along a circumferential direction, wherein a central portion of said turntable has a center hole formed therein;

a disk drive unit arranged in said center hole of said central portion of said turntable for recording and/or reproducing said disk-like recording media mounted on said disk drive unit, wherein said disk drive unit includes a disk mounting portion; and disk conveyance means arranged inside an outer peripheral edge of said turntable and below a plane formed by centers of said disk-like recording media for conveying a selected one of said disk-like recording media between said disk drive unit and said turntable, wherein said disk conveyance means includes a disk guide for lifting and holding said selected one of said disk-like recording media from said turntable and a conveyor belt for applying a rotational force to a peripheral edge located below said plane of said selected one of said disk-like recording media for conveying said selected one of said disk-like recording media to said disk mounting portion of said disk drive unit.

2. The disk recording and/or reproduction apparatus as described in claim 1, wherein said disk guide includes a vertically moving member and a restriction member for restricting a movement of said selected one of said disk-like recording media on said vertically moving member, and said conveyor belt is movable mounted on said vertically moving member.

3. The disk recording and/or reproduction apparatus as described in claim 1, wherein said disk drive unit includes a first support frame and a second support frame arranged opposite to each other with said disk conveyance means arranged therebetween, said first support frame includes a disk table for mounting said selected one of said disk-like recording media and a pickup unit for recording and/or reproducing said recording media, and said second support frame includes a chucking plate for holding said selected one of said disk-like recording media against said disk table.

4. A disk recording and/or reproduction apparatus comprising:

a turntable for housing disk-like recording media in a vertical position and side-by-side along a circumferential direction, wherein a central portion of said turntable has an open portion formed therein;

a disk drive unit arranged in said open portion of said central portion of said turntable for mounting one of said disk-like recording media thereon for recording and/or reproducing said one of said disk-like recording media, wherein said disk drive unit includes a disk mounting portion; and disk conveyance means arranged inside an outer peripheral edge of said turntable and below a plane formed by centers of said disk-like recording media for conveying said one of said disk-like recording media from said turntable to said disk mounting portion, wherein said disk conveyance means is arranged between said disk drive unit and a front portion of said turntable.

5. The disk recording and/or reproduction apparatus as described in claim 4, wherein said disk conveyance means includes a disk guide for limiting lifting and moving of said one of said disk-like recording media from said turntable, and a conveyor belt for applying a rotational force to a peripheral edge located below said plane of said one of said disk-like recording media for rolling said one of said disk-like recording media along said disk guide, thereby conveying said one of said disk-like recording media to said disk drive unit.

6. The disk recording and/or reproduction apparatus as described in claim 5, wherein said disk guide includes a vertically moving member and a restriction member for restricting a movement of said one of said disk-like recording media on said vertically moving member, and said conveyor belt being adapted to travel on said vertically moving member.

7. The disk recording and/or reproduction apparatus as described in claim 4, wherein said disk drive unit includes a first support frame and a second support frame arranged opposite to each other with said disk conveyance means interposed therebetween, said first support frame includes a disk table forming a part of said disk mounting portion for mounting said one of said disk-like recording media and a pickup apparatus, and said second support frame includes a chucking plate forming another part of said disk mounting portion for holding said one of said disk-like recording media against said disk table.

8. An apparatus for recording and/or reproducing a disk, comprising:

circular housing means for accommodating a plurality of disks arrayed uprightly in a circumference direction and being formed with an open center portion;

a disk driving device arranged in said open center portion of said circular housing means for recording and/or reproducing an information signal from one of said plurality of disks; and disk conveying means arranged inside an outer peripheral edge of said circular housing means and below a plane formed by centers of said plurality of disks for conveying said one of said plurality of disks between said disk driving device and said circular housing means.

9. The apparatus according to claim 8, wherein said disk conveying means comprises first and second disk transport systems for respectively transporting said one of said plurality of disks from first and second opposite locations of said circular housing means to said disk driving device.

10. The apparatus according to claim 9, wherein said disk conveying means further includes disk takeout means for taking out one of said plurality of disks from said circular housing means.

11. The apparatus according to claim 9, wherein each of said first and second disk transport systems comprises a cam drive mechanism for driving said disk conveying means so that when said first disk transport system conveys said one of said plurality of disks said cam drive mechanism holds said second disk transport system in a non-convey state.

12. The apparatus according to claim 9, wherein said disk driving device includes a first support frame and a second support frame located in said open center portion of said circular housing means and arranged opposite to each other with said disk conveying means interposed therebetween, said first support frame includes a disk table on which the disk is set and a pickup device, and said second support frame includes a chucking plate for holding said one of said plurality of disks between said chucking plate and said disk table.

13. The apparatus according to claim 9, further comprising rotating means for rotating said circular housing means about a central axis thereof.

14. The apparatus according to claim 8, wherein said conveying means includes a belt for moving said one of said plurality of disks and a guide groove for guiding said one of said plurality of disks in a direction between said disk driving device and said housing means.

* * * * *